US012684050B1

(12) United States Patent
Stevenson

(10) Patent No.: US 12,684,050 B1
(45) Date of Patent: Jul. 14, 2026

(54) METHODS, APPARATUSES, AND SYSTEMS FOR IMPLEMENTING ORDERS WITH MINIMAL LATENCY

(71) Applicant: PAX Markets, Inc., Redwood City, CA (US)

(72) Inventor: John Peter Stevenson, Redwood City, CA (US)

(73) Assignee: PAX Markets, Inc., Redwood City, CA (US)

( * ) Notice: Subject to any disclaimer, the term of this patent is extended or adjusted under 35 U.S.C. 154(b) by 0 days.

(21) Appl. No.: 19/294,114

(22) Filed: Aug. 7, 2025

Related U.S. Application Data

(63) Continuation of application No. 19/135,780, filed as application No. PCT/US2024/014106 on Feb. 1, 2024.

(60) Provisional application No. 63/503,628, filed on May 22, 2023, provisional application No. 63/482,798, filed on Feb. 2, 2023.

(51) Int. Cl.
| | |
|---|---|
| *H04L 67/61* | (2022.01) |
| *G06Q 40/04* | (2012.01) |
| *H04L 9/40* | (2022.01) |

(52) U.S. Cl.
CPC ............. *H04L 67/61* (2022.05); *G06Q 40/04* (2013.01); *H04L 63/08* (2013.01)

(58) Field of Classification Search
CPC .......... H04L 67/61; H04L 63/08; G06Q 40/04
See application file for complete search history.

(56) References Cited

U.S. PATENT DOCUMENTS

| | | | |
|---|---|---|---|
| 5,185,780 | A | 2/1993 | Leggett |
| 5,289,368 | A | 2/1994 | Jordan et al. |
| 5,325,292 | A | 6/1994 | Crockett |
| 5,590,188 | A | 12/1996 | Crockett |
| 5,911,134 | A | 6/1999 | Castonguay et al. |
| 6,044,355 | A | 3/2000 | Crockett et al. |
| 6,053,872 | A | 4/2000 | Mohler |
| 6,115,746 | A | 9/2000 | Waters et al. |
| 6,192,346 | B1 | 2/2001 | Green |
| 6,564,368 | B1 | 5/2003 | Beckett et al. |
| 6,694,374 | B1 | 2/2004 | McGloin et al. |

(Continued)

FOREIGN PATENT DOCUMENTS

| | | | |
|---|---|---|---|
| EP | 4659185 | A2 | 12/2025 |
| KR | 10-2025-0134615 | A | 9/2025 |

(Continued)

*Primary Examiner* — Nazia Naoreen
(74) *Attorney, Agent, or Firm* — DLA Piper LLP (US)

(57) ABSTRACT

Systems and methods for matching orders across a plurality of input ports are disclosed herein. A system may include a plurality of input ports, a processor, and a storage medium. The processor may be configured to receive a plurality of data packets from the input ports, defining a first message and a second message, wherein the first and second messages have a message type. The processor may be configured to sequence the first and second messages into a sequence of record based on one or more arbitration rules; evaluate the first message and the second message based on the sequence of record to generate matching information; and publish, over the network interface, the matching information. The processor may be further configured to perform immediate publication of the sequence of record.

20 Claims, 17 Drawing Sheets

(56)                    References Cited

U.S. PATENT DOCUMENTS

|  |  |  |
|---|---|---|
| 6,970,829 B1 | 11/2005 | Leamon |
| 7,058,589 B1 | 6/2006 | Leamon et al. |
| 7,085,728 B2 | 8/2006 | Sarlay et al. |
| 7,203,655 B2 | 4/2007 | Herbert et al. |
| 7,240,328 B2 | 7/2007 | Beckett et al. |
| 7,720,706 B2 | 5/2010 | Herbert et al. |
| 7,848,947 B1 | 12/2010 | McGloin et al. |
| 8,630,404 B2 | 1/2014 | Stearns |
| 9,547,565 B2 | 1/2017 | Cape et al. |
| 9,792,164 B1 * | 10/2017 | Millhuff ................. G06F 9/466 |
| 9,990,393 B2 * | 6/2018 | Parsons .................. H04L 45/72 |
| 10,185,993 B2 | 1/2019 | Katsuyama et al. |
| 10,210,005 B2 | 2/2019 | Cape et al. |
| 10,311,515 B2 | 6/2019 | Katsuyama et al. |
| 10,346,910 B2 | 7/2019 | Katsuyama et al. |
| 10,467,694 B2 | 11/2019 | Katsuyama et al. |
| 10,621,666 B2 | 4/2020 | Katsuyama et al. |
| 10,678,694 B2 | 6/2020 | Park et al. |
| 10,706,470 B2 | 7/2020 | Facini et al. |
| 10,783,474 B2 | 9/2020 | Livne et al. |
| 10,901,905 B2 | 1/2021 | Park et al. |
| 11,030,692 B2 | 6/2021 | Katsuyama et al. |
| 11,080,139 B2 | 8/2021 | Cape et al. |
| 11,348,051 B2 | 5/2022 | Livne et al. |
| 11,423,479 B2 | 8/2022 | Katsuyama et al. |
| 11,451,647 B2 | 9/2022 | Lariviere et al. |
| 11,537,455 B2 | 12/2022 | Park |
| 11,544,388 B2 | 1/2023 | Bishop et al. |
| 11,568,485 B2 | 1/2023 | Katsuyama et al. |
| 11,620,602 B2 | 4/2023 | Livne et al. |
| 11,676,205 B2 | 6/2023 | Schwall et al. |
| 11,983,772 B2 | 5/2024 | Park et al. |
| 12,148,031 B2 | 11/2024 | Katsuyama et al. |
| 12,175,311 B2 | 12/2024 | Park |
| 12,177,137 B1 | 12/2024 | Park et al. |
| 12,182,865 B2 * | 12/2024 | Callaway ............... G06Q 40/04 |
| 2002/0120555 A1 | 8/2002 | Lerner |
| 2004/0052354 A1 | 3/2004 | Crockett |
| 2004/0098295 A1 | 5/2004 | Sarlay et al. |
| 2008/0300953 A1 | 12/2008 | Sarlay |
| 2009/0125346 A1 | 5/2009 | Loconzolo |
| 2011/0010219 A1 | 1/2011 | Stearns et al. |
| 2011/0145032 A1 | 6/2011 | Stearns |
| 2013/0110588 A1 | 5/2013 | Livne et al. |
| 2015/0081508 A1 | 3/2015 | Schwall et al. |
| 2018/0158141 A1 | 6/2018 | Facini et al. |
| 2018/0176320 A1 | 6/2018 | Soni et al. |
| 2018/0322573 A1 | 11/2018 | Facini et al. |
| 2018/0365766 A1 | 12/2018 | Taylor et al. |
| 2019/0155758 A1 | 5/2019 | Walker |
| 2019/0200844 A1 | 7/2019 | Shelton, IV et al. |
| 2021/0118027 A1 * | 4/2021 | Atkinson ................ G06F 9/542 |
| 2022/0383414 A1 | 12/2022 | Burns et al. |
| 2022/0394111 A1 | 12/2022 | Lariviere et al. |
| 2023/0162283 A1 | 5/2023 | Millhuff et al. |
| 2023/0222589 A1 * | 7/2023 | Glass .................... G06Q 40/04 |
|  |  | 705/37 |

FOREIGN PATENT DOCUMENTS

|  |  |  |
|---|---|---|
| WO | 1998/056024 A1 | 12/1998 |
| WO | 2015/042012 A1 | 3/2015 |
| WO | 2016/028416 A1 | 2/2016 |
| WO | 2016/044608 A1 | 3/2016 |
| WO | 2018/044334 A1 | 3/2018 |
| WO | 2018/044828 A1 | 3/2018 |
| WO | 2020/118304 A1 | 6/2020 |
| WO | 2024/026347 A1 | 2/2024 |
| WO | 2024/163814 A2 | 8/2024 |

* cited by examiner

| Header 290 | Payload 292 | Trailer 294 |
|---|---|---|

METHODS, APPARATUSES, AND SYSTEMS FOR IMPLEMENTING ORDERS WITH MINIMAL LATENCY

CROSS-REFERENCE TO RELATED APPLICATIONS

This application is a continuation of U.S. patent application Ser. No. 19/135,780 filed on Jun. 4, 2025, which is a national phase of International Application No. PCT/US2024/014106 filed on Feb. 1, 2024, which claims priority benefit of U.S. Provisional Patent Application No. 63/503,628 filed on May 22, 2023 and U.S. Provisional Patent Application No. 63/482,798 filed on Feb. 2, 2023, all of which are hereby incorporated by reference in their entireties.

TECHNICAL FIELD

Embodiments disclosed herein generally relate to systems and methods for matching orders by observing the sequence of messages received by and accepted by an exchange.

BACKGROUND

In existing electronic markets, a large number of algorithmic trades are based on market data published by the trading venue. In many cases, a single published market data message incites multiple participants to respond. For example, the trading venue may publish a message indicating that a trade occurred at the offer price. This trade, at the offer, may indicate or cause the perception that price is likely to go up (say, for example, price had already been trending up). Market makers and algorithmic trading participants, upon receipt of that published trade event may race to buy more (perhaps to buy all available) at the current offer price, or they may race to cancel their offers to sell at that price.

This sequence of events—namely, publication of new market data (a market tick event, hereafter also referred to as an exogenous event) and the pursuant orders (or order cancellations) that are submitted by market participants in response—is known as a tick-to-trade race.

The tick-to-trade race is a result of existing exchange architecture which is generally comprised of networking equipment to serialize incoming participant messages to a matching engine that may implement the price time matching algorithm.

The price time matching algorithm is used to determine which orders have matched together to form a trade. If an order is submitted to the venue with a marketable price (e.g., a price that meets or exceeds the best contra sided price, commonly referred to as a price that crosses the spread), then it is matched against contra-sided orders. The contra-side orders are selected first by those which offer the best contra-side price, e.g., those that have price priority, and second by those contra-side orders that were submitted first, e.g., those that have time priority.

In many scenarios, price time matches one's intuition of fairness, but when a tick-to-trade race occurs the results of price time matching may appear less desirable. For example, one participant, based on the exogenous event, may desire to cancel their previously placed quote but other participants may, on the same basis, desire to interact with that quote. Assuming each of the foregoing participants achieves the same reaction time, then their respective orders and cancellations will arrive at the electronic market at the same time. Using price time, one of the apparently simultaneous orders (or cancellations) must be selected to go first. For this reason, it is likely that a participant is enabled to interact with a quote that another participant wishes to cancel, e.g., where both participants (the liquidity taker that wishes to transact and the liquidity provider that wishes to cancel) have responded on the same basis. This scenario, in effect, endorses a trade where one participant did not desire to be in the trade on the same basis on which the other participant desired the trade: it is difficult to judge this result as precisely in line with creating or supporting a better or more efficient market. Thus, participants are incentivized to minimize their reaction time.

Other tick-to-trade races exist. For example, when an innermost ask (bid) price level opens up (e.g., all resting orders at a given price are removed from the order book by way of matching or cancellation), market participants may race to place new resting bids (offers) to form a new price level (sometimes referred to as placing quotes, or resting quotes, bids, offers, or asks) on the opposite side of the book (e.g., to be first in line for eventual matching).

Tick-to-trade races compel participants to invest in fast reaction times and place pressure on exchanges to provide proximity through colocation and fair access (e.g., equal cable lengths from co-located servers to the exchange network ingest). Even if two orders arrive simultaneously at the exchange, the exchange network equipment serializes one in front of the other (e.g., randomly selects which order goes first). The order that goes first (the winning order) has an advantage, e.g., in that it can execute against all of the available liquidity at a given price.

Thus, orders, cancellations, and other messages that respond to a certain exogenous event are, in effect, arbitrarily sequenced by existing electronic trading venues. This arbitrary sequencing is an inherent result of the current predominant electronic financial exchange architecture, and it may not lead to fair or equitable results when multiple participants respond on the same basis (on the basis of the same newly published information).

The predominant exchange architecture comprised of network equipment to serialize a sequence of network messages (containing participant orders and order cancellations) to a matching engine, as described above, leads to non-economic investment in speed technology and markets that are less robust and less competitive than they might otherwise be, i.e. because certain participants that are disadvantaged in terms of speed and cannot participate as they might, should their speed disadvantage be mitigated.

SUMMARY

Accordingly, to minimize participant reaction time, to enable all participants to respond to exchange published information at speed parity, to minimize delay in publication of exchange market data and market events, herein are disclosed systems and methods for fast or immediate publication of exchange market data and market events without intermediation or processing delay from or by a matching engine and systems and methods for entering or submitting participant orders or order cancellations or other participant requests or API calls to the exchange on the basis of any information, market events, or market data aggregated at the exchange itself.

In some embodiments, a system for managing a plurality of input ports includes a plurality of input ports including a first input port and a second input port; at least one processor; and a non-transitory, processor-readable storage medium. The non-transitory, processor-readable storage medium may include one or more programming instructions that, when executed, cause the at least one processor to receive a plurality of data packets from the first input port and the second input port, wherein a first portion of the plurality of data packets define a first message and a second portion of the plurality of data packets define a second message, wherein each of the first message and the second message includes a message type of at least one of an order message, a cancellation message, a triggered order message, or a limit order message; collate the first portion of the plurality of data packets into the first message and the second portion of the plurality of data packets into the second message; sequence the first message and the second message into a sequence of record based on one or more arbitration rules; publish, over a network interface, the sequence of record; evaluate, after publication of the sequence of record, orders associated with the first message and the second message, using a matching algorithm, based on the sequence of record to generate matching information; and publish, over the network interface, the matching information.

In some embodiments, the first message is a triggered order message; and the one or more programming instructions further cause the processor to store the triggered order message in a triggered order queue, wherein the triggered order queue includes a triggering condition for the triggered order message; evaluate a status of the triggering condition based on at least one of the second message, a received external condition, and the matching information; and enter an underlying order of the first message in the sequence of record based on the evaluation.

In some embodiments, the one or more programming instructions that cause the processor to publish, over the network interface, the sequence of record further cause the processor to omit the first message from publication.

In some embodiments, the first message is a hidden limit order message; and the one or more programming instructions further cause the processor to store the hidden limit order message in a hidden limit order queue, wherein the hidden limit order queue includes a triggering condition for the hidden limit order message; evaluate a status of the triggering condition based on at least one of the second message and a change in displayed liquidity associated with the second message; and enter an underlying order of the first message in the sequence of record based on the evaluation.

In some embodiments, the one or more programming instructions that cause the processor to publish, over the network interface, the sequence of record further cause the processor to redact a portion of the first message.

In some embodiments, the one or more programming instructions that cause the processor to evaluate the status of the triggering condition further cause the processor to determine message information associated with the second message including at least one of symbol, price, and quantity; and compare the message information to the triggering condition.

In some embodiments, the one or more programming instructions further cause the processor to receive third-party market data packets on at least one of the plurality of input ports.

In some embodiments, the one or more programming instructions further cause the processor to receive regulatory information data packets on at least one of the plurality of input ports.

In some embodiments, the first message arrives on the first input port at a detectably simultaneous time as the second message arrives on the second input port; and the one or more arbitration rules include the selection of the first input port and the second input port in a rotating sequence.

In some embodiments, the first message arrives on the first input port at a detectably simultaneous time as the second message arrives on the second input port; and the one or more arbitration rules include the selection of the first input port and the second input port according to an arbitration scheme.

In some embodiments, the one or more programming instructions further cause the processor to determine whether the first message is at least one of inauthentic and invalid, wherein the first message is inauthentic if the first message does not contain necessary identifying information that is sufficient to verify an authorized market participant, wherein the first message is invalid if a parameter of the first message is outside of a predefined threshold range; and omit, based on the determination, the first message from the sequence of record.

In some embodiments, the identifying information includes a shared secret key generated through at least one of symmetric cryptography and public-key cryptography.

In some embodiments, the identifying information includes an authentication token.

In some embodiments, the system includes a liquidity tracking unit configured to track aggregate amounts of liquidity of an asset associated with at least one of the first message and the second message.

In some embodiments, the one or more programming instructions further cause the processor to publish hypothetical future market data.

In some embodiments, the one or more programming instructions further cause the processor to generate a triggered order message, wherein a triggering condition is based on the hypothetical future market data.

In some embodiments, the first message is a triggered order message; and the one or more programming instructions further cause the processor to store the triggered order message in a triggered order queue, wherein the triggered order queue includes a triggering condition for the triggered order message; evaluate a status of the triggering condition based on a cohosted predictive model; and enter an underlying order of the first message in the sequence of record based on the status.

In some embodiments, a method for managing a plurality of input ports includes receiving, by a processor, a plurality of data packets from a plurality of input ports including a first input port and a second input port, wherein a first portion of the plurality of data packets define a first message and a second portion of the plurality of data packets define a second message, wherein each of the first message and the second message includes a message type of at least one of an order message, a cancellation message, a triggered order message, or a hidden limit order message; collating, by the processor, the first portion of the plurality of data packets into the first message and the second portion of the plurality of data packets into the second message; sequencing, by the processor, the first message and the second message into a sequence of record based on one or more arbitration rules; publishing, by the processor, the sequence of record over a network interface; evaluating, by the processor, after publication of the sequence of record, orders associated with the first message and the second message, using a matching algorithm, based on the sequence of record to generate matching information; and publishing by the processor, the matching information over the network interface.

In some embodiments, the first message is a triggered order message, and the method further includes storing, by the processor, the triggered order message in a triggered order queue, wherein the triggered order queue includes a triggering condition for the triggered order message; evaluating, by the processor, a status of the triggering condition based on at least one of the second message, a received external condition, and the matching information; and entering, by the processor, an underlying order of the first message in the sequence of record based on the status.

In some embodiments, the method further includes omitting the first message from the publication of the sequence of record based on the message type of the first message.

In some embodiments, the first message is a hidden limit order message, and the method further includes storing, by the processor, the hidden limit order message in a hidden limit order queue, wherein the hidden limit order queue includes a triggering condition for the hidden limit order message; evaluating, by the processor, a status of the triggering condition based on at least one of the second message and a change in displayed liquidity associated with the second message; and entering, by the processor, an underlying order of the first message in the sequence of record based on the evaluation.

In some embodiments, publishing the sequence of record further includes redacting a portion of the first message.

In some embodiments, evaluating the status of the triggering condition further includes determining, by the processor, message information associated with the second message including at least one of symbol, price, and quantity; and comparing, by the processor, the message information to the triggering condition.

In some embodiments, the method further includes receiving, by the processor, third-party market data packets on at least one of the plurality of input ports.

In some embodiments, the method further includes receiving, by the processor, regulatory information data packets on at least one of the plurality of input ports.

In some embodiments, the first message arrives on the first input port at a detectably simultaneous time as the second message arrives on the second input port; and the one or more arbitration rules include the selection of the first input port and the second input port in a rotating sequence.

In some embodiments, the first message arrives on the first input port at a detectably simultaneous time as the second message arrives on the second input port; and the one or more arbitration rules include the selection of the first input port and the second input port according to an arbitration scheme.

In some embodiments, the method further includes determining, by the processor, whether the first message is at least one of inauthentic and invalid, wherein the first message is inauthentic if the first message does not contain necessary identifying information that is sufficient to verify an authorized market participant, wherein the first message is invalid if a parameter of the first message is outside of a predefined threshold range; and omitting, by the processor, the first message from the sequence of record based on the determination.

In some embodiments, the identifying information includes a shared secret key generated through at least one of symmetric cryptography and public-key cryptography.

In some embodiments, the identifying information includes an authentication token.

In some embodiments, the method further includes tracking, by the processor, aggregate amounts of liquidity of an asset associated with at least one of the first message and the second message in a liquidity tracking unit.

In some embodiments, the method further includes publishing hypothetical future market data.

In some embodiments, the method further includes generating, by the processor, a triggered order message, wherein a triggering condition is based on the hypothetical future market data.

In some embodiments, the first message is a triggered order message, and the method further includes storing, by the processor, the triggered order message in a triggered order queue, wherein the triggered order queue includes a triggering condition for the triggered order message; evaluating, by the processor, a status of the triggering condition based on a cohosted predictive model; and entering, by the processor, an underlying order of the first message in the sequence of record based on the status.

In some embodiments, a system for managing a plurality of input ports includes a plurality of input ports, includes a first input port and a second input port; at least one processor; and a non-transitory, processor-readable storage medium. The non-transitory, processor-readable storage medium may include one or more programming instructions that, when executed, cause the at least one processor to receive a plurality of data packets from the first input port and the second input port, wherein a first portion of the plurality of data packets define a first message and a second portion of the plurality of data packets define a second message, wherein the first message is a triggered order message and the second message includes a message type of at least one of an order message, a cancellation message, a triggered order message, or a limit order message; collate the first portion of the plurality of data packets into the first message and the second portion of the plurality of data packets into the second message; sequence the second message into a sequence of record based on one or more arbitration rules; store the first message in a triggered order queue, wherein the triggered order queue includes a triggering condition for the first message; evaluate a status of the triggering condition based on at least one of the second message, a received external condition, and historical matching information; enter an underlying order of the first message in the sequence of record based on the evaluation; evaluate, using a matching algorithm, orders associated with the first message and the second message based on the sequence of record to generate matching information; and publish, over a network interface, the matching information.

In some embodiments, the one or more programming instructions further cause the processor to publish, over the network interface, the sequence of record prior to using the matching algorithm.

In some embodiments, the one or more programming instructions further cause the processor to omit the second message from the publication of the sequence of record based on the message type of the second message.

In some embodiments, the second message is a hidden limit order message; and the one or more programming instructions further cause the processor to store the hidden limit order message in a hidden limit order queue, wherein the hidden limit order queue includes a triggering condition for the hidden limit order message; evaluate a status of the triggering condition based on at least one of a third message and a change in displayed liquidity associated with the third message; and enter an underlying order of the second message in the sequence of record based on the evaluation.

In some embodiments, the one or more programming instructions that cause the processor to publish, over the network interface, the sequence of record further cause the processor to redact a portion of the second message.

In some embodiments, the one or more programming instructions that cause the processor to evaluate the status of the triggering condition further cause the processor to determine message information associated with the second message including at least one of symbol, price, and quantity; and compare the message information to the triggering condition.

In some embodiments, the one or more programming instructions further cause the processor to receive third-party market data packets on at least one of the plurality of input ports.

In some embodiments, the one or more programming instructions further cause the processor to receive regulatory information data packets on at least one of the plurality of input ports.

In some embodiments, the first message arrives on the first input port at a detectably simultaneous time as the second message arrives on the second input port; and the one or more arbitration rules include the selection of the first input port and the second input port in a rotating sequence.

In some embodiments, the first message arrives on the first input port at a detectably simultaneous time as the second message arrives on the second input port; and the one or more arbitration rules include the selection of the first input port and the second input according to an arbitration scheme.

In some embodiments, the one or more programming instructions further cause the processor to determine whether the second message is at least one of inauthentic and invalid, wherein the second message is inauthentic if the first message does not contain necessary identifying information that is sufficient to verify an authorized market participant, wherein the second message is invalid if a parameter associated with the first message is outside of a predefined threshold range; and omit, based on the determination, the second message from the sequence of record.

In some embodiments, the identifying information includes a shared secret key generated through at least one of symmetric cryptography and public-key cryptography.

In some embodiments, the identifying information includes an authentication token.

In some embodiments, the system further includes a liquidity tracking unit configured to track aggregate amounts of liquidity of an asset associated with at least one of the first message and the second message.

In some embodiments, the one or more programming instructions further cause the processor to publish hypothetical future market data.

In some embodiments, the one or more programming instructions further cause the processor to generate a new triggered order message, wherein a new triggering condition associated with the new triggered order message is based on the hypothetical future market data.

In some embodiments, the one or more programming instructions that cause the processor to evaluate a status of the triggering condition is further based on a cohosted predictive model.

In some embodiments, a method for managing a plurality of input ports includes receiving, by a processor, a plurality of data packets from a plurality of input ports, includes a first input port and a second input port, wherein a first portion of the plurality of data packets define a first message and a second portion of the plurality of data packets define a second message, wherein the first message is a triggered order message and the second message includes a message type of at least one of an order message, a cancellation message, a triggered order message, or a limit order message; collating, by the processor, the first portion of the plurality of data packets into the first message and the second portion of the plurality of data packets into the second message; sequencing, by the processor, the second message into a sequence of record based on one or more arbitration rules; storing, by the processor, the first message in a triggered order queue, wherein the triggered order queue includes a triggering condition for the first message; evaluating, by the processor, a status of the triggering condition based on at least one of the second message, a received external condition, and historical matching information; entering, by the processor, an underlying order of the first message in the sequence of record based on the evaluation; evaluating, by the processor, using a matching algorithm, orders associated with the first message and the second message based on the sequence of record to generate matching information; and publishing, by the processor, the matching information over a network interface.

In some embodiments, the method further includes publishing, over the network interface, the sequence of record prior to using the matching algorithm.

In some embodiments, the method further includes, omitting the second message from the publication of the sequence of record based on the message type of the second message.

In some embodiments, the second message is a hidden limit order message; and the method further includes storing, by the processor, the hidden limit order message in a hidden limit order queue, wherein the hidden limit order queue includes a triggering condition for the hidden limit order message; evaluating, by the processor, a status of the triggering condition based on at least one of a third message and a change in displayed liquidity associated with the third message; and entering, by the processor, an underlying order of the second message in the sequence of record based on the evaluation.

In some embodiments, publishing the sequence of record further includes redacting a portion of the second message.

In some embodiments, evaluating the status of the triggering condition further includes determining, by the processor, message information associated with the second message including at least one of symbol, price, and quantity; and comparing, by the processor, the message information to the triggering condition.

In some embodiments, the method further includes receiving, by the processor, third-party market data packets on at least one of the plurality of input ports.

In some embodiments, the method further includes receiving, by the processor, regulatory information data packets on at least one of the plurality of input ports.

In some embodiments, the first message arrives on the first input port at a detectably simultaneous time as the second message arrives on the second input port; and the one or more arbitration rules include the selection of the first input port and the second input port in a rotating sequence.

In some embodiments, the first message arrives on the first input port at a detectably simultaneous time as the second message arrives on the second input port; and the one or more arbitration rules include the selection of the first input port and the second input port according to an arbitration scheme.

In some embodiments, the method further includes determining, by the processor, whether the second message is at least one of inauthentic and invalid, wherein the second message is inauthentic if the first message does not contain necessary identifying information that is sufficient to verify an authorized market participant, wherein the second message is invalid if a parameter associated with the first message is outside of a predefined threshold range; and omitting, by the processor, based on the determination, the second message from the sequence of record.

In some embodiments, the identifying information includes a shared secret key generated through at least one of symmetric cryptography and public-key cryptography.

In some embodiments, the identifying information includes an authentication token.

In some embodiments, the method further includes tracking, by the processor, aggregate amounts of liquidity of an asset associated with at least one of the first message and the second message in a liquidity tracking unit.

In some embodiments, the method further includes publishing, by the processor, hypothetical future market data.

In some embodiments, the method further includes generating, by the processor, a new triggered order message, wherein a new triggering condition associated with the new triggered order message is based on the hypothetical future market data.

In some embodiments, evaluating a status of the triggering condition is further based on a cohosted predictive model.

Further features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

FIG. 2B illustrates a data packet example, according to example embodiments of the present disclosure.

Figure 1:
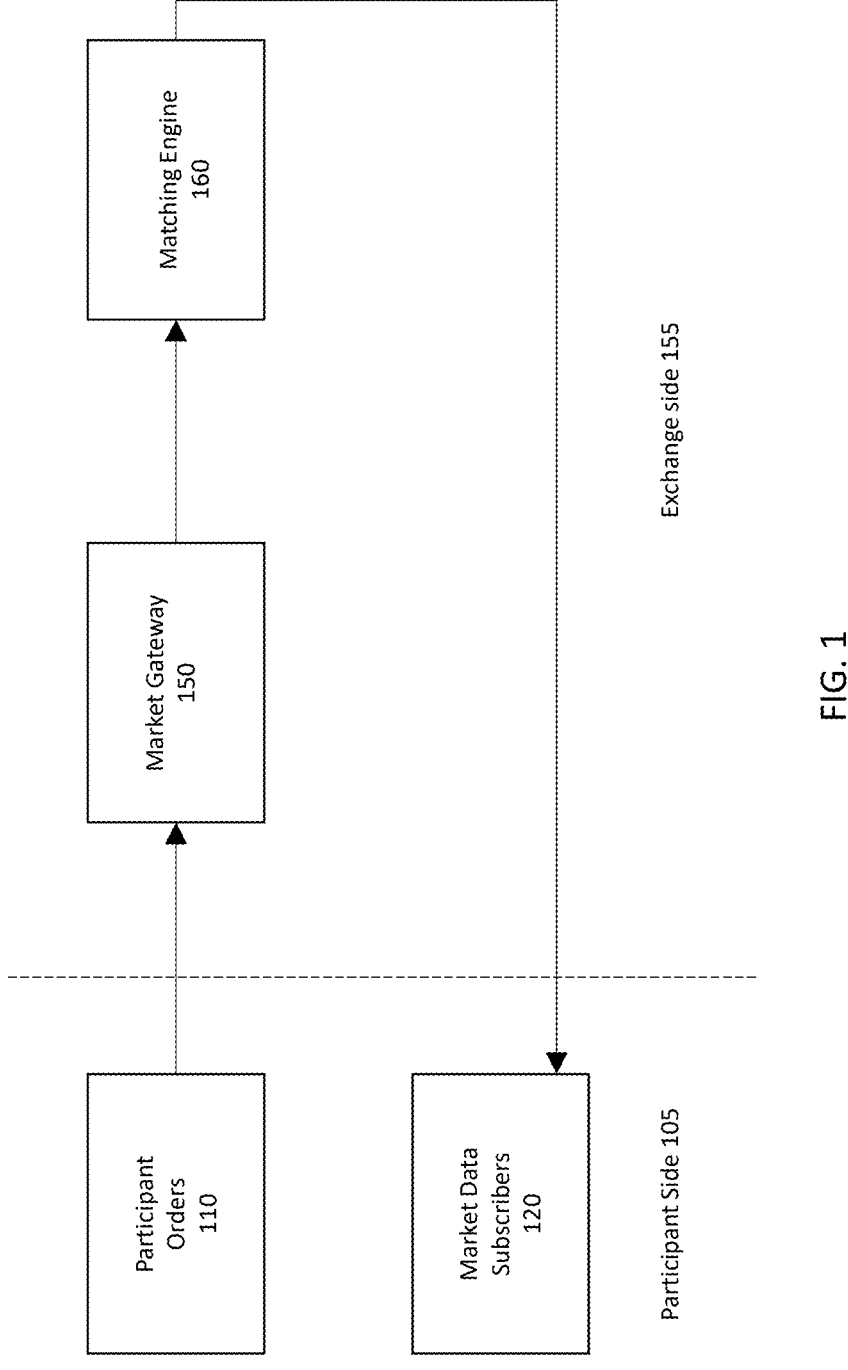
FIG. 1 illustrates a stock exchange and system architecture implementing a matching engine, according to example embodiments of the present disclosure.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

Introduction to Closed Loop Reaction Time Latency

The present disclosure is generally directed to systems and methods for matching orders by observing the sequence of messages received by, accepted by, and modified by an exchange.

Disclosed herein is an architecture that may be realized in software or as hardware, e.g., as a single discrete application-specific integrated circuit (ASIC) hardware device along with necessary software or may be realized as several ASIC hardware devices along with necessary software, or may be realized as an FPGA (field programmable gate array) or several FPGA hardware devices along with software support. A software embodiment may be implemented by a stored program running on a CPU, GPU, TPU, or other computing device capable of executing stored programs, in conjunction with existing networking hardware devices.

In existing exchange architectures, participants may respond to the actions of other market participants when information about those actions is published. We will refer to the information inciting a response as an exogenous event or exogenous information. In certain cases, the publication of that exogenous event or information is delayed by processing internal to the exchange, e.g., delayed by processing in the exchange matching engine. Receipt of the publication of market data information, by market participants that may react on the basis of that information, may be further delayed by the requirement to transmit the information across an electronic network, e.g., incurring delay through networking equipment such as routers and switches and across network cables, across fiber optic cables, or over the air by WiFi, microwave, or other RF transmission. From the time of inception of the exogenous event (the time when some participant takes an action) to the time when another participant responds, there is evidently some amount of time that elapses (it cannot be the case that one participant responds to another without some time elapsing). We will refer to this elapsed time as the closed loop reaction time latency.

Immediate Publication of Market Data

The architecture disclosed herein reduces the total closed loop reaction time latency. The disclosed architecture publishes messages immediately; in specific, the disclosed architecture publishes messages, market data, or market events without unnecessary processing, e.g., without processing by a matching engine. We will refer to this market data, published without incurring the delay and latency of processing in a matching engine, as immediate market data. Such immediate market data may be in a form such that any interested entity (trader, algorithm, etc.) could reconstruct the state of the order book (e.g. by observing that an order or an order cancellation added or removed liquidity at a certain price) and could potentially infer that some order, some orders, some certain specific order, or certain specific orders have matched as trades or that in any case some previously offered quantity may have been traded, executed, or removed. In certain embodiments, participants subscribed to immediate market data may be able to identify which specific resting order (or orders) was (were) matched or removed, e.g., based on the publication of a crossing order or order cancellation, respectively. In certain other embodiments, participants subscribed to the immediate market data may not be able to identify the specific individual orders matched or removed, but may yet be able to identify and reconstruct the aggregated remaining liquidity at a given price point. Immediate market data may have certain information redacted from its upstream originating message, e.g., information that may for any reason need to be kept confidential by the trading venue or may be desired to be kept private by the originating market participant. Redacted information may be removed from a data stream by erasing (e.g., zeroing the data) from a message field, or restructuring the data to a new template (i.e., a privacy template) which does not include certain message fields.

Triggered Orders

Additionally, the architecture described herein may also implement triggered or predicated orders on behalf of any market participant. A triggered order is comprised of an underlying order and a triggering condition or predicate. Upon placement of a triggered order, the underlying order is not immediately placed in force, but rather, it is intended that the underlying order is placed in force after or immediately upon receipt of new information that meets the triggered order condition or predicate. Thus, a placed or in-force triggered order represents the possibility that its underlying order may be placed in-force contingent on the outcome that its triggering condition or predicate is met. Any kind of information, message, market data, or market event that is observed by the system or method implementing triggered orders (whether that information be from a market participant, an external data source, or an exchange internal data source) may trigger or cause to be submitted the underlying order on behalf of a given participant (the submitter of the triggered or predicated order). The underlying order, so submitted (triggered, or placed) is entered into the disclosed architecture for processing and for potential interaction with other orders (where prior to its placement, or prior to the time of it being triggered, it would not be allowed to interact with other participant orders). Such an underlying order, so placed, submitted or triggered, may be serialized into the message sequence processed by the exchange and may be serialized into the message sequence or market data sequence published by the exchange and may also trigger other triggered or predicated orders.

Order Entry Box (OEB)

The architecture disclosed herein implements an electronic trading venue (for electronically traded securities or other assets, e.g., stocks, bonds, futures, options, treasuries, swaps, cryptographic currency, cryptographic tokens, or any other electronically traded asset) with minimal latency reaction time sensitive orders. In certain embodiments, the architecture is described by the name order entry box or OEB. The OEB architecture may reduce the delay between the arrival of a new participant order and its publication to participants as market data. The OEB architecture may, on behalf of all market participants, host triggered orders and/or hidden limit orders. The use of triggered orders may reduce the reaction time delay between the arrival of an exogenous event and a participant's order or order modification in response to that event. The OEB may be realized as a discrete computing platform, for example as logic expressed in a hardware device such as an FPGA or ASIC, or it may be realized as logic expressed in software and any expression, implementation, realization of an OEB may be embedded or imbued in a matching engine. The architecture may further include additional mechanisms, realized as ASIC hardware, FPGA hardware, or software along with other necessary networking devices, that provide support and interfaces to pre-existing exchange and trading system architectures. For example, the architecture described herein may include an additional unit that constructs and publishes book state as top-of-book and depth-of-book market data update messages. The architecture may include an additional unit or units that aggregate and publish the individual orders into a structured order book and an additional unit or units that identify matching orders and publish messages indicating individual trades or aggregated trades (trade summaries), all of which may replace or supplement the function of a matching engine, and these additional units may be referred to as the book-builder and trade-announcer, respectively.

Furthermore, described herein are mechanisms to assist market participants in their usage of the trading technology disclosed herein, and these may be realized in any of the methods disclosed (single or several ASIC devices, single or several FPGA devices, and/or software along with necessary networking devices). In particular, a triggered-order-generator and a triggered-order-management-unit is described herein.

Message Flow Through Design

Certain hardware embodiments may adopt a flow through design where messages are processed without any, or with minimal, queuing delay or processing delay incurred by processing program instructions in sequence. That is, messages flow through the processing pipeline from start to finish and are normally immediately published back to participants, i.e., upon exit from the processing pipeline. In an embodiment, the processing pipeline may be comprised of two stages, the first of which checks the incoming message for validity (e.g., authentication) and the second of which redacts private information. If both such stages are implemented such that a message does not need to be enqueued or otherwise held back, e.g., held back to wait for fetching validation data from memory or e.g., held back for processing sequences of instructions such as by software, then the design is considered fully flow through or back-pressure free. An embodiment that has no backpressure or has minimal backpressure provides the fastest message publication. An embodiment that targets, as a design goal, either no or minimal backpressure is herein referred to as a flow through or pipelined design or embodiment.

Those same certain aspects of this disclosure that may lend themselves to a fully pipelined minimal or backpressure free hardware or hardware/software co-design design, as described previously, need not be implemented in hardware, but the same aspects of the disclosure may provide superior and more efficient implementation in software as processed by a CPU, GPU, TPU or other computing device executing a stored program.

Embodiments described herein, whether an embodiment in software, hardware or both, provide a significant reduction in message processing latency versus existing electronic trading venues based on any of the following: immediate publication of market data, implementation of triggered orders, and flow-through minimal backpressure design.

Embodiments described herein may process incoming orders and messages in a pipelined manner where at each pipeline processing stage, if implemented in a special pur-pose hardware unit or units, the message may be evaluated, altered, modified, or enqueued for a certain amount of time. However, the message may need not be cached in a CPU cache or stored in a separate memory (i.e., distinct from the queuing logic), e.g., in SRAM or DRAM memory. In one embodiment, the published message is effectively the same message as sent by a market participant with the exception that certain identifying information or other security or authenticity sensitive details have been redacted, removed, nulled, or randomized. In some embodiments, the published message may be constructed anew based on inputs such as the input message being processed.

The reduction in latency (i.e., increase in speed and/or throughput) is anticipated to be the same whether the published messages are flowed through or are created as separate and new messages pursuant to inputs. Furthermore, some embodiments may adopt the intermediated or flow-through approach depending on the message or order type being processed or reacted to. The heterogeneous flow-through and intermediated embodiment is expected to achieve the same advantages as all other hardware described herein similarly realized.

Existing electronic financial exchanges (stock exchanges, futures, options, or currency exchanges, exchanges for trad-ing other derivatives, cryptographic currency, or crypto-graphic tokens, etc.) and alternative trading systems (ATSs) may be implemented by a matching engine (ME). Market participants can send orders (e.g., limit orders, marketable limit orders, immediate-or-cancel (IOC) limit or marketable limit orders, order cancellations, and other order types) by electronic message. Those order messages can originate from co-located compute resources, or from remote origins (e.g., from a trading desk at an asset management firm or from a brokerage firm that processes orders on behalf of investors).

FIG. 1 illustrates an electronic trading exchange and system architecture 100 implementing a matching engine.

The electronic trading exchange architecture is often comprised of server compute resources in a datacenter or public or private cloud. Within the stock exchange system architecture 100, the server compute resources are operated by various entities, generally the exchange or trading venue operator (the exchange side 155) and the market participants (the participant side 105). Messages, containing orders, order modifications, order acknowledgements, order fill messages, regulatory information, session information, and other relevant information, are sent between and amongst the various compute resources in the form of network packets. The participant orders 110 and market data sub-scribers 120 are on the participant side 105. The market gateway 150 and matching engine 160 are on the exchange side 155.

The participant orders 110 may be sent first to an exchange cross-connect then to the market gateway 150 and then to the matching engine 160. The matching engine 160 implements a matching protocol (e.g., price-time priority or pro-rata) and publishes market data updates or messages back to the market participants, such as the market data subscribers 120. The published market data messages may include orders or limit orders submitted by market partici-pants, may indicate when orders have matched (i.e., when trades have occurred) and may inform participants about the book state (e.g., aggregated bids and aggregated offers based on all orders submitted by market participants). These so-called book updates may be further subdivided into top-of-book and depth-of-book. The top-of-book represents the aggregated quantity available at the highest bid or lowest ask price for a given venue, or across multiple venues. The top-of-book across all U.S. equity venues is known as the National Best Bid and Offer or NBBO.

Depth-of-book updates publish quantity for sale or offer at prices that are inferior to the best bid or best offer. Published book updates may be generated as a result of participants submitting non-marketable limit orders (i.e., limit orders that have a limit price that will not immediately match against a pre-existing bid or offer) with some time-in-force (e.g., good-for-the-day or good-until-canceled). A trade mes-sage, execution message, match message, or execution sum-mary message, or other similar message in purpose, pub-lished in the market data, may include the traded security or symbol for the security, the matched price (the trade price) and the matched quantity (the trade quantity) and depending on the matching engine protocol, may also include the number of resting orders (orders that that were awaiting execution) filled, or indicate that a complete or partial resting order was filled.

Published market data, which may include book updates (top-of-book, depth-of-book, or both) or other updates such as published limit orders, may indicate the price and quantity (of shares, contracts, options contracts, smart contracts, units of currency, digital tokens, or units of crypto-currency) that a participant is willing to transact: for example, an offer to buy 100 shares of a given tradeable asset with symbol XYZ at price $99.99 or a bid to buy 50 shares of symbol XYZ at price $99.98.

In aggregate, all bids and offers that have been placed and remain in force (whether published or not) form the order book (which may also be referred to as the continuous limit order book). The published bids and offers that have been placed and remain in force form the published, displayed, or visible order book. The top-of-book can be understood as the best bid and the best offer (as determined by the most competitive price bid to buy and price offered to sell) and the respective quantity at the best bid and offer price. For the U.S. regulated National Market System (NMS) stocks, the order book is further aggregated across exchanges to form the national best bid (NBB) and national best offer (NBO) (the NBB and NBO which together comprise the national best bid and offer, the NBBO). Existing exchanges or trading venues or ATSs may publish depth-of-book (also referred to as depth-of-liquidity) updates that show less competitive prices bid or offered.

The price points offered may be referred to as price levels or book levels. The order book can be understood as the top level, and deeper levels, on both the bid and offer (ask) side. Each level can be understood as including a price, an aggregate quantity, and an aggregate number of orders, or alternately, as a queue of orders (by time priority) on the price level, each order with its respective quantity. The time priority for orders on a price level is normally established by the time (or sequence) at (in) which the order was received. The matching engine 160 may publish the top-of-book and depth-of-book information in several ways including as an aggregated level or as individual resting limit orders.

Additionally, the matching engine 160 may keep certain limit orders private (or non-displayed or hidden). Some limit orders may be partially displayed (e.g., a limit order that shows an offer to sell 100 shares, but is privately willing to sell 500 shares). Marketable limit orders may interact with non-displayed (hidden) limit orders, in which case a trade is published. The purpose of hidden or non-displayed liquidity is generally for market participants to attempt to trade at a given price without indicating to other market participants the size (or full size) of their interest in liquidating or acquiring a certain quantity in a position.

Otherwise, if a participant disclosed their intent to buy or sell (a potentially large position), other market participants might react by adjusting their prices in a way that disfavored the participant attempting a large transaction. This is a reflection of supply and demand, where the participant that desires to transact a large quantity either increases demand (and thus raises the market price) or increases the supply (and thus lowers the market price).

Some venues implement so-called speed bumps that artificially delay orders coming in from certain market participants i.e. to allow other participants time to potentially cancel or re-price their orders under certain market conditions. Some venues offer limit orders that automatically reprice according to some criteria, e.g. (but not limited to) an order that is repriced when the NBBO changes.

Some important aspects of the electronic trading venues include the cross connect, the market gateway (or gateway) 150, the matching engine (ME) 160, co-located participant compute resources, and the electronic networking equipment that connects these. In current electronic trading venues, certain market participants may use algorithmic trading strategies that (either by using rules that may be expressed in a manner similar to a triggered order, or by using predictive pricing models, or by a combination or permutation of these mechanisms) automatically submit orders, trades, and order cancellations on their behalf. Those automated trading algorithms may respond to an exogenous event or information by submitting a new order, trade, or order cancellation.

Latency Sensitive Trades in Existing Systems

In response to market conditions and to new information, exogenous or otherwise, different participants may arrive at the same insights and trading decisions through their own independent techniques: algorithmic, rule-based, or otherwise. When submitting an order in response to a new information, the participant that submits their order 110 first is normally the participant that has their order filled (or trading intention otherwise consummated—e.g., there are situations where a participant may desire to cancel a resting order, referred to as a quote, they had previously placed in force because they anticipate prices moving adversely in regard to their quoted price). New information, that may form the basis for a material response, e.g., a new order or cancellation, may arrive in a number of different ways: from the local trading venue, from a different trading venue, from a news feed, from a third-party market data provider, and in general, from any electronic source of information. Based on the same new information, it may be common that different participants arrive at the same market view and react accordingly, whether that be submitting an order 110 that might match to a resting bid or offer, or submitting a cancellation that might cancel a prior quote at a price that would be unfavorable in the anticipated market conditions. If several participants arrive at the same conclusion at the same time, then it may be the case that only some of those participants are able to have their trading intentions fully realized, whether by getting an order filled or by canceling a now stale quote.

Participants sensitive to this dynamic—where submitting orders first, or otherwise quickly, is desirable—are referred to as latency sensitive participants or reaction time sensitive participants. It may be common that such latency sensitive reactions are triggered by trades or orders published within the same (referred to as local) venue. In such a situation, there is a closed loop that is formed by the components: market gateway 150, matching engine 160, co-located compute, and the network. For this loop, a lower bound on the reaction time may be determined as follows: 1) first an event is published by the matching engine 160 and sent by the electronic network to the co-located compute where algorithmic trading strategies may be implemented, 2) some certain trading algorithm consumes the locally generated event and generates a new order or order cancellation, 3) this order or cancel message is sent from the algorithm hosted on the co-located compute by electronic network to the exchange market gateway 150 and then on to the matching engine 160, which closes the loop, and 4) each item in this sequence and each network route has its respective time cost (latency) and together, the sum of these latencies is the lower bound of reaction time in this market.

Minimizing Reaction Time Latency in Existing Systems

Thus, participants are incentivized to minimize their own decision logic latency. Algorithmic trading schemes may be based on very simple rules, e.g., start buying or selling if a different participant is buying or selling, or they may be based on predictive models that attempt to judge the future price or return of a traded security based on certain inputs that may include locally published market data. The time to evaluate a predictive model is normally much higher than the time required to evaluate a simple rule, but the predictive model may yield significantly better trading decisions. For this reason, participants utilizing predictive models may use their predictive model to find rules applicable to the current market inclusive of all information known to the participant.

This process may work as follows: the predictive model is first brought up to date with current market conditions. Next, the predictive model is given a hypothetical event, i.e., an event that may occur but has not yet occurred. The predictive model generates a new prediction under the hypothesis of that event. This prediction may be an indication to buy, sell, or cancel, or a prediction of price or return, or any other kind of prediction. Depending on that prediction, the algorithm may yield an order to buy, sell, or cancel. If the algorithm yields such an order, i.e., in response to that hypothetical event, then a new rule (specific to the current market conditions) was found: if that certain hypothetical event does occur, then send the order (to buy/sell/cancel) that was yielded. The order to buy, sell, or cancel may have certain parameters, e.g., a certain price, quantity, tradeable asset and other parameters as determined by the originating algorithm.

The hypothetical event may be one or several events. Whether starting from a simple rule-based algorithm, or by using a predictive model to find such rules, the result is an order that is predicated on an event, also referred to as a triggered order (TO) or predicated order (PO). Use of a triggered or predicated order can reduce decision logic latency and thus confer a speed or reaction time or latency advantage to participants. In existing trading venues and exchanges, triggered orders are hosted in and on participant compute resources, e.g., in co-located compute resources.

Price Time Matching in Existing Systems

In existing trading venues, exchanges, and alternative trading systems, market data is published by the matching engine 160 which normally implements a certain amount of logic both to publish book updates and to identify and publish or announce trades, executions, or matched orders. That published market data is driven by the incoming stream of participant orders 110 from market participants, but its publication is delayed by processing time incurred in the matching engine 160.

A venue may publish the rules by which matches are assigned. For example, a trading venue may choose to use a price-time priority algorithm. In the price-time priority algorithm, if a new limit order to buy (or sell) has a price that matches, i.e., is equal to or higher (lower) than the lowest offer price (highest bid price) of limit orders resting on the book, then resting limit orders to sell (buy) will match with the new order at their respective best price. The new order that matched with or met the price of a resting limit order is said to have crossed the spread. The order that crossed the spread is also referred to as the aggressing order and the order or orders matched to are referred to as the resting or passive order(s). If the aggressing order is large enough, it may execute by matching against several resting orders. If the aggressing order has a deep enough price, it may match against resting orders on several price levels. Within each price level, the priority in which resting orders are matched is based on the time in which those orders were received by the exchange. Specifically, within a given price level, the resting order that arrived first will be matched first, and the resting order that arrived second will be matched second, and so on. In such exchanges, the matching engine is responsible for implementing this so-called matching algorithm and publishing the results known generally as matches, crosses, executions, or trades.

Inference of Order Matches

Using the published matching rules, any trader, algorithm, interested party, regulatory agency, or other entity could infer either (or both) book state or (and) which orders have matched if they could observe the sequence of messages received by and accepted by the exchange.

For example, if participants could observe the messages, in the same sequence as observed by the exchange or trading venue, then participants could infer the book state and also which orders have matched i.e., which orders have executed against each other.

Data Packet Examples

The systems and methods disclosed herein are used to receive, send, augment, analyze, and handle data packets according to the descriptions disclosed herein. Orders, triggered orders, order cancellations, and other units of actionable trading information or trading system metadata, as described herein, are described in data packets sent encoded by a machine and sent from machine to machine using networking equipment. The data packet describing the order, and the act of sending the order from one machine to another, may be initiated by a person or a machine. Such orders, when received, may be placed in a queue or pipeline for further processing.

The data packet order examples are shown in FIG. 2B. The figure shows the parts of the data packet including the header 290, payload 292, and trailer 294. The header 290 can include routing information, formatting information, and authentication information. The payload 292 can include authentication information and information associated with the order including but not limited to the order symbol, price, order type, book side, limitations, number of shares or quantity, time-in-force, and date. The trailer 294 can include authentication or integrity check data. A plurality of data packets may form a frame. A frame may similarly include a header and a trailer. As described in greater detail herein, messages may be divided across multiple data packets which arrive across the multiple input ports. Individual packets from multiple messages may appear to arrive simultaneously to the systems across the multiple input ports.

Example Data Packet Payloads

The following are illustrative data packet payload examples associated with message types described herein:

| Type | Payload |
|---|---|
| limit order | side, security-id, qty, price, time-in-force, participant-id, participant-auth-data |
| triggered order | predicate, underlying-order |
| predicate | side, predicate-type, qualifier, price-comparison-type, quantity-comparison-type, minimum-qty, maximum-qty, minimum-price, maximum-price, security-id |
| cancellation/size down | participant-id, participant-auth-data, security-id, price, change-in-quantity, is-full-cancel? |
| cancellation/size down | participant-id, participant-auth-data, previous-order-id, price, change-in-quantity, is-full-cancel? |

The data types in the above example data packet payloads may be utilized by the system as follows:

side: A side of the order (i.e., bids/offers or buy/sell).

security-id: A unique identifier for the order.

qty: A quantity associated with the order.

price: A price associated with the order.

time-in-force: A time period the order may remain in-force (e.g., good-for-the-day, good-until-canceled, immediate-or-cancel, and others).

participant-id: A unique identifier associated with the market participant.

participant-auth-data: Authentication information associated with the participant (e.g., a shared key or authentication token).

predicate: A triggering condition for the triggered order.

underlying-order: An associated order to be put in-force in response to the predicate being met. The underlying order may be referenced by an identifier (e.g., security-id) to another message (e.g., a limit order).

predicate-type: A classification of the triggering order as adding or removing liquidity.

qualifier: A qualification of the classification of the triggering order as liquidity removed by size-down or cancel, liquidity removed by order execution, liquidity removed by any means.

price-comparison-type: A qualification on the operation of price comparisons in the predicate evaluator (e.g., absolute value, delta greater than best ask, delta less than best bid).

quantity-comparison-type: A qualification on the operation of quantity comparisons in the predicate evaluator (e.g., total quantity on a price level, change in quantity on a price level).

minimum-qty: A minimum quantity associated with the triggering condition.

maximum-qty: A maximum quantity associated with the triggering condition.

minimum-price: A minimum price associated with the triggering condition.

maximum-price: A maximum price associated with the triggering condition.

Previous-order-id: A reference to a previous order security-id to which the current order is a modification (e.g., a cancellation, size-down, or other modification).

change-in-quantity: A change in quantity associated with a modification to a previous order.

is-full-cancel?: A flag indicating the modification is a cancellation of the entire previous order or entire amount of liquidity posted at the given price, if no previous order-id is given.

The provide data packet payload are only examples. Other data packet payloads are considered. For example, alternatively, the triggered order may fully integrate the data structure of the underlying order or portions thereof (e.g., participant-auth-data).

Minimal Latency Exchange Examples

Figure 2A:
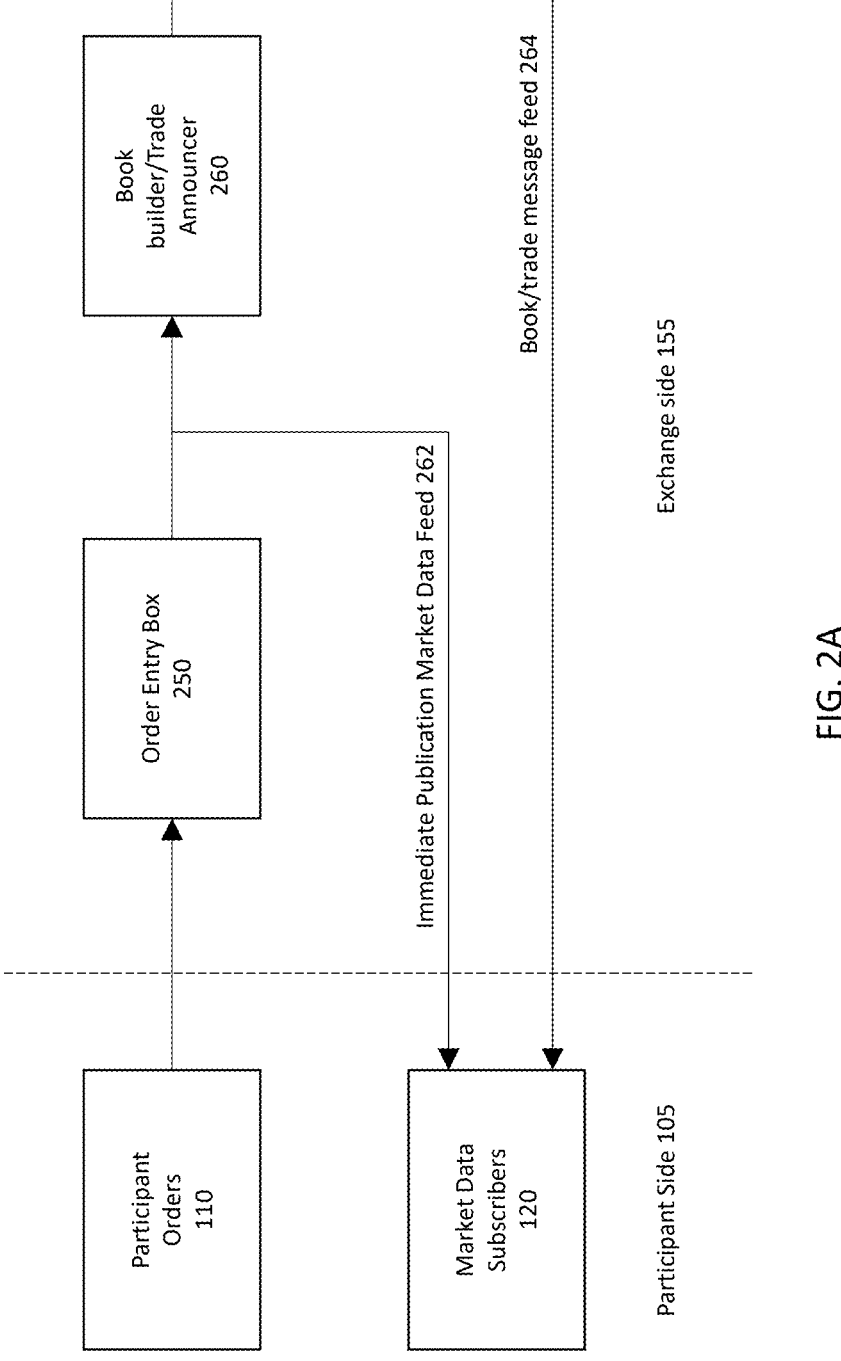
FIG. 2A illustrates a stock exchange and system architecture with minimal latency reaction time, according to example embodiments of the present disclosure.
Figure 2B:
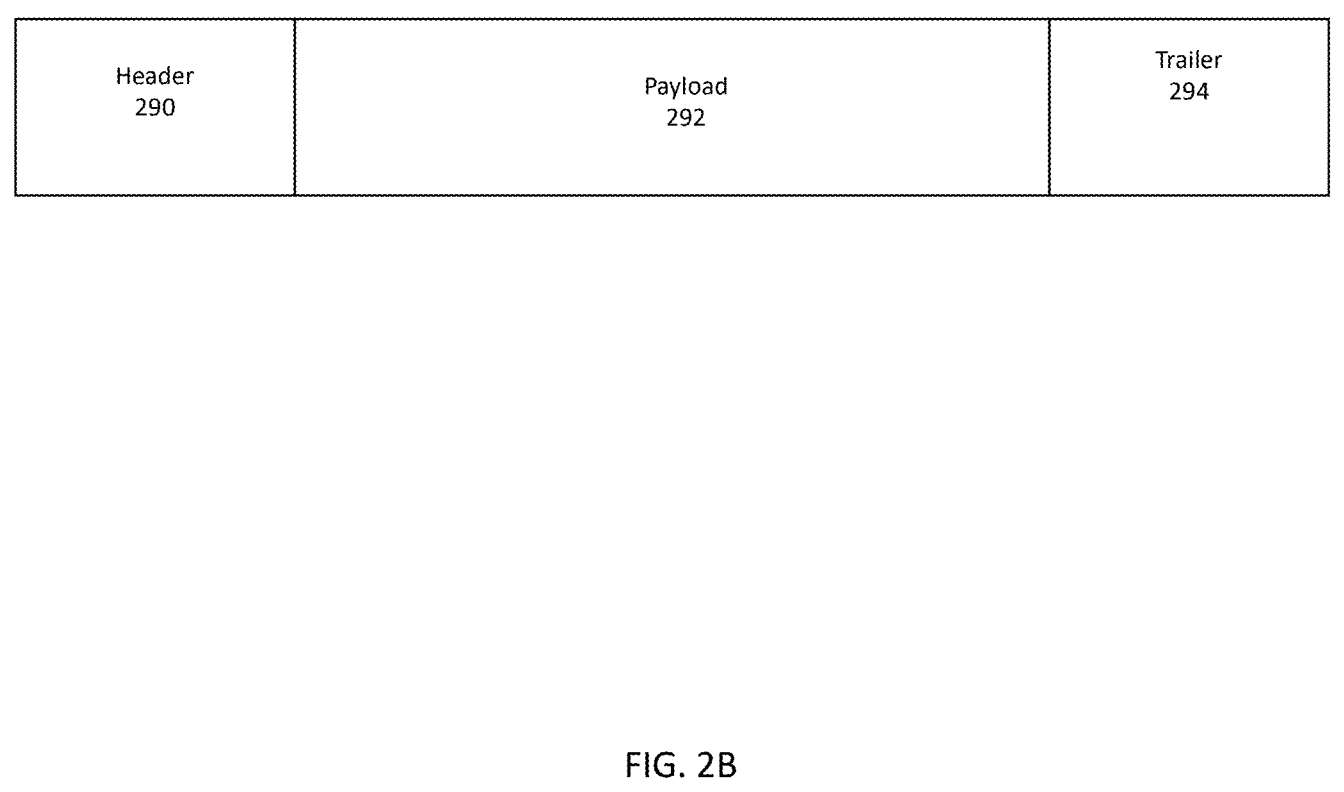

FIG. 2A illustrates an electronic trading exchange and system architecture 200 with minimal latency reaction time, according to example embodiments of the present disclosure.

The electronic trading exchange architecture 200 includes compute resources operated by market participants (the participant side 105) and compute resources operated by the exchange operator (the exchange side 155). The participant orders 110 and market data subscribers 120 are on the participant side 105. The order entry box (OEB) 250 and book builder 260 and trade announcer are on the exchange side 155.

Observation Sequences

The OEB 250 receives, as inputs, participant orders 110 (such as limit orders, marketable limit orders, cancellations, immediate-or-cancel limit or marketable limit orders, other types of orders, and other electronic messages) from market participants and also receives as inputs external programming, information and market data from remote venues or from other OEBs, and information or market data from third party data sources or from regulatory or industry standardized data sources, and receives as an input any other necessary external information. The OEB 250 receives participant orders and other messages, and after forming those into a sequence, processes those participant orders and messages from the aforesaid ordered sequences, each such sequence hereafter referred to as an observation sequence. An observation sequence thus refers to an ordered sequence of network packets, messages, or orders as observed by a system entity, e.g., as an observed by a component of the OEB 250, by a market data subscriber, by the book builder, by the trade announcer, or by another relevant system or method contributing to the implementation of an exchange or trading venue.

Network packets arriving from market participants may not be inherently structured as an observation sequence. In particular, such network packets may arrive on multiple network input ports and some of the packets may appear to arrive simultaneously on different network input ports. Regardless, an observation sequence requires that input network packets, messages, or orders be serialized one after the other according to their time of arrival, and if any of them had apparently arrived simultaneously, requires that a decision be made about which of those is to be serialized first, second, third, and so on. The input observation sequence for the OEB may be constructed by external networking equipment, e.g., by a network switch that can serialize packets from multiple input ports, or by networking equipment integrated into or otherwise incorporated into the OEB.

Thus, a given set of input network packets, e.g., with certain inputs read from the network at the same time on different input ports, may yield different observation sequences depending on the so-called arbitration logic or rules. But, given a certain input observation sequence, will always yield the same consequences when processed by the trading systems disclosed herein, e.g., will yield the same set of matching orders and otherwise dropped, canceled, or inactive orders. This serialized sequence of orders, messages, and programming events 110 from market participants may be recorded for post-session audit and compliance.

Certain embodiments described herein may publish immediate market data such that market data subscribers, market participants, and market observers may infer that orders have executed, traded, or matched, but they may not be able to infer precisely which orders, or which underlying orders, have matched.

The messages published by the OEB 250 may be optionally anonymized, and certain incoming participant orders 110 may optionally be not published (e.g., if invalid, or marked as non-displayed, partially non-displayed, hidden or partially hidden). Other information may be optionally redacted from published messages, e.g., if a particular market participant sends an order with an authentication token, the authentication token may be redacted before the order is published back to all market participants.

A given OEB 250 may process orders and messages for one security or exchange traded financial instrument (e.g., stock shares, future contracts, option contracts, currency, cryptographic currency, tokens, cryptographic tokens, a derivative contract of any of these, or other exchange traded item). Alternately, a given OEB 250 may process participant orders 110 and messages for a plurality of the same. For example, a given OEB 250 may process participant orders 110 and messages for two or more stock symbols, e.g., for AAPL and AMZN. An OEB 250 may process orders and messages for as many different traded instruments as feasible given its design capacity.

The matching algorithm used by the exchange or venue that operates the OEB 250 may be chosen such that it always produces the same results, e.g., the same orders are matched together as executed trades, if a given set of inputs is serialized into a certain observation sequence. That is, the participant orders 110 that are matched and executed (and those that are canceled or otherwise not executed) can be deduced from pairing a particular matching algorithm (or matching rules) with a particular serialized sequence of input orders. For a given trading session, the participant orders 110 that are matched follow as a logical consequence of a particular matching algorithm or matching rule(s) and the sequence of orders and messages that is observed, after being serialized.

The observation sequence of orders and messages may include various types of orders or messages, including but not limited to limit orders, marketable limit orders, market orders, hidden limit orders, non-displayed orders, immediate-or-cancel (IOC) orders, day orders, good-(un)til-canceled (GTC) orders, market-on-open (MOO), limit-on-open (LOO), market-on-close (MOC), limit-on-close (LOC), and other order types that are known but not contemplated in this document, and other order types that may not yet be known or contemplated but that may be congruent to the present disclosure.

The observation sequence may also contain certain messages indicating, e.g., the trading state such as trading enabled or trading disabled or a message indicating the location (and possibly price and quantity, or other details) of the NBB, NBO, or NBBO. The observation sequence may also contain certain messages indicating, e.g., time windows for auction matching protocols, e.g., begin auction or end auction. The matching algorithm or rules may be price time, pro-rata, auction, batch auction, or any known, contemplated, or as yet unknown but congruent to the present disclosure, matching algorithm or rules.

Serialization of input packets, orders, and messages may be accomplished by the OEB 250 or by separate networking equipment. Whether packet, message, or order serialization is implemented by equipment, systems, or methods integrated into the OEB or by an external and separate networking device, system, or method, we will hereafter refer to this functionality and related systems and methods as a network serializer. Succinctly, the network serializer may be integrated into the OEB, or not.

If the network serializer is equipped to receive more than one incoming participant order 110 or message at a time, e.g. if the network serializer provides more than one network input port, device, tap, or connection such that more than a plurality of messages can appear to arrive simultaneously (within some given time window), then network serializer may decide which of a plurality of simultaneously arriving participant orders 110 or messages to be processed first, and which of those to process second or third and so forth. This process of deciding which of the simultaneously arriving inputs goes first is referred to as arbitration and may be implemented by an arbitration algorithm or rule. The network serializer may use any arbitration rule or algorithm, e.g., randomly selecting a particular apparently simultaneous input or using a round-robin selection order. The end result, however, is a sequence that identifies the order in which the inputs are to be processed, namely, the observation sequence.

For example, if two messages "A" & "B" appear to arrive simultaneously (a detectably simultaneous time), e.g., simultaneous to the degree of time resolution that is possible for the OEB 250 or other serialization device, unit, network hardware, router, switch, network card, custom hardware FPGA, custom hardware ASIC, or software, or network processing software, then the arbitration rule(s) is (are) responsible for determining whether "A" or "B" should be processed first. Whichever of "A" or "B" is selected is said to be first in the observation sequence of participant orders 110 and messages.

Serialization may alternately be implemented by routing all input messages and participant orders 110 into the same network device, tap, cable, fiber optic line, or channel, i.e., such that only one message can arrive at a time. Packets, messages, or participant orders 110 that have been serialized may have a timestamp or similar information affixed, added, injected, templated in, or populated. The timestamp, should it be so added to or imbued into the packet, message, or order 110, may be used to determine the observation sequence of packets, messages, and orders 100 should the packets, messages, or orders be available or be published in a different or arbitrary sequence or ordering.

Packets, messages, or participant orders 110 that have been serialized may have a message sequence number, sequence number, or similar additional information, affixed, added, injected, templated in, or populated. The sequence number, should it be so added to or imbued into the packet, message, or order 110, may be used to determine the observation sequence of packets, messages, and orders 110 should the packets, messages, or orders be available or be published in a different or arbitrary sequence or ordering.

The sequence number or timestamp may be generated, created, derived, or chosen by software or hardware running on the OEB, or in the network serializer, or on other compute resources.

Message Identification Tokens

The OEB 250 may add an identification token to any participant order 110 or message that it processes. To do so it may add, affix, inject, populate a template with, or populate a placeholder with, the identifying token to or in the participant order 110 or other message that it processes. The identifying token may uniquely identify within a relevant context that participant order 110 or message. The identifying token may be constructed, generated, chosen, or programmed to uniquely identify the message or participant order 110 globally versus any other possible kind of message or participant order 110, or it may be so generated such that the message or participant order 110 is uniquely identified by the token in conjunction with and along with other relevant information and context such as the calendar date or the specific market data feed or channel in which the participant order 110 is sent, published, or belongs.

The identifying token may be constructed, generated, chosen, or programmed to not reveal any other identifying information about that participant order 110. Thus, the identifying token may be published in or along with the participant order 110 or message when that participant order 110 or message is published to market participants, or other third parties. The token may be constructed, chosen, or programmed to leak no information about who the original market participant was. The identifying tokens may be constructed, generated, chosen, programmed, or otherwise derived by software or hardware that is implemented on the OEB 250 itself, or on or in other software or hardware that is hosted by the venue operating the OEB 250.

An identifying token may be used by a market participant, by the exchange or venue operating the OEB 250, by the OEB 250, or by a third party. For example, a market participant may use the identifying token to reference a specific participant order 110 or message that it had previously submitted or sent if that same market participant later desires to cancel or update their message or participant order 110.

For example, suppose that participant A submits a limit order to the exchange or venue. The OEB 250 may create, choose, generate, or select an identifying token for that order and that token may be generated in a way that does not depend on and is not connectable to participant A. This identifying token may be affixed, added, templated in, populated, or embedded in the participant order 110 when it is published to market participants, or recorded, or sent to another hardware or software operated by the venue, company, or organization operating the OEB 250. The OEB 250, or other exchange hosted hardware or software may send a message (an order acknowledgement message) back to participant A alerting them that their participant order 110 had been assigned that particular identifying token. The order acknowledgement message may be sent in parallel with, or simultaneous to, the publication of immediate market data or the order acknowledgement message may be sent after processing by the book builder, trade announcer, or other later processing step.

Later, if a certain market participant (participant "A") desires to cancel its participant order 110, it could send a cancellation, size-down, or modify message (referred to herein as cancellation messages) directly to the OEB 250 referencing its order by its particular identifying token previously assigned. Alternately, participant A could send a cancellation message to the exchange or venue and identify their order in a different way, and the exchange or venue could look up the identification token on behalf of the participant, and then send the cancellation message, referencing the participant order 110 using the unique identifying token, to the OEB 250.

Book Builder (BB) and Trade Announcer (TA) Functions

The OEB 250 may publish, e.g., to market data subscribers, an immediate publication sequence or immediate publication market data feed 262. The OEB 250 may forward, send, or publish its output observation sequence of participant orders 110 and messages (e.g., the sequence of record) to either (or both) a book builder (BB) or (and) trade announcer (TA) 260. The book builder 260 consumes, ingests, and processes an observation sequence from the OEB 250, from other technology similar in purpose or effect, or from any source of participant orders 110 and messages. The sequence of record may have no information removed, redacted, or anonymized. The book builder 260, pursuant to the messages and participant orders 110 that it consumes and processes, may then publish book updates 264 (top-of-book and depth-of-book publications) for market participants. The book updates so published may be anonymized or have information redacted.

The trade announcer 260 consumes, ingests, and processes an observation sequence from the OEB 250, from other technology similar in purpose or effect, or from any source of participant orders 110 and messages. The trade announcer 260 input observation sequence may have no information removed, redacted, or anonymized. The trade announcer 260, pursuant to the messages and participant orders 110 that it consumes and processes, may then publish trade or match messages for market participants in a market data feed 264. The trades or matches published may be anonymized or have information redacted. The trade announcer may record its output, e.g., a sequence of matched orders constituting trades, for eventual clearing and settlement.

Both the book builder and trade announcer 260 may be implemented in hardware, as special purpose hardware, in FPGA, or in ASIC, and that hardware may require or use additional hosting, programming, or bring up software. Both the book builder and trade announcer 260 may be implemented in software or as software running on one or a plurality of compute resources (CPUs, embedded CPUs, tensor cores, ML cores, tensor processing units, floating point units, graphical processing units, ML processing units, AI processing units, or other stored program/software processing units).

Both the book builder and trade announcer 260 may require, implement, or include network devices (network interface cards or special purpose networking hardware) to consume or ingest participant orders 110 and messages and to publish their pursuant book updates and trade or match messages. Either of the book builder or the trade announcer 260 may be implemented as separate hardware units or on the same hardware resources. As software, they may be implemented as separate software processes or threads, or as the same software process or thread. If implemented as logically distinct or separate entities, they may communicate with each other as necessary.

The messages and publications produced and sent by the book builder 260 may reflect the information and data that it aggregates and collects, e.g. in response to a new consumed and processed limit order: buy 100 shares of XYZ at a price of no more than $200.01 good until canceled, the book builder may publish a depth of book update: book level 3, price $200.01, for symbol XYZ new quantity, 500 new number of orders 8 (e.g. when the quantity on level 3 with price $200.01 was previously 400 and the number of orders was previously 7).

The trade messages or match messages published by the trade announcer 260 may indicate which participant orders 110 have matched or been executed, or may show aggregated values of quantity executed, or both. For example, if one newly ingested limit order crosses the spread and interacts with three resting limit orders on the opposite book side, the trade announcer 260 may send three individual trade, execution, or match messages, or it may send one aggregated trade, execution, or match message that states the entire quantity traded, executed, or matched. The trade announcer 260 may send both styles of trade publication. To produce these trade, execution, or match messages, the trade announcer 260 implements the matching rules associated with the particular security traded as established by the rules, conventions, and relevant regulatory environment (if any) at the trading venue. The trade announcer may also send fill or execution notifications to the individual participants involved in a trade or matched execution. The trade announcer may also record its sequence of matched orders (i.e., trades) in a drop copy format or otherwise send or record that sequence for clearing and settlement.

Fungible Order Matching Protocol (FOMP)

The disclosed architecture may implement a fungible order matching protocol or FOMP. A FOMP decouples immediate publication of market data and market events from eventual order-by-order matching.

With a fungible order matching protocol, order cancellations or quantity size-down modifications need not reference specific prior orders. Rather, any order cancellation for any amount of quantity simply removes liquidity from the book, should the participant that submitted the cancellation still offer any liquidity at the referenced price or referenced price level. Using a FOMP, participants submitting a cancellation may optionally (or may be required to) refer to, reference, or identify a specific order to cancel. Even if the participant refers to a specific prior order to cancel (whether at their option or as required), the venue may, when and if it publishes the cancellation, publish the cancellation as a fungible order or in the fungible order format, e.g., the venue and the apparatuses it operates may redact, remove, or anonymize the order identification token that was used to reference a prior order by the participant submitting the cancellation.

For example, suppose that a participant ("A") has a resting limit order to sell 50 shares of XYZ at price $543.21. That limit order may be at the front of the queue, e.g., have the highest priority, by time priority on its price level, and it may form the top-of-book, e.g., that limit price may be the lowest or best quoted price to sell for that security at the given time. Furthermore, suppose a different participant ("B") has also quoted 50 shares to sell, at the same price of $543.21 (but their quote is second in priority). If a third participant "C" decides to buy 50 shares of XYZ at $543.21 and if, some short amount of time later, participant "A" decides to cancel their quote, the following sequence of events may occur: "C" sends a limit order to buy 50 shares of XYZ at $543.21. This limit order logically interacts with 50 quantity of the available liquidity, but so long as order-by-order matching has not been fully completed, there remains the possibility that "A" can cancel their quote and the match and resulting fill can be re-allocated to participant "B". For the exchange operator using a FOMP, there exists a degree of freedom as to whether order-by-order matching is executed eagerly (such that the window of time wherein "A" can cancel or size-down is minimized) or lazily (such that the window of time wherein "A" can cancel or size-down is maximized). If the trading venue chooses to utilize a lazy FOMP, participants, at their option, can request matches and fills for their specific orders.

Market participants subscribed to the message publications may not know the identities of the respective participants or of the orders underlying the orders published in the fungible format, e.g., if the OEB 250 redacts or anonymizes participant identities and/or redacts any order identification tokens affixed to order cancellation messages submitted. Nevertheless, those market data subscribers 120 may correctly infer that both quotes to sell 50 shares of XYZ at $543.21 had been removed from the book (e.g., one quote removed by matching and one quote removed by cancellation).

Because the specific order identifying tokens may not be present (e.g., may be redacted, removed, nulled, or obscured) in the immediate market data, participants, A, B, and C, from the above example, may not be able to infer based on the immediate publication sequence, which of the previously resting quotes had been canceled and which had been executed. Thus, the book builder or trade announcer may notify the participants involved in the trades, executions, and cancellations of the status of their orders, e.g., when such ambiguity may exist based on immediate market data or in any case. When the OEB 250, the exchange, or trading venue adopts the fungible order message protocol, another unit, potentially the book builder and/or the trader announcer 260, may be used to capture, read, or process all of the original participant orders 110 and messages such that the actual underlying and original orders (potentially inclusive of all order and participant identifying information and tokens) may be correctly attributed, matched, canceled, and/or executed. Final trade settlement and real time execution notification may depend on this additional function being implemented.

Liquidity Tracking Unit Implementation of FOMP

The implementation of a FOMP may be aided by a liquidity tracking unit (LTU) 314. An LTU may be implemented by an OEB or by any other apparatus that may benefit from using a FOMP. A liquidity tracking unit tracks aggregated amounts of liquidity both by underlying asset, book side, and by price level (total aggregate), and tracks aggregated liquidity by underlying asset, book side, price level, and by participant (participant aggregate), but may not track individual orders. An LTU can be used to identify potentially self-matching orders and an LTU can be used to identify cancellations, order modifications, and/or size down requests that target liquidity that has already been removed from the book.

For example, an LTU can accept as an input a given asset symbol, book side (e.g., the bids or the asks), and price level and return, as an output, the total aggregate i.e., the total quantity offered or bid for at that price for that symbol.

For example, an LTU can accept as an input a given asset symbol, book side, price level and participant, and return, as an output, both or either the total aggregate and participant aggregate e.g., the total quantity offered or bid for at that price for that symbol and the quantity offered or bid for by that participant at that price for that symbol.

For example, an LTU may also accept multiple participants as an input and return multiple participant aggregates as an output. And an LTU may optionally return only a participant aggregate or aggregates versus returning that or those along with the total aggregate.

Thus, the LTU can use, as an input, a participant id, an underlying asset symbol, book side, and a price level, e.g., an input such as: "participant A, symbol XYZ, sell at $543.21."

LTU Input Example:

| Asset symbol | Book side | Price level | Participant |
|---|---|---|---|
| XYZ | Sell | $543.21 | A |

Based on that input, the LTU indexes into a certain memory structure using either a software data structure or hardware memory. For example, in software, the various encodings of the input data (e.g., participant id represented in a binary form or in another software accessible representation) can be used to index into various well known software data structures. This process may be referred to as key/value lookup. Such a software data structure may, for example, be constructed as a map or a map of maps, or a dictionary or a dictionary of dictionaries, or as a hash table or as a hash table of hash tables, or some combination of those data structures, or as a database, e.g., an LTU may be implemented in software in any number of generally well-known software key/value implementations. In hardware, the various input data may be used to construct an index into a given memory row or cell wherein the quantity of liquidity corresponding to the input data is stored. The given memory cell may be in an embedded memory such as a block RAM or LUT on an FPGA or in an SRAM on an ASIC or in a DRAM attached to the given hardware implementation of the LTU.

Based on the input, the LTU may provide as an output the total quantity of that underlying asset that has been bid for or offered at the input price level (the total aggregate) and/or the total quantity bid for or offered by the participant or participants identified, at the price level (the participant aggregate or participant aggregates).

For example, suppose participant "A" submits one limit order to sell 10 quantity of XYZ at $543.21 and a second limit order to sell 20 quantity of XYZ at $543.21 and participant "B" submits five individual limit orders, each to sell 100 quantity of XYZ at $543.21.

Limit Orders in Force for LTU Example:

| Participant | Symbol | Side | Quantity | Price |
|---|---|---|---|---|
| A | XYZ | Sell | 10 | $543.21 |
| A | XYZ | Sell | 20 | $543.21 |
| B | XYZ | Sell | 100 | $543.21 |
| B | XYZ | Sell | 100 | $543.21 |

-continued

| Participant | Symbol | Side | Quantity | Price |
|---|---|---|---|---|
| B | XYZ | Sell | 100 | $543.21 |
| B | XYZ | Sell | 100 | $543.21 |
| B | XYZ | Sell | 100 | $543.21 |

For an input of "A, XYZ, Sell, $543.21" (where the input values, by position, are participant, symbol, book side, and price level), the LTU will provide as an output: "30, 530" where the output values, by position, are participant aggregate (liquidity) and total aggregate (liquidity) across all participants.

For an input of "B, XYZ, Sell, $543.21" the LTU will provide as an output: "500, 530" indicating that participant B has offered 500 quantity at price $543.21 and that there are in total (across all participants) 530 quantity at offer for price $543.21.

Values in the LTU may be incremented when participants place new resting limit orders in force and may be decremented when marketable limit orders are processed or when participants cancel previous limit orders.

When a new resting limit order is placed in force, the LTU increments both the total aggregate and the participant aggregate.

When a new marketable limit order is placed in force, the LTU decrements the total aggregate, subject to the following invariant: the amount decremented cannot be more than the total aggregate amount that was bid for or on offer. When a new marketable limit order is placed in force, the LTU may not decrement any participant aggregate because the information about which particular participant order was matched may not be available.

When a new marketable limit order is processed, but before it is placed in force, the information retrieved from an LTU may be used to identify a self-match. For example, if participant "A" had submitted two separate limit orders to sell, in total, a total quantity of 30 of XYZ at price $543.21, and then later, if participant "A" submitted a marketable limit order to buy 50 quantity of XYZ at price $543.21, then the LTU could be used to identify 30 quantity of potentially self-matching executions. The OEB, or other apparatus implementing or otherwise using an LTU could then handle the identified potential self-match in a number of ways. For example, the marketable limit order to buy 50 quantity of XYZ at $543.21 could be dropped or it could be converted into two different orders: one to cancel 30 quantity of XYZ at price $543.21 and one marketable order to buy 20 quantity (the difference between 50 and 30) of XYZ at price $543.21. If any portion (or all) of a marketable limit order is so converted to a cancellation, then the LTU may decrement that participant's aggregate quantity offered or bid for at that price level by the amount of quantity so converted. When a new cancellation, size-down, or modification is processed, but before it is placed in force, or before it is sent to the book builder and/or trade announcer or other processor responsible for order-by-order matching, the information retrieved from an LTU may be used to identify cancellations targeting liquidity already removed from the book. For example, suppose initial conditions are set up according to the example limit orders above, namely that participants "A" and "B" had submitted limit orders such that the total aggregate quantity of XYZ offered for sale at $543.21 is 530. Suppose, next, a marketable limit to buy 520 quantity of XYZ at $543.21 is processed. The LTU state may be as follows:

| Entity | Asset symbol | Book side | Price | Quantity |
|---|---|---|---|---|
| Aggregated | XYZ | Sell | $543.21 | 10 |
| A | XYZ | Sell | $543.21 | 30 |
| B | XYZ | Sell | $543.21 | 500 |

The aggregated remaining quantity of XYZ for sale at $543.21 is 10, but entries for participants A and B may not be updated because the LTU may not be able to track individual orders. Suppose, next, participant A submits a cancellation for 30 quantity of XYZ at $543.21. We note that, and according to information retrieved from the LTU, only 10 quantity of XYZ remains on offer for $543.21. The OEB, or other apparatus implementing or otherwise using an LTU could then handle this information, that the cancellation partially targets liquidity already removed, in a number of ways. For example, the OEB or other apparatus using the LTU, could convert the cancellation into a cancellation for only 10 quantity.

State Synchronization from LTU to Book Builder, Trade Announcer, and/or Matching Engine The output message sequence from an OEB (e.g., the sequence of record) may be sent to a downstream consumer for use as an input. For example, the OEB may send the sequence of record to a book builder, a trade announcer, a matching engine, or another such consumer of its output. This downstream entity, consuming the sequence of record may implement order-by-order matching and may record or publish, or both record and publish, the output of its order-by-order matching algorithm.

The downstream entity that may implement order-by-order matching may need to keep its information and state synchronized with the information stored in and the state of the LTU.

For example, if order-by-order matching is implemented by a trade announcer apparatus (the matching processor) that consumes the sequence of record as its input, before announcing an individual match, the matching processor may need to update the state of the LTU by deducting the quantity matched from a particular participant's aggregate liquidity. The matching processor may use a message sent to the LTU or an API call to an LTU interface for this state update (the match request message or API call). When a match request is received by the LTU, if the participant identified for the match does not have enough or has no remaining liquidity (e.g., because that participant had cancelled some or all the quantity in their bids or offers), then the LTU informs the matching processor using a message or an API call (the partial match or match unavailable message or API call). Then, the order matching processor reallocates the match to the next potentially matching order in its priority queue and sends another match request, as appropriate to the remaining unmatched quantity and the quantity in the next resting order in the priority queue.

Thus, the matching processor may send or invoke a match request to the LTU to attempt to deduct a matched quantity from a particular participant aggregate. The match request is successful if that participant has at least that much quantity remaining. In the case of a successful match request, the participant aggregate is decremented. An unsuccessful match request is any such request where the participant does not have at least that quantity remaining or has no quantity remaining. For an unsuccessful request, if the participant has any remaining quantity, the participant aggregate may be set to zero and a partial match message or API call may be sent or invoked to inform the matching processor of the result;

the partial match may indicate the amount of quantity so matched. If the participant has no remaining quantity, a match unavailable message or API call may be sent or invoked to the matching processor.

For example, consider the following sequence of events: first, participant A submits a resting limit order to sell 50 quantity of symbol ABC at price $123.45. Next participant B submits a resting limit order to sell 75 quantity of symbol ABC at price $123.45. Next participant C submits a marketable limit order to buy 30 quantity of ABC at price $123.45. Next, participant A submits an order to cancel its previously offered 50 quantity of ABC at price $123.45, as shown in the following table.

| Order id | Participant | Order side | Symbol | Quantity | Price |
|---|---|---|---|---|---|
| 1 | A | Sell | ABC | 50 | $123.45 |
| 2 | B | Sell | ABC | 75 | $123.45 |
| 3 | C | Buy | ABC | 30 | $123.45 |
| 4 | A | Cancel offer | ABC | 50 | $123.45 |

If order 4 (to cancel 50 quantity of ABC offered for $123.45) is processed by the LTU before the matching processor can update LTU state, using a match request based on order 3, then the matching processor may reallocate the match for 30 quantity to order 2. If, on the other hand, order 4 is processed by the LTU after the matching processor updated LTU state using a match request (based on order 3), then participant A would have only 20 quantity offered and their cancellation (order 4) would cancel only their remaining 20 quantity.

Thus, when coordinating with an LTU, the trade announcer or device, apparatus, or software, otherwise implementing order-by-order matching (the matching processor), may wait for a successful or partial match response, based on LTU match request, before recording, publishing, or both recording and publishing a particular individual order match. If an unsuccessful update indicates that an incomplete, but non-zero, amount of quantity remained for a participant, then that amount remaining may be allocated to that participant before the matching processor re-allocates the remaining crossing quantity to the next order in its priority sequence. For example, if when seeking to match 50 crossing quantity, the matching processor attempted an update to decrement 50 quantity from participant "X", but the partial match response indicated that X had only "10" quantity remaining, then the matching processor may publish or record, or publish and record, a match for 10 quantity for participant "X" and then reallocate the remaining 40 crossing quantity to the next resting order according to its prioritization scheme.

Allocation for Trade Announcer to LTU Synchronization

The trade announcer, or other similar device, apparatus, or software, implementing order-by-order matching (the matching processor) may do so according to one of several policies. For example, the matching processor may attempt to find matches by immediately sending match requests to the LTU updates upon receipt of a crossing or marketable order. Alternately, the matching processor may only send a match request if a participant indicates that it desires immediate notification of its individual order matches. Such a request for immediate notification of matches may be requested by a participant across an entire trading session or on demand, e.g., by a participant sending a participant match request message to the exchange. Alternately, the matching processor may send match requests only after a price level is no longer the top price level, or by participant request. Evidently, if all liquidity on a given price level is consumed, then match requests may not be necessary because any orders that remain in force must provide the exact amount of quantity that crossed to match. Evidently, the policy wherein the matching processor waits the maximal amount of time before attempting LTU updates gives participants the maximal amount of time in which they may optionally cancel their orders, i.e., even if those orders would have otherwise matched according to their priority within a given price level.

FOMP Implemented Using Fungible Quantized Orders

The OEB 250, or hardware or software that feeds messages or participant orders 110 to the OEB 250, may split participant orders 110 received into separate orders such that the quantity of shares, contracts, tokens, or other traded quantity conforms to a certain minimum and/or maximum quantity determined by the exchange or trading venue implementing the OEB 250 or other technology similar in effect. For example, if the maximum quantity is 1 and an order for 100 shares is received, that participant order 110 may be split into 100 individual orders each with a quantity of 1. If the minimum quantity is 5 and the maximum quantity is 5, then if an order for 100 quantity is received, that order may be split into 20 individual orders each with a quantity of 5.

Implementing such minimum, maximum, or quantity quantization, may reduce the amount of logical inference required to establish the remaining quantity on a particular price level after orders and cancellations interact with that price level. For example, if the quantity for each participant order 110 is required to be exactly 5, then every order on a given price level is, from a market observer's perspective, fungible. Further, using this policy, order cancellations may not need to reference specific orders. For example, if every order has exactly 5 quantity (e.g. 5 shares or 5 contracts), then an order cancellation may cancel any order (versus a specific order) so long as orders remain on that price level.

In one certain embodiment, a fungible order matching protocol results from the exchange or trading venue adopting or implementing a policy that all displayed orders have some certain fixed quantity, regardless of whether each individual order is published in individual messages or messages that aggregate orders together. The policy adopted may be that each order has a quantity of exactly 1. Such participant orders 110 may be published as individual messages, i.e., if a participant sends an order with a quantity of 100, it may be split into individual messages each with quantity of 1 when published to market data subscribers or other exchange participants. Such individual messages, each with the fixed quantity, may leak less information to other market participants about the size of their competitors' orders.

Fixed quantity fungible orders may also be published in messages that aggregate several fungible orders together. The other parameters of a fungible order may vary according to the needs of market participants submitting the orders, e.g., if every fungible order is (by convention) required to have a quantity of 5, there may be multiple fungible orders for symbol XYZ with a quantity of 5 at price $10.00 and multiple other orders for symbol XYZ with a quantity of 5 at price $10.01. The fungible orders are distinct from the underlying orders submitted by market participants, but they effectively represent those orders when they are published. Fungible orders may have information redacted, removed, or anonymized and may have order identifying tokens. Triggered orders and hidden limit orders, when published, may be published or displayed as fungible orders or in fungible order format. The orders underlying the fungible orders may also be published (or not) and may also have information redacted, removed, or anonymized if published or otherwise made visible to third parties.

Such publications (that aggregate several fixed size orders into one message) may reduce the number of messages required to publish the intent of a given participant. For example, if a given participant desires to transact a quantity larger than the fixed fungible quantity set by the fungible order message protocol, then an aggregated message may be used. The fungible order message protocol may adopt a fixed order size (e.g., 1) and a maximum aggregation size (e.g., 5). In an example, an order for a quantity 5 is published in one message and an order for a quantity of 21 is published in 5 messages (4 messages of 5 quantity each and 1 message for the remaining quantity of 1). The aggregation size may be arbitrarily large and the smallest transaction size may be any size down to the minimum transaction size supported by the venue, e.g., a quantity of one normally, but possibly a fractional quantity if fractional quantities are supported by the trading venue or by the underlying asset.

FOMP With Various Matching Algorithms

The fungible order message or matching protocol can be combined with a pro-rata (or other) matching algorithm. Participants subscribed to the fungible order messages as published by the OEB 250 (or similar apparatus) may infer book state according to the messages, e.g., resting limit orders adding quantity, marketable limit orders and cancellations removing quantity. However, the book builder or trader announcer 260 or other post-processing that has access to the underlying order attributes (i.e., the non-fungible attributes, such as participant id, of the underlying the orders that were published as fungible orders) may assign matches according to a pro-rata (or other) matching algorithm and then send fill and execution notifications according to that algorithm.

For example, suppose participant A sends a limit order to sell 10 shares at a certain asking price that forms the best offer level, and next participant B sends a limit order to sell 90 shares at the same price. For example, these orders may be published to market participants as 20 individual limit order messages with 5 quantity each. If next, participant C sends an immediate-or-cancel (IOC) order to buy 10 shares at the asking price, then participants subscribed to the published market data can immediately remove the front 10 orders from their book view. However, according to an implementation of pro-rata matching, in the post trade session or in the trade announcer, 1 of those shares may be assigned to participant A and 9 of those shares to participant B.

Auction matching may be implemented using the fungible order message protocol. For example, the OEB 250 may publish 'begin' and 'end' auction messages. The venue or entity operating or hosting the OEB 250 may send the auction begin and message to the OEB 250 for publication, or the OEB 250 may automatically generate those messages.

During the auction time frame, participants may submit orders and messages that participate in the auction. These orders may include limit orders and market orders. For an opening or closing auction, these orders may be specifically referred to as market-on-open (MOO), market-on-close (MOC), limit-on-open (LOO), and limit-on-close (LOC). The OEB may immediately publish all orders and messages submitted to the auction (e.g., anonymized and potentially in standardized increments of quantity).

At the end of the auction, the orders participating in the auction have been published and participants may infer what orders have matched and at what price using the published auction rules. For example, the market clearing price may be determined by finding the price at which the most quantity will match. Should there be more than one possible market clearing price based on maximizing quantity matched, the market clearing price may be decided in that range of prices by finding the midpoint or by selecting the price that belongs to the book side with a larger unsatisfied quantity (imbalance). Succinctly, participants may be able to determine the quantity (number of shares, contracts, etc.) matched and the market clearing price by pairing the auction rules with the published auction messages.

Some auction participants may desire that their auction orders or messages not be published immediately. The OEB may hold these particular messages in a queue of messages that is not immediately published upon receipt. This queue of messages may be published immediately prior to the end-of-auction message, i.e., such that participants may infer the auction results based on the messages and orders participating in the auction. In one embodiment, the OEB stops accepting auction participating orders (or holds them for the next auction) once the non-displayed/held-back queue starts to get published. In a different embodiment, the OEB may accept new participating auction messages while publishing held back messages.

Some auction participants may desire that their auction orders not be displayed, unless matched in the auction. The OEB 250 may hold these particular messages in the same (or similar) hold-back queue described in the previous paragraph, and then not publish those which will not match in the auction. To facilitate deciding which held-back messages to publish, at the end of an auction, the OEB 250 may utilize a hold-back queue per price level. When the market clearing price and matched quantity is known, the OEB 250 may start publishing held-back orders and messages from the most aggressive price level and publish held-back orders and messages from deeper price levels, finally stopping publication of any non-displayed held-back orders and messages when the matched messages have all been published.

TOQ, TO-IL, HLOQ, and HLO-IL

Figure 3A:
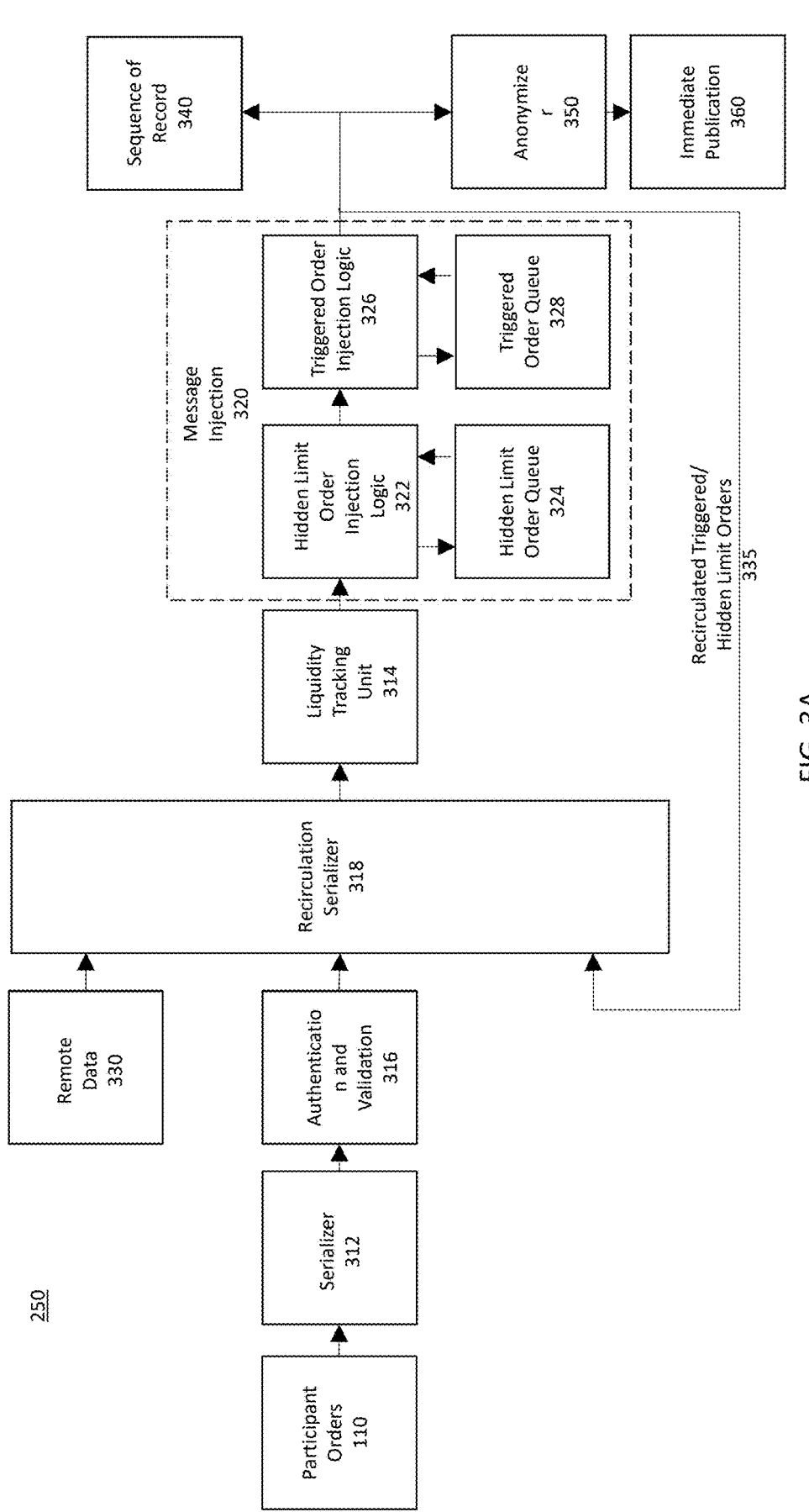
FIG. 3A illustrates an order entry box, according to example embodiments of the present disclosure.
Figure 3B:
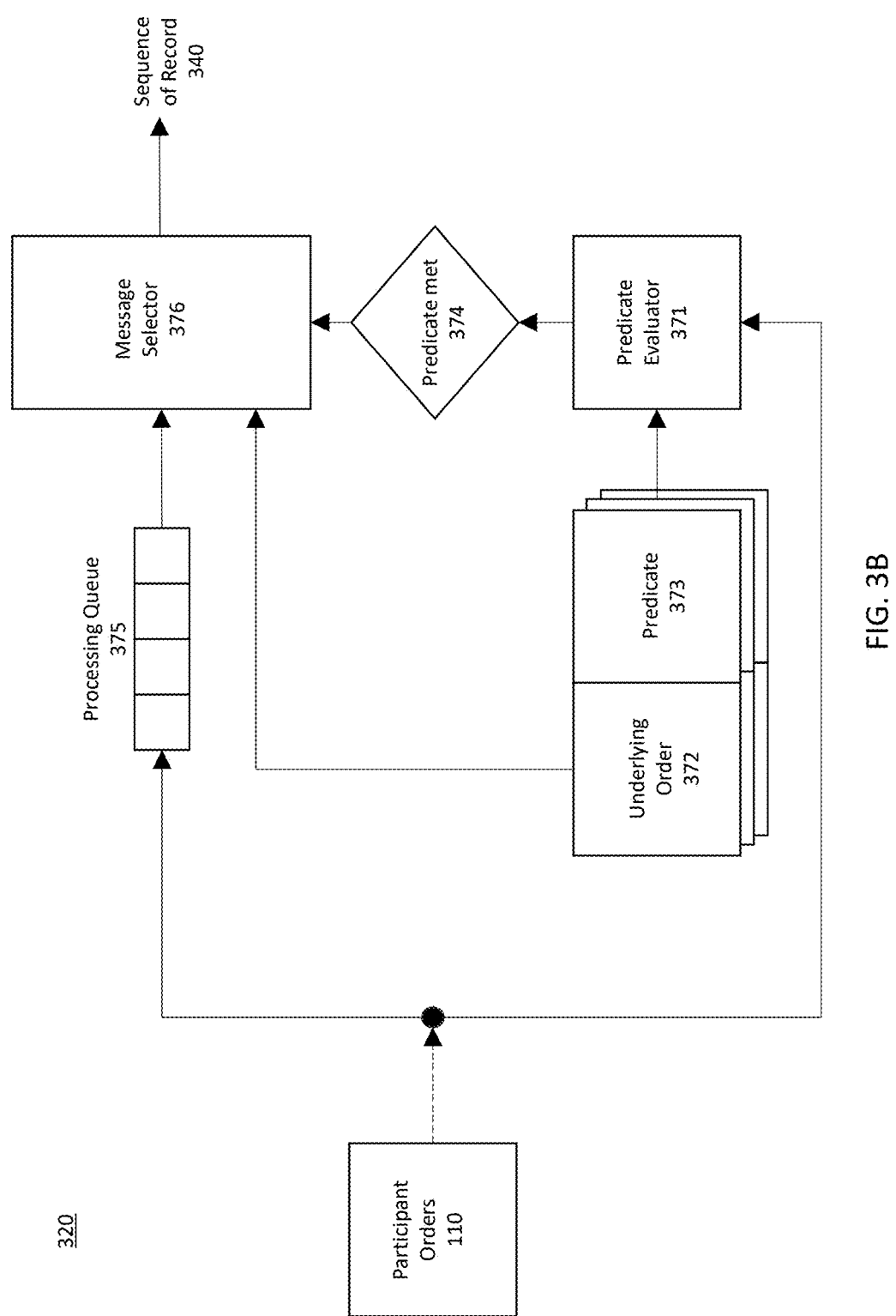
FIG. 3B illustrates message order injection logic, according to example embodiments of the present disclosure.

FIG. 3A illustrates an order entry box 250, according to example embodiments of the present disclosure. FIG. 3B illustrates message order injection 320, according to example embodiments of the present disclosure.

The OEB 250 may employ further elements disclosed herein, specifically the triggered order queue (TOQ) 328, the triggered order injection logic (TO-IL) 326, the hidden limit order queue (HLOQ) 324, and the hidden limit order injection logic (HLO-IL) 322 to implement message injection 320 for triggered orders (TOs) and hidden limit orders (HLOs).

The TOQ 328 implements a method or a system that stores triggered orders on behalf of a plurality of market participants. The TOQ method or system may be implemented in hardware along with necessary programming and hosting software, or as software along with necessary networking equipment. A stored triggered order consists of two parts:

1. An underlying order 372, order cancellation, or other participant message or API call, and 2. A triggering condition or predicate 373.

For example, a stored triggered order may be comprised of an underlying order 372 to buy 100 shares of X at price of up to $100.01 and the triggering condition or predicate 373 that an order to buy A is observed at $49.99 or higher.

A triggered order (TO) may include as its underlying order 372 an order to buy, an order to sell, an order cancellation, an order modification, an order size-down message, another triggered order inclusive of its predicate and underlying order, any other participant programming message, or any other participant API call, that a participant may desire to submit to the exchange upon the basis of the triggering condition or predicate being realized 374, unless noted otherwise.

The TO-IL 326 implements a system or a method that evaluates 371, upon receipt of any new order message, order modify or cancel message, or any other information, the conditions or predicates 373 of triggered orders and pursuant to any such conditions or predicates being met 374, places in-force the underlying order 372 or orders. The TO-IL 326 receives information from various external sources, for example, from the input observation sequence (i.e., the sequence of messages accepted by the trading venue or exchange) or, for example, from a remote market data feed 330 (e.g., prevailing market conditions, market signals, trading signals, market events, market data, other information, or other data that is processed by the OEB 250). Remote market data 330 may be evaluated for authentication and validation 316 and/or injected into the process after authentication and validation 316. That information is compared to the triggering condition or predicate 373 for each input triggered order (TO), and if any triggering condition or predicate is met 374, the TO-IL 326 may place the underlying order 372 from the triggered order into the output observation sequence (i.e., the sequence of record 340), such that the underlying order is placed as an in-force order, message, or API call, to the financial exchange or venue. If multiple triggering conditions 373 are met 347, the TO-IL places in force all of the underlying orders 372 with their conditions so met. The one or more underlying orders 372 may be sequenced by a recirculation serializer 318. The TO-IL 326 method or system may be implemented in hardware along with necessary programming and hosting software, or as software along with necessary networking equipment and interfaces.

Together, the TOQ 328 and TO-IL 326, on behalf of market participants, store triggered orders, evaluate 371 whether triggering events have occurred, and inject the pursuant underlying orders into the sequence of record when triggering events occur. The TOQ 328 and TO-IL 326 may be implemented as hardware, software, or a combination thereof and may be integrated into the OEB 250 or in proximate compute resources or otherwise connected to the OEB 250 or exchange, or venue operating the OEB 250, or other exchange or venue not operating an OEB 250 but implementing triggered orders.

The HLOQ 324 is a mechanism implemented in hardware, or as software along with the necessary networking equipment, that stores hidden limit orders (HLOs) on behalf of market participants. In some existing systems, a hidden limit order is a limit order that rests on the book, i.e., may match against or interact with new marketable orders, IOC orders, or other orders, but is not published to market participants. Such hidden limit orders may have different queue priority than published limit orders. For example, such a hidden limit order may have lower queue priority than a published limit order even if the hidden limit order was submitted to the exchange before the published limit order in the sequence of messages accepted by the venue or exchange.

In some embodiments, hidden limit orders may be implemented using mechanics similar to triggered orders. Specifically, in certain embodiments, a hidden limit order is formed by a hidden limit order message comprising an underlying limit order to be placed in force (published) when remaining visible or published liquidity drops below a certain threshold. The order may be hidden by withholding the publication and placement of its underlying limit order until visible remaining quantity drops below a participant chosen threshold. Thus, the disclosed inventions improve on some systems by providing lower latency, e.g. lower latency to publication of the hidden limit order by displaying the hidden limit order in the immediate publication sequence, and by reducing the amount of compute and logic required in the eventual downstream matching processor, e.g. because the hidden limit order functionality was moved from the trade announcer, book builder, and/or matching processor into the OEB.

The HLO-IL 322 implements a system or a method that evaluates the conditions or predicates that would cause a hidden limit order to be published. The HLO-IL 322 receives information from various external sources, for example, from the input observation sequence (i.e., the sequence of messages accepted by the trading venue or exchange) or, for example, from a liquidity tracking unit (LTU) 314. That information is compared 371 to the triggering condition or predicate 373 for each hidden limit order (HLO), and if any triggering condition or predicate is met 374, the HLO-IL 322 publishes the hidden limit order.

If the HLO-IL 322 observes an event or a condition that would cause one (or several) stored hidden limit orders to be published (e.g., this may happen if an aggressing order depletes some or all of the published or visible liquidity on a certain price level), it may inject that (those) hidden limit orders into the sequence of record and/or into the immediate publication sequence. An injected hidden limit order may be placed in front of the order that triggered its injection in the sequence of record or in the immediate publication sequence, e.g., such that subscribers, listeners, and observers to or of published market data may infer that the hidden limit order (now published) interacted with that triggering order (this is in contrast to the TO-IL which may place any triggered underlying orders, in sequence, after their triggering order or message). The HLO-IL evaluates market conditions that would trigger the injection of a hidden limit order and injects hidden limit orders into the published market data 360. The HLO-IL 322 method or system may be implemented in hardware along with necessary programming and hosting software, or as software along with necessary networking equipment and interfaces.

The TOQ 328, TO-IL 326, HLOQ 324, and HLO-IL 322 may be similar in their implementation details, but differ in the purpose of the messages and participant orders 110 they are meant to inject. The TOQ 328 stores triggered order predicates along with their underlying orders, cancellations, or other participant programming requests or API calls, that react to events, orders, or messages that are placed in force or published, visible to other market participants, or injected into the observation sequence. The HLOQ 324 stores orders that represent hidden (or non-displayed, or dark) liquidity. For participants to infer which other orders have interacted with that hidden liquidity, the HLOs may be published in sequence before the order that it would interact with. Thus, even if the HLOQ & HO-IL 322 have a similar or the same implementation in their respective embodiments, in an embodiment of the entire OEB 250, the HLOQ and HO-IL 322 may inject their stored orders 372 in front of their triggering orders and the TOQ 328 and TO-IL 326 may inject their stored underlying orders 372 behind their triggering orders.

This distinction in sequencing, i.e., that TOs are injected such that they are injected into the sequence of orders and messages after their triggering event and HLOs are injected into the sequence of orders and messages such that their sequence is before their triggering event is not necessary to all embodiments, but is meant to respect current market norms: to respect that the underlying orders in TOs are in response to their triggering event and to respect that hidden limit orders can interact with newly improved prices published by other market participants.

At existing trading venues, HLOs are implemented by matching engines that intermediate between incoming orders and published updates. In existing financial exchanges and electronic trading venues, the matching engine checks both displayed and non-displayed liquidity available, then publishes the resulting execution or trade message and pursuant book updates. Some embodiments disclosed herein improve on prior art by implementing HLOs using order triggering logic, e.g., an HLO that will be published pursuant to and predicated on displayed liquidity dropping below a certain threshold. This partially aligns HLO implementation with TO implementation enabling both to be handled in a similar way. Some embodiments further improve on prior art by enabling HLO implementation outside of a matching engine, e.g., inside of an exchange network gateway or other network attached compute resource that is located between the exchange gateway and matching engine or similar resource.

In some embodiments, the OEB 250 and/or either the HLOQ 324 & HLO-IL 322 and the TOQ 328 & TO-IL 326, may not necessarily intermediate between incoming orders from participants and what is published. Rather, embodiments described herein immediately publish all participant orders 110 with minimal or no queueing or backpressure (optionally dropping invalid or unauthentic orders and optionally redacting private information) and potentially inject HLOs or TOs into the published observation sequence based on the HLO-IL 322 and TO-IL 326. Thus, the HLOQ & HLO-IL 322 and TOQ 328 and TO-IL 326 implement HLOs and TOs in a novel way by injecting their respective orders, cancellations, or other API calls, as published orders, cancellations, or messages, into the sequence of published market data when the HLO or TO has queue priority and a triggering event is observed. This provides a lower latency and faster reaction time on behalf of market participants.

In a certain embodiment, a triggered order, after it is triggered, i.e., after its triggering condition is satisfied, is injected into the observation sequence 340 and published 360 to market participants. When it is published, it may be flagged as an injected triggered order or it may otherwise appear as a normal limit order or other message, e.g., indistinguishable by its information from an order or other message that may have been sent directly from a market participant rather than stored then triggered.

Optionally, in the architecture 300, the triggered orders and hidden limit orders may be recirculated using a recirculating logic 335. Depending on the OEB 250 (or similar apparatus) implementation, triggered orders and hidden limit orders that are triggered, i.e., that are injected into the observation sequence, may trigger other triggered orders or cause other hidden limit orders to be triggered or injected.

For example, suppose that the following two triggered orders (TOs) have been submitted by market participants and admitted or accepted to the exchange for potential submission as an actual in force order.

| ID# | Underlying order | Triggering condition |
|---|---|---|
| TO1 | Buy XYZ, 100 @ $654.32 | Buy XYZ 100+ @ $654.32+ |
| TO2 | Buy XYZ, 100 @ $654.32 | Buy ABC 1+ @ $234.56+ |

The first of these two triggered orders, TO1, has an underlying order to buy 100 shares of XYZ at a limit price of (a price of up to) $654.32 with a triggering condition (or predicate) that an order to buy order 100 (or greater) quantity of XYZ at a price of $654.32 (or higher) is observed. The second of these two triggered orders, TO2, has an underlying order to buy 100 shares of XYZ at a limit price of (a price of up to) $654.32 with a triggering condition (or predicate) that an order to buy (any quantity of) ABC is observed at a limit price of $234.56 or higher. Upon admittance or acceptance to the financial exchange or trading venue, the triggered orders (TO1 and TO2) are stored in the triggered order queue (TOQ 328) or otherwise stored, memorized, or held for continuous evaluation of their predicates and potential submission (i.e., if one of the triggering conditions or predicates is met) as an in force order.

If a limit order to buy ABC for $234.56 is observed, for example if such a limit order is processed, handled, or observed by the OEB 250 (whether implemented in hardware, software, or a hardware/software co-design and whether as implemented as a flow-through or intermediated design), it will satisfy or meet the predicate for triggered order TO2 and cause the underlying order for TO2 to be submitted, placed in force, or serialized into the sequence of record. The underlying order from TO2, upon its publication, placement, or insertion into the sequence of record, meets the triggering condition (or predicate) for TO1. Thus, in certain embodiments of the OEB 250, for example, the publication and placement of the underlying order from TO2 may trigger the publication and placement of the underlying order from TO1.

Certain embodiments are reduced to practice using a flow-through pipelined design approach. Such an embodiment may be implemented by incorporating the following apparatuses into the OEB 250, as a data processing pipeline:
1. A message serialization apparatus 312,
2. A message authentication apparatus 316,
3. Decision logic or message routing logic 320 that injects standard orders into the sequence of record 340 and/or routes new TOs and HLOs to the TOQ 328 and HLOQ 328 (respectively),
4. A TOQ 328 and a TO-IL 326,
5. An HLOQ 324 and an HLO-IL 322,
6. Optionally, recirculation logic 335 for recirculating the underlying orders 372 of triggered orders when their triggering conditions or predicates are met 374 such that they are serialized 318, published, and/or placed in force,
7. Optionally, a liquidity tracking unit (LTU) 314.
8. An anonymizer 350 for removing private data in messages prior to publication 360.
9. An outgoing publication port 360 for publishing or sending the sequence of published and in-force orders and other market events (the immediate publication sequence) to market participants and other market data subscribers.
10. An outgoing publication port 340 for publishing or sending the sequence of record and in-force orders and other market events to the any exchange or venue hosted downstream processing (e.g. to a book builder and/or to a trade announcer and/or to any eventual downstream logic such as an order-by-order matching processor or program, or system or method for implementing a matching algorithm) or to market participants and other market data subscribers.

In the flow-through pipelined embodiment, certain units may, depending on their specific functions and inputs, copy in an unchanged format, the message or input from their input to their output. Alternately, those same units may, depending on their function and their inputs, alter the message flowing through them or inject another message in front of or after the message input.

Any of the forgoing apparatuses (e.g. the initial serialization apparatus 312, or a TO-IL apparatus 326, or other) may be followed by a tap-point which sends the output of the apparatus to be recorded, e.g. recorded as a pcap file or as any other recording format for sequences of packets, messages, or orders, for real-time or post-session audit, for review, for archival, for AI/ML model training or fitting, or for other purpose. Such recordings of sequences of orders or messages, as obtained by tap-points or otherwise, may include timestamps, sequence numbers, or other identifying data or metadata affixed. Recordings of message sequences, as observed by any tap-point, may include certain data that is otherwise redacted in the immediate publication sequence. Such a post-session audit or review may establish that the system has operated as designed and as specified. Such a real-time or post-session audit or review may be used to establish which participants shared in a trade, pro-rata.

Certain embodiments are reduced to practice using an intermediated design approach, in contrast to a flow-through or pipelined design approach. In an intermediated approach, a message or order received from a participant may be held back or stored in memory while processing, program execution, other logic, or other computer software or hardware instructions execute the underlying necessary or optional mechanisms of message authentication, triggered or predicated order lookup and retrieval, triggering condition or predicate evaluation 371, and message or order insertion, publication, or placement upon the realization of any met 374 triggering condition or satisfied predicate. In the intermediated design approach, the eventual messages or orders placed or published, whether substantially the same as the incoming participant message order or resulting from publication or placement of underlying orders from triggered or predicated orders, may be constructed or reconstructed based on program rules and logic, i.e. as compared to a flow-through design where the orders and messages finally so placed or published may be forwarded or modified versions of the same order or message as received from a market participant (with, e.g., certain information redacted for privacy, security, or any other concern and with certain information or metadata added e.g. timestamps or sequence numbers).

Whether the embodiments are realized in a flow-through pipelined design approach, or as an intermediated design, or as a combination of both design styles, and whether the eventual embodiment is realized as in hardware potentially along with necessary hosting software (in ASIC, FPGA, otherwise), in software, or in a hardware/software co-design, the embodiments may realize and provide the same advantages, e.g., reduced latency and increased throughput.

Published Triggered Orders (PTOs)

A triggered order may be published 360 to market participants before its triggering condition is met or before its predicate 373 is satisfied. A triggered order or predicated order so published is referred to herein as a published triggered order or PTO. Such publication of a triggered order may occur in addition to all of the other necessary or optional aspects described herein, e.g., a published triggered order would also be stored in the triggered order queue TOQ 328 along with all other (published or unpublished) triggered orders whose predicates or triggering conditions remain in force but have not yet been met. Unpublished triggered orders, by contrast, are entered into the triggered order queue and their underlying order may only be published when their triggering condition(s) or predicate(s) is (are) met or satisfied. Whether or not a triggered order is published (before its condition or predicate is met or satisfied) may be determined by request from the market participant, by venue or exchange rules, or by external regulatory requirements. Triggered or predicated cancellations or order modifications (i.e., triggered order or predicated orders whose underlying order is a cancellation or order modification) may also be published. A published triggered order, whether its underlying order is an order to buy, sell, cancel a previous order, modify a previous order, or a different programming message or API call, is still referred to, herein, as a published triggered order or PTO. In certain embodiments, participants may indicate, e.g., by setting a value in a field in the triggered order entry message, whether they desire a particular triggered order to be published or not. Published triggered orders (PTOs) may increase market transparency and thereby serve the purpose of providing better, more transparent, and more liquid financial markets.

Triggered Order Time-In-Force Considerations

Triggered orders (TOs) may also include a time-in-force parameter. Any triggered order (TO) with a definite time-in-force that is not eventually triggered, i.e., that never has its triggering condition met or its predicate satisfied, is canceled after its time-in-force expires.

The time-in-force parameter for a triggered order may be any one of a well-known variety of time-in-force parameters or not yet contemplated time-in-force parameters or concepts. For example, a triggered order may have a time-in-force such as good until the end of the day's trading session or good for a set amount of time, e.g., good for one second or good for a certain specified fraction of a second.

The time-in-force for a triggered order is distinct from the time-in-force for its underlying order. For example, a triggered order may have a time-in-force of 5 seconds from the time of its placement and its underlying order may have a time-in-force of immediate-or-cancel.

If a non-published triggered order expires without having its triggering condition met or its predicate satisfied, then that triggered order may, or may not, be revealed to other market participants or market data subscribers. Such an expired non-published triggered order may be known to or revealed to only to the participant that submitted it, to the OEB 250 and to the exchange, ATS, or venue that operates the OEB 250, and to regulatory agencies, if required.

Predicate Evaluators and Accumulated Value Predicates and Conditions

Figure 4:
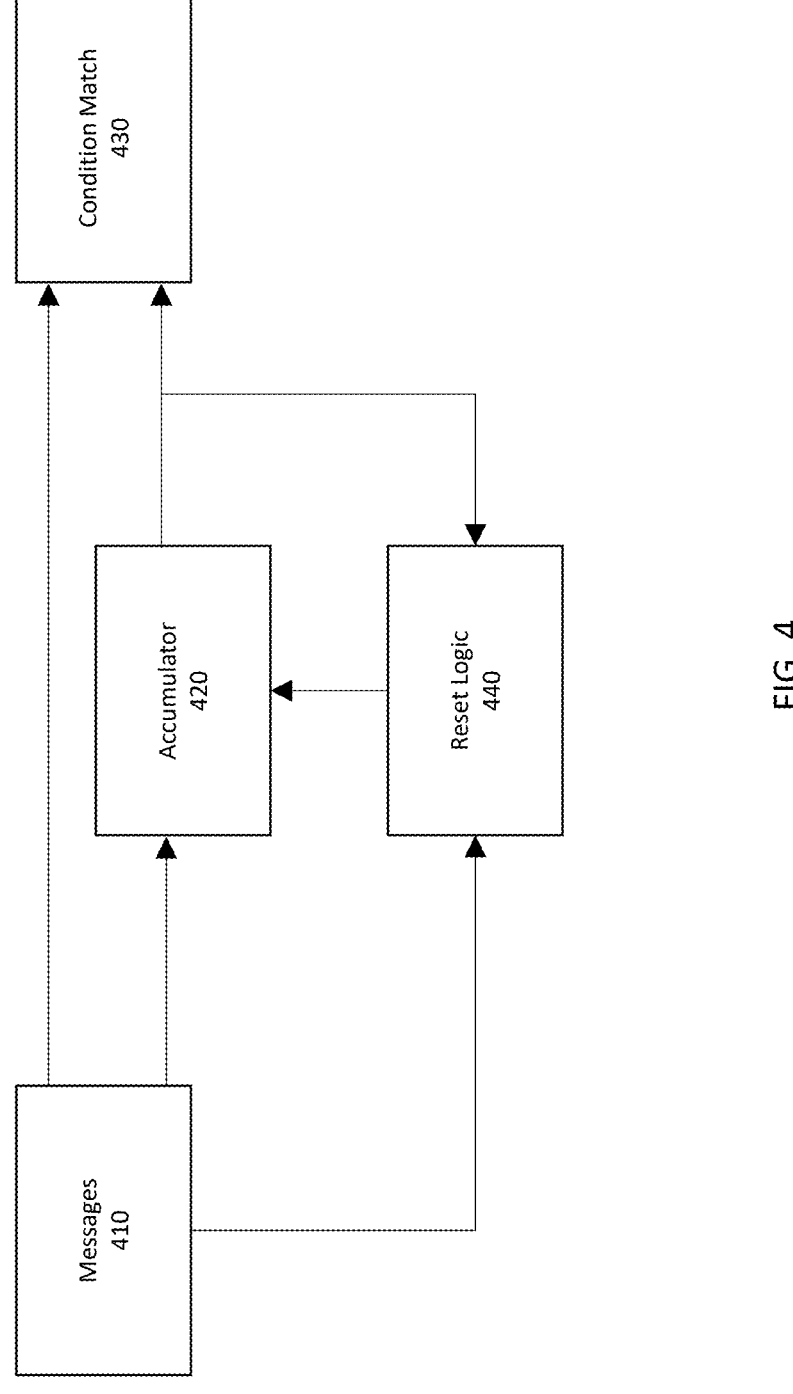
FIG. 4 illustrates a stock exchange and system architecture for a condition evaluator, according to example embodiments of the present disclosure.

FIG. 4 illustrates a financial exchange and system architecture 400 for a condition evaluator, according to certain example embodiments of the present disclosure.

The TOQ 328 and TO-IL 326 and/or the HLOQ 324 and HLO-IL 322 may implement triggering conditions that accumulate information across multiple incoming messages 410 in the system architecture 400. The accumulated information may be valid only within a certain specified time window, or indefinitely. For example, a market participant desiring to utilize such accumulated information in a triggering condition or predicate may submit the following (example) triggered order: buy 100 shares of XYZ at a price of up to $12.34/share with a triggering condition that 50 (or more) shares of XYZ are bought at $12.34 (or higher) within a 5 second window.

| Underlying order | Triggering condition |
| --- | --- |
| Buy XYZ, 100 @ $12.34 | 50+ XYZ @ $12.34+ in a 5 sec. window |

As another example of a triggered order (TO) using a triggering condition or predicate that incorporates information across multiple market events or other messages or data processed by the exchange or trading venue, a participant might submit the following (example) triggered order: buy 100 shares of XYZ at a price of up to $12.34/share with a triggering condition that a 5 second window of 1 second moving average of quantity of ABC matched at $43.21 (or higher) is 50, or greater.

| Underlying order | Triggering condition |
| --- | --- |
| Buy XYZ, 100 @ $12.34 | 5 sec. window of 1 second samples moving average of executions for ABC @ $43.21+ is 50+ |

Information aggregated or accumulated from multiple messages 410, orders, other market events, or data, may be stored, processed, evaluated, aggregated, or otherwise implemented by an accumulator 420. The accumulator 420 may be implemented in specific hardware in various underlying hardware implementations (e.g., ASIC or FPGA) or may be implemented as program code in software. Such accumulated or aggregated values may be stored directly in the accumulator hardware, stored in-line with the triggered order or hidden limit order that references an accumulated value condition or predicate, or stored in a separate memory or software data structure that is indexed according to the needs of the TOs, POs, HLOs, or other orders that reference the accumulated value(s). The accumulator 420 may implement various functions, e.g., simple average, moving average, exponential moving average, minimum, maximum, or percentile, or any other aggregating function or any transformation of information accumulated across multiple messages that are processed by the accumulator.

Thus, in the TOQ 328, TO-IL 326, HLOQ 324, and/or the HLO-IL 322, whether implemented in hardware as an ASIC or FPGA, or in software, in a combination of software and hardware, multiple messages 410 are processed across the architecture 400 and information from a plurality of those messages may be accumulated to be evaluated 430 against certain triggered order conditions or predicates. Furthermore, the accumulated values may be reset under certain circumstances, e.g., by resetting the stored value(s) in the accumulator(s) 420 to zero or to a different given initial or reset value. For example, an accumulated value may be reset according to a certain reset condition such as resetting the accumulated value to zero if more than 10 seconds elapse with no new messages processed.

Other reset conditions are possible, and in general any kind of triggering condition may also be used as a condition to reset an accumulated value. An accumulated value may be reset by the reset logic or reset program code 440 or by directly programming a reset message 410. That programming message 410 may originate from the participant that submitted the order, or the exchange or venue operating the OEB 250, or an authorized third party. Values other than zero may be used on reset.

Various Other Types of Triggering Conditions

Figure 5:
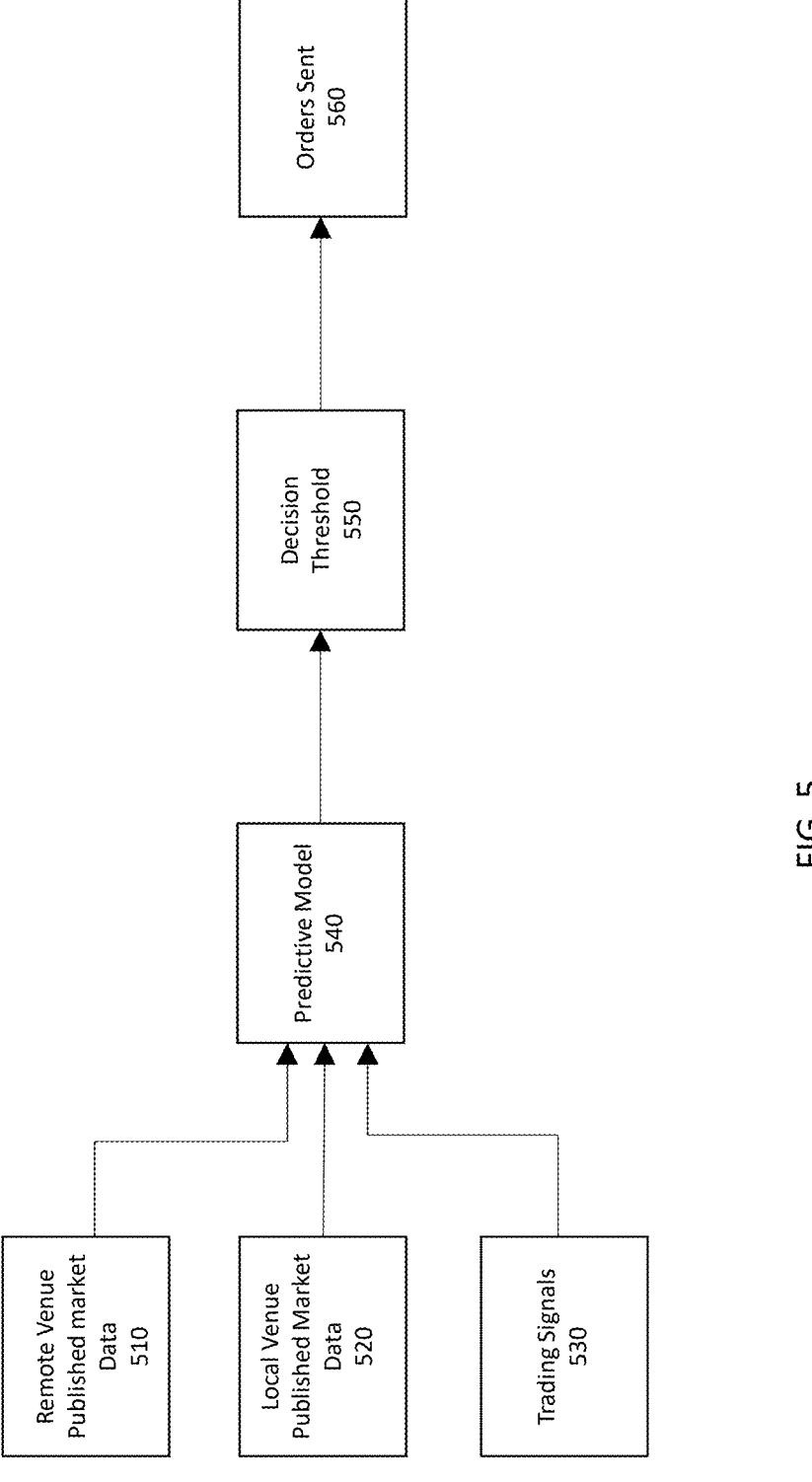
FIG. 5 illustrates a trading algorithm utilizing a predictive model.

The OEB 250 may receive as an input, process as an input, or consume as an input any kind of information that may be encoded into a network packet including but not limited to electronic messages 410 that convey price predictions for certain, or for all, securities or assets traded. Any such information, so received as an input, including price prediction messages 410 may be used as triggering conditions for triggered orders. FIG. 5 depicts a trading algorithm that includes the use of a predictive model. Example predictive models may include linear models, tree models and neural network models. Any predictive model publication or aspect of a predictive model result (whether published to all participants or not published, generated by an algorithm developed by the exchange or venue operating the OEB 250, generated by a publicly or generally known algorithm, or generated by an algorithm developed by a participant or other third party, and computed or implemented on exchange or venue compute resources, participant compute resources, or other third party resources) can be used as a triggering condition or predicate for a triggered or predicated order.

In some embodiments, the exchange or venue operating the OEB 250, or a third party, may implement a predictive model 540 or an algorithm that makes predictions according to certain rules or according to certain so-called trading signals. The resulting prediction may indicate an expectation that the price of a traded asset may go up (or down) in the future. For example, some predictive algorithms may infer that an asset's price is likely to go up if buying activity (the predictive signal) is observed for that asset, or for a correlated or otherwise related asset. The example predictive algorithm may, conversely, infer that an asset's price is likely to go down if selling activity (the predictive signal) is observed. Upon observation of the predictive signal, the predictive algorithm may publish or send 560 the prediction to the OEB based on a decision threshold 550. Alternatively, the predictive algorithm may be embedded in the OEB.

Predictive models may yield results in different forms. For example, a predictive model may yield results in the following set: {no change, price moving up, price moving down}. A predictive model may, alternately, yield a real valued number whose magnitude and sign indicate the size of and direction of expected price change, respectively. A predictive model may, alternately, yield a real valued number whose value is an expected return r where r is defined in terms of the expected price $p_{expected}$ and the current price $p_{current}$ e.g., $r=p_{expected}/p_{current}-1$. A predictive model may, alternately, directly yield the expected future price of the asset. There are evidently other ways, not contemplated herein, to numerically or symbolically express a price, prediction, or predictive model result.

For example, a participant may submit a triggered order using a price prediction in its condition or predicate, e.g., buy 100 shares of XYZ at a limit price (of up to) $24.99/share upon receipt of a price prediction that that price will go up.

| Underlying order | Triggering condition |
| --- | --- |
| Buy XYZ, 100 @ $24.99 | Receipt of prediction price will go up |

For example, a participant may submit a triggered or predicated order using a price prediction in its condition or predicate, e.g., sell 100 shares of ABC at a limit price (down to) $52.01/share upon receipt of a price prediction value of −0.04 or less.

| Underlying order | Triggering condition |
| --- | --- |
| Sell ABC, 100 @ $52.01 | Receipt of prediction -0.04 or less |

The triggering value of "−0.04 or less" may indicate (e.g.) an expectation minus 4 basis points of near-term future return, but may also be in arbitrary units.

The exchange or trading venue operating the OEB 250 may implement a proprietary, publicly known, or open-source predictive algorithm or model. The price predictions may be published to the OEB 250 or to market participants. Those price predictions may be used in the OEB as a condition for triggered orders. Those price predictions may be used by participants as part of their own trading logic or algorithms or models, or may be used by models and algorithms implemented in the triggered order generator.

Market participants or other third parties may implement proprietary, publicly known, or open-source predictive algorithms or models. These price predictions may be published or sent privately to the OEB 250 and they may be used in the same ways as price predictions generated by the exchange or venue. Because a market participant or third party may send a price prediction or any opaque value (wrapped into a triggering message or other message that may be processed by the OEB or by the TO-IL or HLO-IL), a participant's triggered order may trigger on a condition that is opaque, e.g., inscrutable to third parties including the exchange or venue itself.

As an example of an opaque triggering condition, consider the following triggered order: sell 100 shares of XYZ at a limit price (no less than) $88.01/share contingent on receipt of a trigger message.

| Underlying order | Triggering condition |
| --- | --- |
| Sell XYZ, 100 @ $88.01 | Receipt of a trigger message |

A trigger message may optionally include a specific token known only to the participant that submitted the triggered order that must match against the same token value as programmed upon receipt of the original triggered order.

| Underlying order | Triggering condition |
| --- | --- |
| Sell XYZ, 100 @ $88.01 | Receipt of a matching secret token |

A trigger message may also include a rule for the secret token, for example, if the secret token can be interpreted as a real valued number (e.g., as an IEEE floating point value), the triggering condition may be to trigger upon receipt of a certain value, e.g., on value of 0.05 or greater. The secret token and the rule(s) for its interpretation may vary by the capabilities exposed by the OEB and TO-IL or HLO-IL.

| Underlying order | Triggering condition |
| --- | --- |
| Sell XYZ, 100 @ $88.01 | Receipt of a secret token ≥ 0.05 |

The exchange or venue operating the OEB 250, and other participants should they be able to observe the trigger message sent by the participant, may not understand why the trigger message was sent, or be able deduce any further insight from a trigger value or other information encoded in that trigger message.

The TO-IL or HLO-IL may evaluate information, market data, messages, publications, events, or other data that is received from a third party, i.e., that is not published or sent by a market participant, and is not sent, published, generated, or created by the exchange, trading venue, or entity operating the OEB 250 or technology similar in purpose or effect. Such information may include, but is not limited to, published market data from other exchanges and trading venues. Such information may include, but is not limited to, information, market data, events, or data transmitted on data feeds such as the SIP (the securities information processor feed or the consolidated tape) or transmitted on proprietary data feeds. Such information may include, but is not limited to, information about or derived from corporate events or disclosures or other news events. This kind of triggering information or message may include messages that are privately sent between 3$^{rd}$ parties and by or through proprietary market data feeds. Such a third-party message, information, or triggering condition may be sent directly from the third party to the OEB 250 or technology similar in purpose or effect, or may be relayed from a market participant and forwarded to the OEB 250.

Authentication and Anonymization

The OEB 250 may validate 316 incoming orders either for participant identity, or authenticity, or for order validity (e.g., for validity with respect to compliance or other market rules such as margin requirements). Invalid, inauthentic, or otherwise not authorized orders may be marked as invalid, unauthorized, prior to publication or may otherwise not be published. Such orders that are marked as invalid or inauthentic, whether published or dropped, may also be recorded for real-time or post-session audit and review by tap-points previously disclosed and described herein.

The OEB 250 may anonymize 350 orders by removing the identification of the originating participant before publication of the orders. Additionally, the OEB 250 may include, template, affix, inject or add to any order or message 410 that it publishes an attribution that in some way corresponds to the market participant or principal that submitted an order or a message. This attribution may be categorical and may indicate that the market participant is either retail, or professional, or an investment fund. This attribution may be more specific, such as a participant id number, regardless of whether the correlation between participant id number and actual principal participant is publicized or well known.

Regulatory Messages

The OEB 250 may also inject certain other messages into the published observation sequence of messages 410 and into any other recorded sequence of messages. For example, upon receipt of information from an external market data feed, e.g., the SIP, it may inject regulatory and compliance related messages, such as indicators of where the national best bid (NBB) or national best offer (NBO) reside or such as a trading halt message based on (e.g.) a regulatory rule or rules such as the LULD rules, into the immediate publication sequence and/or the sequence of record. The OEB 250 may inject, or have injected, NBO, NBB, or NBBO messages into its output observation sequence. Such additional messages may be used by market participants to infer whether or not nominally matching orders indeed constitute a trade or are otherwise not a trade based on whether the NBO, NBB, or NBBO is local to the venue or at a different remote venue. The OEB 250 may inject, or have injected, a message that indicates a trading halt based on e.g., a limit up/limit down rule (LULD rule) or other compliance or regulatory issue, for example a trading halt based on any other circuit breaker compliance rule.

In some embodiments, injecting a trading halt, an NBB/NBO/NBBO message, or other metadata message or messages into an observation sequence may provide the ability to conform to compliance requirements in various jurisdictions.

Tap Points

The OEB 250 may record or have recorded its sequence of record, its immediate publication sequence, or any other sequence of orders and/or messages from different serialization points within it, for later use or for use in real-time. Any location where a sequence of orders or messages is recorded, or a sequence of messages is sent from for recording, may be referred to as a tap point.

In some embodiments, there may be a tap point that records the serialized sequence of messages received from participants, remote venues, and third-party data sources. In some embodiments, there may be a tap point that records the sequence of messages after the TO-IL 326 and/or after the HLO-IL 322 and/or after any other device, algorithm, or logic that injects messages in a serialized sequence of messages for processing by any component of the OEB 250. Additionally, there may be a tap point after order identification tokens are affixed. There may also be a tap point to record the immediate publication sequence.

Among other uses, the tap points may serve to enable a post-hoc reconstruction or replay of a trading session. A recorded sequence of messages from a tap point may serve to enable post-session settlement, audit or regulatory compliance verification. Sequences of messages from a given tap point may or may not be recorded, may or may not be published, and may or may not be consumed or processed by a different hardware, software, algorithm or device local to the venue or remote and hosted by the venue or third party, as described herein.

Book Builder and Trade Announcer

Figure 6:
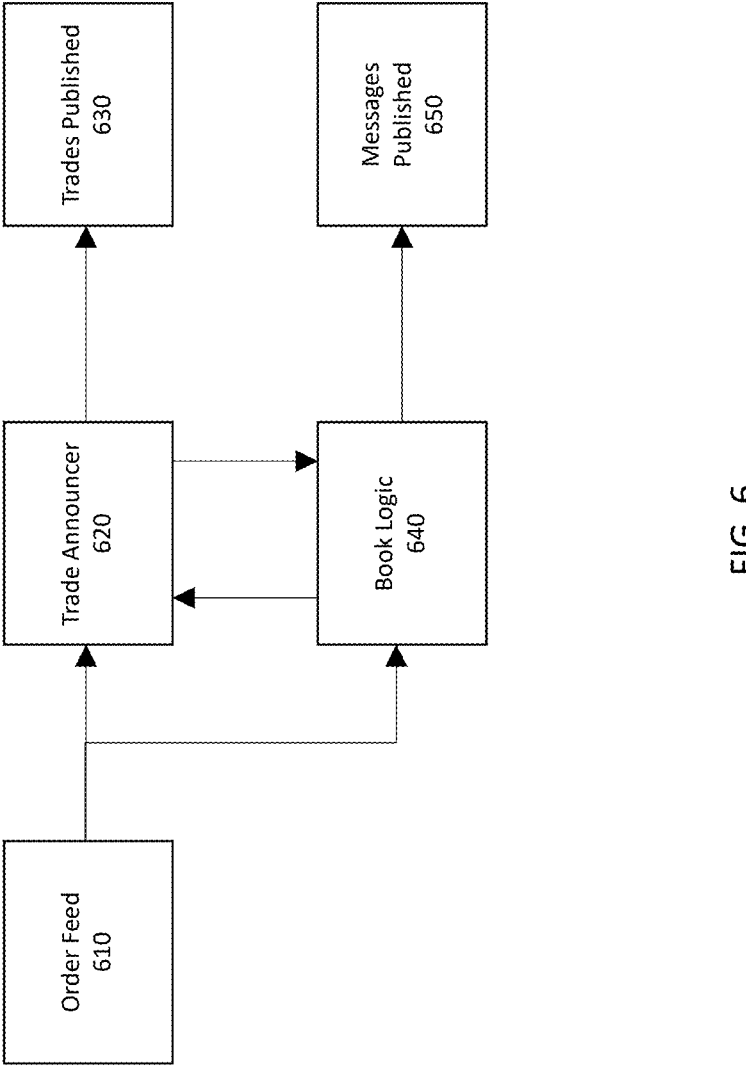
FIG. 6 illustrates a stock exchange and system architecture implementing a book builder and trade announcer, according to example embodiments of the present disclosure.

FIG. 6 illustrates a stock exchange and system architecture 600 implementing a book builder and trade announcer, according to example embodiments of the present disclosure.

The architecture 600 may receive an order feed 610 (e.g., the sequence of record 340). The architecture 600 may include a trade announcer (TA) 620 and a book builder (BB) 640. The OEB 250 may be paired with the book builder and/or trade announcer 620, both described herein. The BB 640 and TA 620 may consume, as input, a sequence of participant orders and other relevant messages (e.g., regulatory trading halt messages, NBBO location messages, etc.). This input sequence of participant orders and other relevant messages may be an output sequence from an OEB 250. The BB and TA 620 may implement systems and methods for book building and order matching logic 640.

The BB 640 may aggregate published limit orders into so-called price levels and then publishes top-of-book and depth-of-book messages for market participants. The BB 640 may publish 650 updates to the book. Although these messages may be redundant to immediate market data, they may be useful for certain market participants that would rather consume aggregated book information as compared to inferring the book state from the sequence of published orders.

The trade announcer 620 may implement matching logic and publish 630 trade messages when orders match. Although this information may be redundant to immediate market data, it may be useful for market participants that would rather consume information about trades or matches directly as compared to inferring that information from immediate market data. The trade announcer may record or cause to be recorded a sequence of matched orders (trades) for post session or real time clearance and settlement. The trade announcer may implement a fungible order matching protocol (FOMP) according to embodiments disclosed herein.

The OEB 250, book builder, and trade announcer 620 may include protocol conversion algorithms or logic, such as book logic 640, to convert their output messages into pre-existing protocols and encodings. For example, any of the embodiments disclosed herein may optionally include an algorithm, hardware logic, software logic, or software program that converts the native OEB 250, BB 640, and TA 620 protocol into the FIX (Financial Information Exchange) protocol.

The BB 640 and TA 620 may require that their input observation sequence include all messages processed by the OEB 250, as opposed to a subset of messages that is published to participants as immediate market data. The BB 640 and TA 620 may require that their input sequence provide messages that are not anonymized or redacted in any way. The messages published by the BB 640 and TA 620, such as top-of-book, depth-of-book, and trade messages, may optionally redact certain information. Such information redacted, cleared, set to zero, or set to an arbitrary or random value by the BB 640 or TA 620 may include, but is not limited to participant identification and participant authentication tokens.

The OEB 250 may not implement order-by-order matching to facilitate faster publication of immediate market data. For this reason, the OEB 250 may publish orders or messages that would otherwise not be published by prior art matching engines, e.g., self-matches and/or cancellations or size-down messages that target liquidity already removed from the book.

The price-time algorithm is the most common matching algorithm currently in use, and it is simple to implement and simple to understand or reason about. In one preferred embodiment of the teachings disclosed herein, the trading venue or exchange adopts the price-time algorithm as its matching algorithm.

Using the price-time matching algorithm, priority for orders at the same price is determined by order arrival time. In some embodiments, an order is said to have arrived earlier than another order if it appears before that other order in the observation sequence, i.e., in the sequence of orders and messages as published by the OEB. In certain embodiments, timestamps are not necessary to determine the before and after relationship of arrival time; only knowledge of the position of the message in the sequence is necessary.

Thus, in certain embodiments, the observation sequence published by the OEB and used as an input to the book builder and trade announcer, determines the priority of all orders.

Triggered and Hidden Limit Order Prioritization

Figure 7:
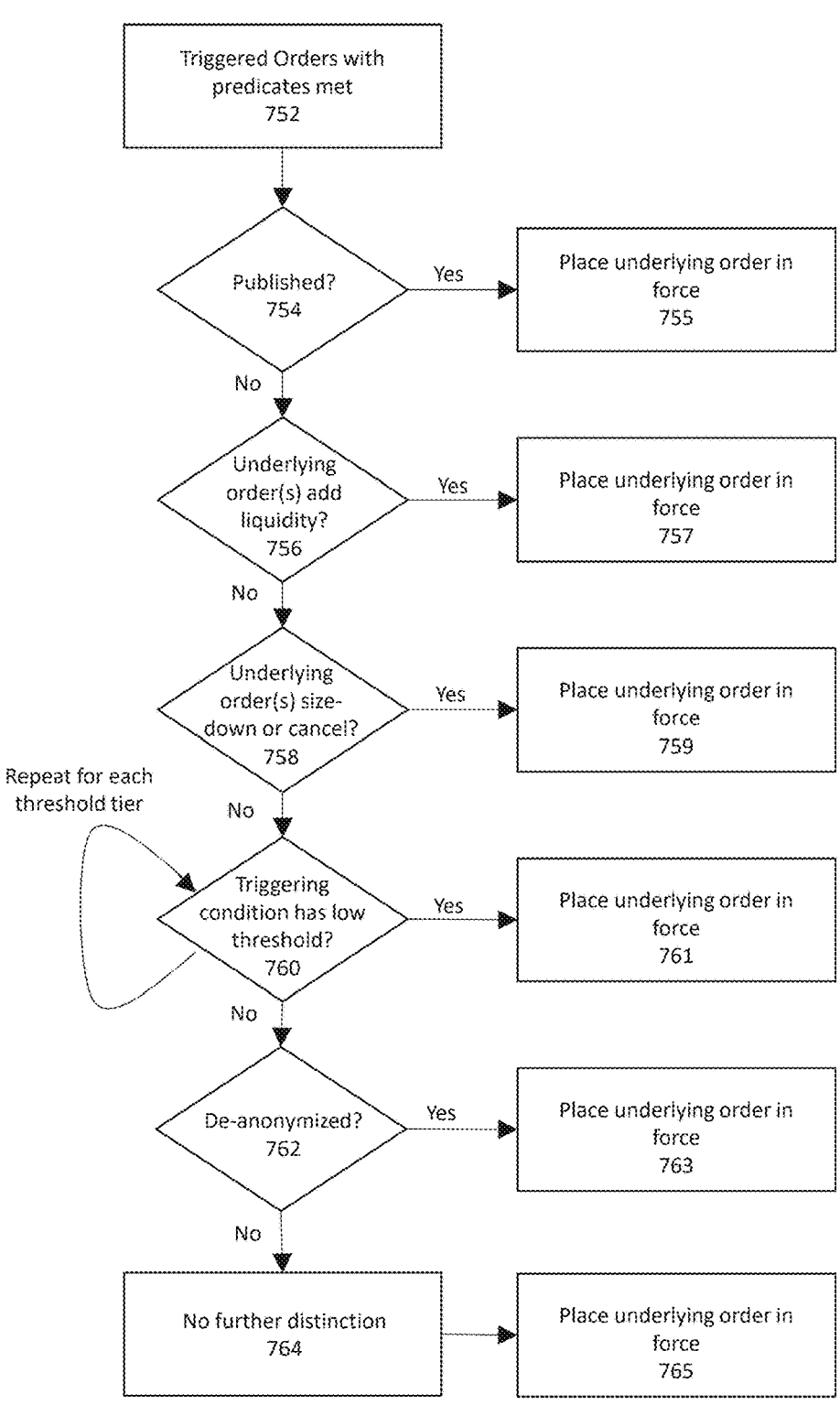
FIG. 7 illustrates a flow chart for a method of prioritization of triggered orders that are triggered off of the same event, according to example embodiments of the present disclosure.

FIG. 7 illustrates a prioritization scheme 750 to prioritize the placement of underlying orders, cancellations, size-downs, messages, or other exchange supported API calls, based on a subset of triggered orders, previously placed, that based on one certain newly processed event, data, or datum have had their conditions or predicates met. The prioritization scheme 750 provides a series of tiers 755/757/759/761/763/765 for prioritizing the placement of an underlying order in-force. If a plurality of orders are triggered on the same tier then the plurality of orders may be sequenced according to one or more arbitration rules. For example, the plurality of orders may be split and interleaved, e.g. the individual orders may be split into smaller orders (otherwise identical) and that plurality of smaller orders may be interleaved such that different participants have their orders placed sequentially, e.g. entered into the sequence of record for evaluation by a matching processor. For example, the orders that are split apart, prior to placement, may be selected for sequential placement into the sequence of record according to a random selection of the participant id, e.g., such that all participants have an equal chance of having their order placed earlier in the sequence. Utilizing split and interleave, participants may share more equitably the trades, cancellations, or queue priority for new resting quotes, that come as a result of the underlying orders so placed. Sharing, according to an event response with an identified basis for that response (the triggering event) compares favorably to existing prioritization, e.g. price-time, for competing orders which, as described herein, is often decided according to a tick-to-trade race.

An order or message, such as immediate-or-cancel (IOC), limit order (LO), hidden limit order (HLO), triggered order (TO) or otherwise, is competing with another order or message if it has the same symbol or underlying asset, the same side (buy or sell), and overlaps in price with that order. Competing orders need not be identical, e.g., other order parameters, including but not limited to quantity, number of shares, or time-in-force, may be different. Additionally, or alternatively, two or more orders may be competing if one of them is a cancellation for a quote previously placed in force and the other(s) are attempting to materially interact (match against) that quote.

In prior art, the priority of competing orders is commonly established by the matching algorithm, e.g., price time. In the case where a certain triggering event triggers a plurality of TOs or HLOs such that multiple competing underlying orders are placed in force (on the basis of that triggering event), there remains the question of how to prioritize those competing orders. The OEB 250 may use time of arrival, referred to as time priority, to prioritize competing TOs, HLOs, and other orders or messages held or stored in the OEB 250. Besides time of arrival, the OEB 250 may use other methods of prioritization for TOs, HLOs, and other orders or messages held or stored in the OEB.

In certain embodiments, the OEB 250 may give priority to the underlying orders for TOs and to HLOs submitted by participants that optionally choose to publish their identity 762 or the identity of the beneficial buyer/seller or both. In certain embodiments, the OEB 250 may also give priority to the underlying orders of TOs that are published 754, e.g., give priority to the underlying orders for published triggered orders or PTOs. In certain embodiments, the OEB 250 may give priority to the underlying orders for TOs if the underlying order is a cancellation or size-down 758. In certain embodiments, the OEB 250 may give priority to the underlying orders for certain TOs if the triggering condition for those has a lower threshold (e.g., assumes more risk) versus other underlying orders that were triggered by the same event, message, market data, or other data processed by the OEB 760. In certain embodiments, the OEB 250 may combine, split, or interleave the underlying orders for multiple TOs or HLOs, if their underlying orders are triggered by the same event, message, market data, or other data processed by the OEB. In certain embodiments, the OEB 250 may give priority to orders based on an incentive arrangement between the participants and the company or organization that operates the OEB 250.

As shown in FIG. 7, The OEB 250 may implement any subset (or none) of these additional prioritization schemes, and if it implements any of them it may be programmed to give priority first to one scheme and then to another. For illustrative purposes and example only, the OEB 250 may give priority to competing the underlying orders in a subset of TOs that have had their triggering condition met based on tiering the aforementioned, and other priority considerations, of which, evidently, there are others, possibly not contemplated herein, e.g., 1. Whether the TO was published 754,
2. If the underlying order adds liquidity 756,
3. If the underlying order is a cancellation or size-down 758,
4. If the TO's triggering condition had a smaller threshold, e.g., smaller required quantity observed to trigger 760,
5. Whether the TO was de-anonymized 762,
6. No further distinction 764.

According to the above example prioritization scheme 750 and for example, if four TOs were triggered on the basis of a given event processed by the TO-IL:

| ID# | Published | Adds liquidity | Cancellation |
|-----|-----------|----------------|--------------|
| TO1 | Yes | No | Yes |
| TO2 | No | Yes | No |
| TO3 | Yes | Yes | No |
| TO4 | Yes | No | No |

In the example, the set of four underlying orders would be published in the following sequence, identified by their TO index number: TO3, TO1, TO4, and last TO2.

Such a tiered priority scheme for the placement of underlying orders of triggered orders may improve market transparency and liquidity. For example, it is expected that for well known triggering moments, participants may reveal their triggered orders to gain priority and thus add transparency to the market by publication of their triggered orders. For example, it is expected that enabling quote cancellation in priority above liquidity taking will enable greater amounts of liquidity quoted at tighter spreads thus improving the market price available to many participants. For example, by assigning priority to responses with lower triggering thresholds, it is expected that proprietary trading strategies will be encouraged to compete on the basis of risk tolerance and market insight thus increasing the velocity of price discovery. Alternative prioritization schemes, for example reordering the tiers disclosed above, may also be considered.

Evidently other priority considerations may be identified. Use of a tiered priority system for the placement of underlying orders of triggered orders improves on prior art by identifying additional considerations, that may improve market liquidity and transparency, that do not exist and cannot be considered in existing exchange systems, e.g. such considerations are absent from price-time matching systems, absent from pro-rata matching systems, absent from auction systems, and generally absent from any existing electronic exchange or trading venue systems.

Triggered orders may have different limit prices, but may be competing for the same opposite side price level. For example, there may be two triggered orders. The first order may be to buy 100 shares of ABC at no more than $50.00/ share with a triggering condition of observing an order with quantity of 10 (or more) crosses to buy ABC. The second order may be to buy 50 shares of ABC at no more than $55.00/share with a triggering condition of observing an order with quantity of 50 (or more) crosses to buy ABC.

| ID# | Underlying order | Triggering condition |
|---|---|---|
| TO1 | Buy XYZ, 100 @ $50.00 | Exec. ABC 10+ @ any price |
| TO2 | Buy XYZ, 50 @ $55.00 | Exec. ABC 50+ @ any price |

The underlying orders for TO1 and TO2 have different limit prices, but could both be triggered simultaneously and could both match at the same price. For example, if the current best offer for ABC is to sell for $50.00/share and then if another order to buy 50 quantity of ABC at $50.00 is observed, then both underlying orders for TO1 and TO2 are triggered and both could match at the price of $50.00/share.

Because both may be triggered and match at the same price, a participant might consider submitting a triggered order with an artificially deeper and better limit price for the purpose of gaining price priority. However, unless the deeper limit price enables price improvement to the quote it interacts with, then the deeper limit price may be immaterial. If price improvement is not enabled, then for the purpose of establishing priority between such competing orders, the OEB 250 may not consider the limit price, and may consider other factors previously disclosed, such as publication, de-anonymization, or risk threshold. Succinctly, the OEB 250 may consider priority between triggered underlying orders at the price at which they would match using any or all of the other possible prioritization schemes.

TO-IL and HO-IL Indexing and Example Memory Implementation

Triggered orders (TOs), hidden limit orders (HLOs), or any other encapsulation of an order may be stored in a memory device by either software, such as stored in a data structure, list, queue, map, hash map, tree, hash tree, pointer, list of pointers, linked list, array, tree, heap, memory region, memory map, or file, or other software realized data structure, or by hardware, such as stored in an SRAM, DRAM, flip flop(s), register(s), latch(es), block RAMs, LUTs, analog memory, or other hardware memory device.

Upon receipt of a new event, message, order, or other information, the OEB 250, TOQ 328, TO-IL 326, HLOQ 324, HLO-IL 322, or other triggered order injection mechanism or necessary program evaluation logic or hardware component may read the triggered orders, predicated orders, hidden limit orders, or other encapsulation of an order, from their respective storage locations one at a time. Upon each read out of a TO or HLO from memory or from storage, it may then be evaluated whether the stored triggering condition or predicate has been met or triggered. This method of reading a relevant set of encapsulated orders to evaluate their triggering conditions or predicates, one at a time, is referred to herein as sequential evaluation.

The subset of such triggered orders that have been triggered may then be stored in a separate storage, written back to the same storage but flagged as triggered, or cleared from memory after their underlying order is placed or published. After finding the subset of triggered orders that have been triggered and are in need of injection to the observation sequence, a sorting mechanism may be used to sort the triggered underlying orders into their priority order. The sorting mechanism may be a software algorithm or a hardware mechanism such as a priority encoder. The sorting mechanism may employ parallelism whether in software, such as multiple threads or processes, or in hardware.

Contrary to the method of sequential evaluation, previously disclosed herein, upon receipt of a new event, message, order, or other information, the OEB 250, TOQ 328, TO-IL 326, HLOQ 324, HLO-IL 322, or other triggered order injection mechanism or necessary program evaluation logic or hardware component, may read the triggered orders, hidden limit orders, or other encapsulation of an order, from their respective storage locations potentially several at a time or in their entirety in one memory access. The triggering conditions or predicates may then be evaluated several at a time or in their entirety by parallel hardware condition or predicate evaluators or by parallel programs whether implemented as processes, threads, or other parallelized software technique. This method of reading a relevant set of encapsulated orders to evaluate their triggering conditions or predicates, several at a time or in their entirety, is referred to herein as parallel evaluation.

After the subset of underlying orders that have been triggered and are in need of injection to the observation sequence is found, that subset orders may be sorted or sequenced using techniques previously disclosed herein.

Triggered orders may be stored in software or hardware storage or memory medium such that their storage locations (whether by memory address or index into a data structure or position in a file or mapped file or by physical location on a hardware memory device) indicate their priority order relative to each other. Thus, the OEB 250, TOQ 328, TO-IL 326, HLOQ 324, HLO-IL 322, or other device, software, hardware, or mechanism that implements triggered order storage, evaluation, and injection, may read the triggered orders from their respective storage locations in a sequence that respects their mutual prioritization.

Using the previously disclosed method of parallel evaluation, more than one triggered order may have its triggering condition or predicate evaluated at the same time. Therefore, the OEB 250, TOQ 328, TO-IL 326, HLOQ 324, HLO-IL 322, or other device, software, hardware, or mechanism that implements triggered order storage, evaluation, and injection, may read more than one triggered order from storage simultaneously, where those triggered orders are stored in their priority sequence. The triggering conditions or predicates of that plurality of triggered orders may then be evaluated several at a time or all simultaneously.

Since the triggered orders are pre-sorted by priority, the mechanisms evaluating their triggering conditions can inject the highest priority of the triggered subset into the message observation sequence, and hold back the remainder of the triggered subset for subsequent injection according to priority. Alternately, the mechanisms may directly enqueue the triggered subset in its correct sequence for injection to the message and order observation sequence. In some embodiments, the mechanisms may directly enqueue or inject only the highest priority triggered, or several with highest priority, order whose triggering condition was met and write back the remainder to their respective storage locations such that the process can be repeated until no remaining triggered orders can possibly have their conditions met.

Upon receipt of a new triggered order (TO) from a market participant, the OEB 250, TOQ 328, TO-IL 326, HLOQ 324, HLO-IL 322, or other software or hardware hosted or operated by the venue, may evaluate that triggered order's prioritization relative to all the other relevant triggered orders currently stored on behalf of market participants. That is, the priority sequence of a newly submitted triggered order may be evaluated relative to all other current triggered orders upon receipt. Once the priority of a newly submitted triggered order is known, that triggered order may be stored in its appropriate location, or its priority index be recorded in an appropriate memory, file, location, or software data structure.

Speed Bumps

A speed bump is a device, hardware, software, algorithm, or storage, that intentionally delays incoming messages. In some embodiments, the speed bump may be implemented as an additional cable run or additional spool of fiber optic cable through which messages must travel or propagate before processing at the exchange. The OEB 250 or the exchange, ATS, or venue operating the OEB 250 or device or apparatus similar in effect of purpose, may optionally implement a speed bump for certain market participants, for certain order or message types, or for certain routes of messages into the exchange or into co-located participant compute resources.

In some embodiments, a speed bump may be inserted in between all communication non-local to the trading venue and all market participant co-located compute resources with direct market access. In further embodiments, the speed bump may mitigate cross-venue latency arbitrage.

The criteria for which orders are routed through a certain speed bump, or no speed bump, may be varied by prevailing market or jurisdiction or needs.

Managed Triggered Orders (MTOs) & Managed Triggered Order Unit (MTOU)

A managed triggered order (MTO) is a triggered order that may be placed or canceled on behalf of a participant by a third party. For example, a managed triggered order may be placed, on behalf of a market participant, by a financial exchange or trading venue that implements the embodiments disclosed herein. The parameters of a managed triggered order may be chosen according to algorithmic rules that are agreed upon between the market participant on whose behalf the order is managed and the third party that manages the order on their behalf. The OEB 250 may optionally be paired with a managed triggered order unit (MTOU). The MTOU is an apparatus implemented in hardware or in software that runs on the same underlying compute resource or device as the OEB 250, or in or on a proximate compute resource or device that is in communication with the OEB. The MTOU generates or manages triggered orders on behalf of market participants.

In some embodiments, e.g., a MTOU may reprice the underlying order of a TO by canceling the TO and resubmitting it (as a new TO) with its underlying limit order updated with a new price. Such automatic repricing may be done according to some criteria such as a trading signal that is published to and consumed by the MTOU.

In some embodiments, a market participant may quote a bid and an offer 840, but may want to cancel out of those quotes under certain conditions that indicate a price movement. The cancellations may be stored as triggered orders, and the trigger condition might be a trigger message from the participant to the triggered order injection logic. Alternately, for example, the triggering condition might be a price prediction published by the trading venue itself. Alternately, for example, the triggering condition may be a market event that indicates potential price movement. Additionally, the participant here contemplated may have placed triggered orders that quote a new bid and a new offer at a new price, contingent on the same, or similar, triggering event that triggered the order cancellation(s). After the old quote(s) is (are) canceled and the new quote(s) published, the MTOU might reload a new set of triggered cancellations and triggered quotes such that the participant always has a fresh quote and set of TOs in place.

Parameterized Triggered Orders and Parameterized Hidden Limit Orders

A parameterized triggered order is a triggered order whose parameters may be dynamically adjusted based on prevailing market conditions, market signals, trading signals, market events, market data, other information, or other data that is processed by the OEB 250. For example, the TOQ 328 or the TO-IL 326 may adjust the parameters of a parameterized triggered order based on any information that they process. Triggered cancellations and hidden limit orders may also be parameterized, i.e., may also have their parameters updated dynamically by the same or similar mechanisms. For example, the HLOQ 324 or the HLO-IL 322 may adjust the parameters of a hidden limit order.

For example, in a certain embodiment, a parameterized triggered order may specify a quantity that may be varied within a range of quantities, or a limit price that may be chosen from within some range of prices. For example, a parameterized triggered order may be to buy up to 100 shares of XYZ, but no more than displayed on the book at $89.99 if an order to buy shares of XYZ is observed at price $89.99 or higher.

| Underlying order | Buy XYZ, <Q> @ $89.99 |
|---|---|
| Parameter <Q> | min(100, displayed liquidity of XYZ) |
| Triggering condition | Buy XYZ, 1+ @ $89.99+ |

Using this example, if the best offer for XYZ is currently 100 shares at $89.99 and a marketable limit order to buy 20 shares at $89.99 is observed, then the parameterized triggered order would be triggered with a quantity of 80 shares, because only 80 shares would remain on the book.

Paired Synthetic Quotes

A paired synthetic quote (PSQ) is formed when a marketable limit order (an order that crosses the spread) interacts with two or more resting limit orders at different price points such that the average price of the trade is advantageous to the participants in the trade. A paired synthetic quote is also formed when a new order, which may not be marketable according to displayed liquidity, interacts with two or more resting hidden limit orders at different price points.

In some embodiments, the PSQ enables trades at sub-tick size resolution. This can provide price improvement to a participant seeking liquidity immediately (e.g., by submitting a marketable limit order) and can provide price priority to participants by enabling them to offer better quoted prices but at less than one pricing tick of price improvement. For example, if the tick-size for a security is $0.01, the PSQ may provide executions or trades at price increments less than $0.01.

A PSQ, which is fundamentally formed by two orders at two different prices, may be described as having two legs where each leg has its respective quantity and price. In this disclosure, we adopt the convention of describing these as a first leg, which sets a base price, and a second leg, which offers some price improvement compared to the base price. The effective price of an executed PSQ will be the average of the two leg prices weighted by their respective leg quantities.

The second leg of the PSQ, that which offers price improvement to the contra-side order, may be non-displayed or not published.

For example, consider a market for a security in which the in-force resting bids and offers are separated by only one price tick. A PSQ may provide a trade with an average price in between the bid and offer price. With an order for 100 shares, if 50 shares execute at the bid price, and 50 shares execute at the ask price, then the order is effectively executed at the mid-price. For a round lot of 100 shares, a PSQ order can synthesize prices at ¹⁄₁₀₀th of the tick-size increment.

A PSQ may be implemented, and may also synthesize sub-tick priced order executions, matches or trades, by pairing a triggered order (TO) with a hidden limit order (HLO). Similarly, a PSQ, offering the same sub-tick pricing, may be implemented by pairing a published or displayed limit order with a hidden limit order. For example, consider a market where the bid price is $99.99, the ask price is $100.00, and the tick size is $0.01. The spread is $0.01 or one tick. A participant wants to submit a new offer to buy (a bid) and to obtain queue priority for that. With a tick size of $0.01, they cannot display a better bid without crossing the spread. Using a PSQ, as implemented by systems and apparatuses disclosed herein, that participant may submit a bid to buy at an effective price of $99.9925. The price of $99.9925 may grant queue priority to the participant's new bid as offered using a PSQ. The PSQ, referenced in this example, may be formed by a displayed offer to buy 75 quantity at $99.99 and a hidden limit order to buy 25 quantity at $100.00. The average price, if the respective displayed order and hidden limit order both execute will be $99.9925. Alternately, the displayed quantity at $99.99 may be 100 with a paired hidden limit order for 25 at $100.00 and a paired cancellation for 25 at $99.99. When the paired orders are injected, they are marked as pre-matched to the order that triggered them.

The second leg of a PSQ may be implemented as a triggered order that is predicated on observing that the first leg of the PSQ interacted with contra-side interest. Triggering logic for the second leg of the PSQ may be implemented in the TO-IL or in the HLO-IL.

Triggered orders, whether published or not, may include a PSQ as their underlying order. That is to say, a triggered order may be used to place a PSQ order. The act of placing a PSQ order necessarily places both legs of the PSQ, and thus if either leg of the PSQ is also a triggered order, then the triggered order which places the PSQ also places one or both legs of the PSQ as triggered orders.

The disclosed embodiments of the OEB, TOQ, TO-IL, HLOQ, HLO-IL, and other affiliated disclosed methods and apparatuses described herein, may implement a method or a system for publishing or disclosing PSQ trades that we refer to herein as automatic PSQ publication. Automatic PSQ publication is implemented by marking or flagging the triggered leg of the PSQ, i.e., the leg of the PSQ that offers price improvement, as pre-matched. This convention of publishing the second leg of a PSQ before its contra-sided order enables participants subscribed to immediate market data to correctly infer that the leg with price improvement matched with its contra-sided triggering order and also enables them to correctly infer the resulting book-state. Alternately, the leg of the PSQ offering price improvement could be published some time before or after along with a reference to its triggering order. Using the reference information, market data subscribers would be able to reconstruct the correct book state.

When the second leg of a PSQ is published, it may include a flag or other digital information identifying it as a PSQ and in addition to its quantity and price, it may include an additional quantity field that specifies how much, if any, of its hidden quantity was already published in the first leg of the PSQ. The purpose of these additional information fields is to enable subscribed participants to infer the correct resulting book state.

Consolidated Triggered Orders

A consolidated triggered order is a triggered order that aggregates the actions, the pursuant orders, or the underlying orders, of more than one triggered order, possibly on behalf of multiple participants. For example, if there are two triggered orders one to buy 100 shares of XYZ and the other to buy 200 shares of XYZ, each with the same triggering condition, those two triggered orders could be consolidated into one triggered order that to buy 300 shares of XYZ pursuant to the shared condition.

An MTOU may be used to generate or place consolidated triggered orders. Should the MTOU consolidate a previously placed triggered order, it may also remove that prior triggered order from the TOQ 328 before or in synchronicity with the placement of the consolidated triggered order.

Final settlement and reconciliation of a consolidated triggered order may be handled according to its underlying constituent orders rather than its apparent form as an aggregated order.

The MTOU, or other technology, software or hardware, that manages or consolidates triggered orders, may notify the BB, TA, other matching processor, or exchange order matching hardware or software, of the orders that have been consolidated. Pursuant to receipt of the information of which constituent triggered orders were consolidated, the BB, TA, or other matching engine or exchange order matching hardware or software may identify and publish specific updates that expose the underlying trades individually and may send order fill and other necessary messages direct to the participants in the trades. The BB and TA or matching engine or other technology that reports trades and/or publishes book updates may alternately listen to or tap the communications and messages that constitute the formation of a consolidated triggered so that it may effectively publish the same updates to all participants and publish or send necessary updates and notifications to participants in the trades.

Collapsed Sequence Triggered Orders

A collapsed sequence triggered order is a triggered order that aggregates actions that logically follow from other triggered orders if they were triggered. For example, if there are two triggered orders to buy or sell or cancel the same underlying security or asset with conditions A and B and if A implies B then their quantities could be aggregated into one triggered order conditioned on A alone. The same reasoning holds for identifying which orders in particular are executed. The BB and TA could publish updates post-hoc and post trade settlement and reconciliation would rely on observing the full sequence of messages into the OEB 250.

Self Match Prevention and Identification

A self-match occurs when a participant submits an order that matches or executes, or may potentially match or execute, against another order that they also submitted. For example, if participant A submits a limit order to sell at $100.00/share and later submits another limit order to buy at $100.00/share, those two orders may match against themselves and constitute a trade, e.g., a trade where the same participant buys and sells to itself. Even if those two orders do not directly match, both may execute during the same timeframe by matching against orders from other participants.

A self-match may be problematic in that it causes the appearance of additional trading activity for a given security or asset when in fact it is a single participant, in effect, trading with itself. Because visible, displayed, or published orders may be anonymized, self matches may be impossible for other participants to identify. Self matches may occur without any malicious intent when, for example, two or more trading desks at the same principal market participant arrive at different views and trade in opposite directions at the same time. Self matches may also occur if a participant wishes to engage in a form of market manipulation and constructs self matches with the express intent to create the appearance of trading activity. Regardless of participant intent, whether innocent and based on views from different desks internal to an organization or malicious, identifying and/or preventing self matches may be desired.

This document herein adopts the convention that a self-match occurs when a participant has two, or more, limit orders in place for the same security with overlapping prices and trading in opposite directions. A self-match, by this definition, does not require that the participant's respective orders match against themselves, rather that their orders could have been matched together if they had both had queue priority at the instant that one of them was matched. For purposes herein, there is no self-match if the resting order or orders had already executed, or if the participant bought and sold at the same price, but at different times and without having contra-sided orders active at the same or overlapping price at the same time.

Exchanges and trading venues may implement self-match identification or self-match prevention. Self-match identification is implemented by identifying self-matching trades either immediately or within a reasonable time frame. Self-match prevention is implemented by disallowing or otherwise preventing self-matching execution and/or the appearance of self-matching execution. Self-match identification and/or prevention may be optional, required, or opt-in depending on the jurisdiction, trading venue, and other rules, laws, and regulations. Self-match identification or prevention may be implemented by publishing corrections, such as messages or orders that correct or inform of corrections to book state, or by publishing messages or orders that identify matches that were also self matches.

The book builder and trade announcer, or OEB 250, or other software or hardware, may implement either post-hoc self-match identification or prevention by consuming as an input an observation sequence from the OEB 250 and running a self-match identification algorithm. Self-match prevention and/or identification may be implemented by the OEB, BB, or TA by implementing an algorithm to identify self matches and then by publishing messages to identify or cancel self matches. In certain embodiments, the OEB 250 may implement self-match prevention using an LTU. In some embodiments, the OEB 250 may not implement immediate publication and thus implement self-match prevention by use of a matching processor implemented in a book builder, trade announcer, or other similarly equipped compute resource.

Comparing Participant Hosted and Exchange Hosted Triggered Orders

Figure 9:
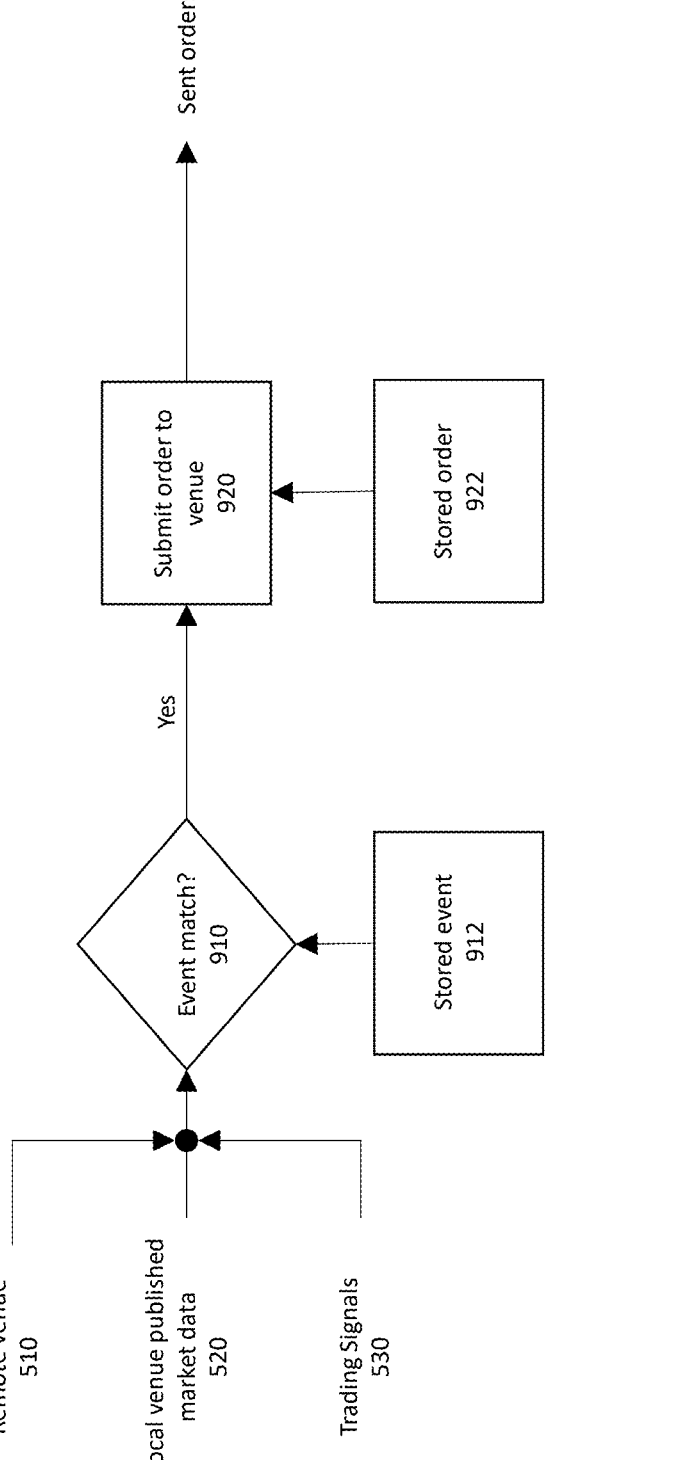
FIG. 9 illustrates a flow chart for an algorithm for participant hosted event/order pair evaluation according to example embodiments of the present disclosure.

FIG. 9 depicts a flow chart illustrating an algorithm 900 for participant hosted triggered order or event/order pair evaluation (triggered order evaluation). The algorithm, so depicted, is operated by a given market participant on a compute resource that is distinct from the exchange or trading venue compute resources or matching systems. Events of various types (e.g., local 520 or remote 510 market data events, corporate actions and reports, trading or price model predictions or results, other trading signals 530, or other information) are input into an event matcher or condition evaluator 910. If the event matcher 910 matches, in some capacity (e.g., matches an individual event or matches a group of events) a stored event 912 (or event group) to the live or real time event (or group of events) from the information sources 510, 520, or 530, the algorithm 900 proceeds. In the event of a match ("yes"), an associated stored order 922 is submitted 920 to the venue.

Figure 10:
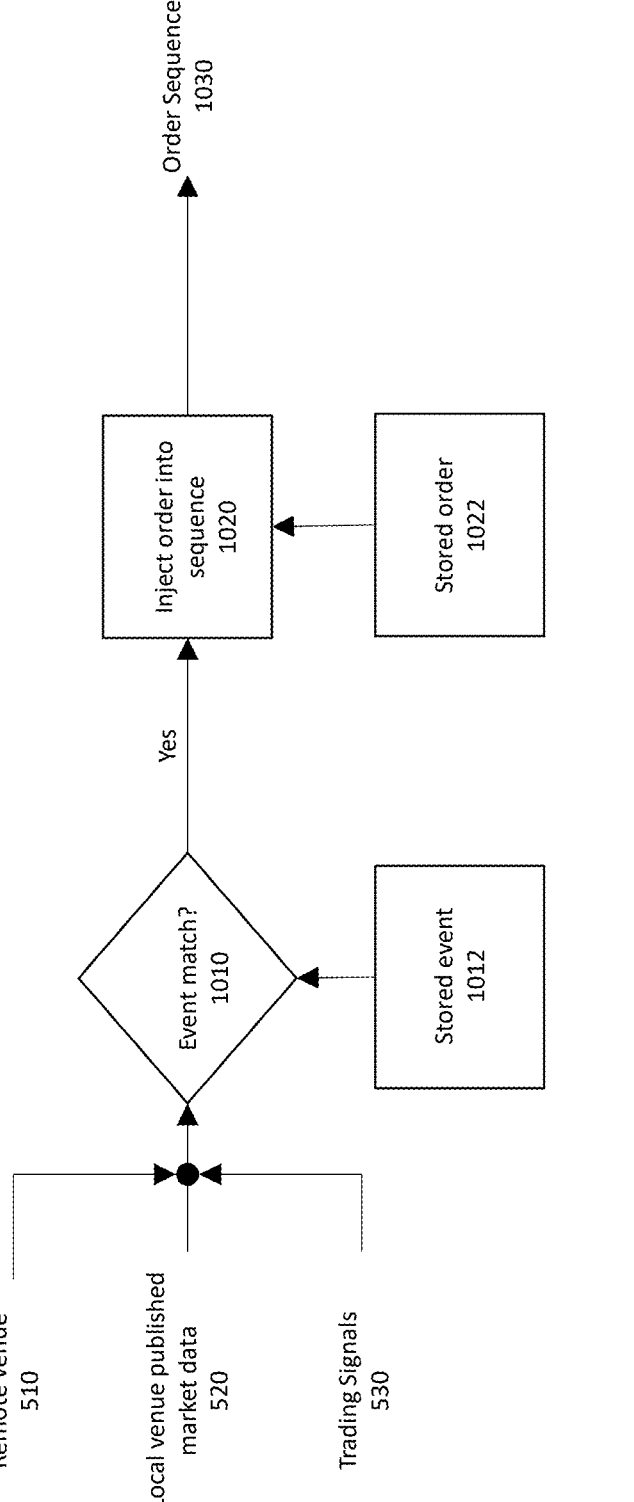
FIG. 10 illustrates a flow chart for an algorithm for exchange hosted event/order pair evaluation according to example embodiments of the present disclosure.

FIG. 10 depicts a flow chart illustrating an algorithm 1000 for exchange or trading venue hosted triggered order or event/order pair evaluation according to example embodiments of the present disclosure. The system may host triggered orders or event/order pairs on behalf of multiple market participants. Hosting triggered order or event order pairs at the trading venue, on behalf of the participant, may result in a lower reaction time versus requiring that the participant wait for the receipt of the event information, as required by traditional trading venues. If the trading venue is simultaneously the aggregator of exogenous information, the publisher of that information, and also the self-same system or method by which event responses (triggered orders, event/order pairs, hidden limit orders) are entered into the venue or placed in-force, then there are fewer communication links to traverse and thus the closed loop reaction time latency may be reduced.

Events of various types (e.g., local 520 or remote 510 market data events, corporate actions and reports, trading or price model predictions or results, other trading signals 530, or other information) may be input into an event matcher or condition evaluator 1010. The event matcher or condition evaluator compares any such event to the conditions or stored events that were programmed into the algorithm by the market participants. If the event matcher 1010 matches, in some capacity (e.g., matches an individual event or matches a group of events) a stored event 1012 (or event group) to the live or real time event (or group of events) from the information sources 510, 520, or 530, the algorithm 1000 proceeds. In the event of a match ("yes"), an associated stored order 1022 is entered into the sequence of record, on behalf of one of the plurality of market participants. The stored events 1012 and stored orders 1022 may be stored in an exchange hosted program or device (e.g., in contrast to a participant hosted program or device). The stored events 1012 and stored orders 1022 may be evaluated in the exchange or trading venue on behalf of a plurality of participants, on equal footing, e.g. on equal footing with regard to reaction time latency (e.g. in contrast to evaluation in a co-located compute resource where there is an incentive to minimize reaction time latency and evidently, responses based on the same event or information, may be sequenced arbitrarily by the exchange or trading venue). Alternately, an underlying order that would otherwise be placed in-force (e.g., because of a non-local NBBO) may be forwarded or sent to a different or non-local market, exchange, or trading venue.

Events may include local or remote market data, any information that is indicative of a market outcome, predictive of a market outcome, any other trading signal, or any kind of information at all. The underlying order, in an event order pair, may be any kind of order including but not limited to a limit order, an immediate or cancel (IOC) order, an order cancellation, an order modification, a hidden limit order, a cancellation of hidden limit order, a partial cancellation, other common order types, any kind of contemplated order type, or other order type not yet contemplated, or any other API call to the trading venue API or message accepted by the trading venue protocol. The order, in an event/order pair, may have various parameters, e.g., time-in-force, displayed (vs. not displayed), limit price, or quantity. Such order parameters may include any necessary or otherwise useful parameters and the parameters may have any value for the purposes of describing an event order pair.

Finding Profitable Triggered Orders

Depending on the market dynamics for the asset in question, finding triggered orders or event/order pairs may prove challenging. Traders may employ a computer algorithm to help generate or find trades, but their algorithm(s) may not directly yield event/order pairs. Certain trading algorithms, such as the algorithm illustrated in FIG. 5, may consume events as inputs and produce trades (or price predictions, or other predictions) as output(s). Computing the algorithm may be more costly (in time) than detecting that certain event that may have triggered the algorithm to yield a certain trade. Succinctly, an order or a trade, cast as an event order pair, may be able to react faster than an algorithm (that requires some additional computation). One way to find event order pairs is feed hypothetical events (that may happen, in the future) to a trading algorithm, e.g., to a trading algorithm that generates or yields trades, price predictions, or other trading indicators as its output(s), e.g., to an algorithm that does not directly yield event order pairs. If the algorithm yields a trade or otherwise interesting or tradable prediction, then an event order pair has been found. In specific, the potential event that caused the algorithm to trade (or otherwise show an interesting result) and the pursuant order is the event/order pair. That certain event/order pair can now be programed into the algorithms shown in FIGS. 9 and 10.

Projected Market Data Feed

Herein we disclose methods and systems by which an entity, algorithm, market participant, or other generator (e.g., human, random number, or otherwise) may produce either projected market events or groups of projected market events. The entity may further publish the projected market events into a projected market data feed or intermingle them into another market data feed (where they may optionally be marked as projected events). The events or groups of events may be created such that they represent plausibly likely events (or at random, or otherwise) and the events or groups of events may be created such that they are more likely to form the basis for a new order or trade or trade cancellation or other material action (or at random, or otherwise).

Figure 11:
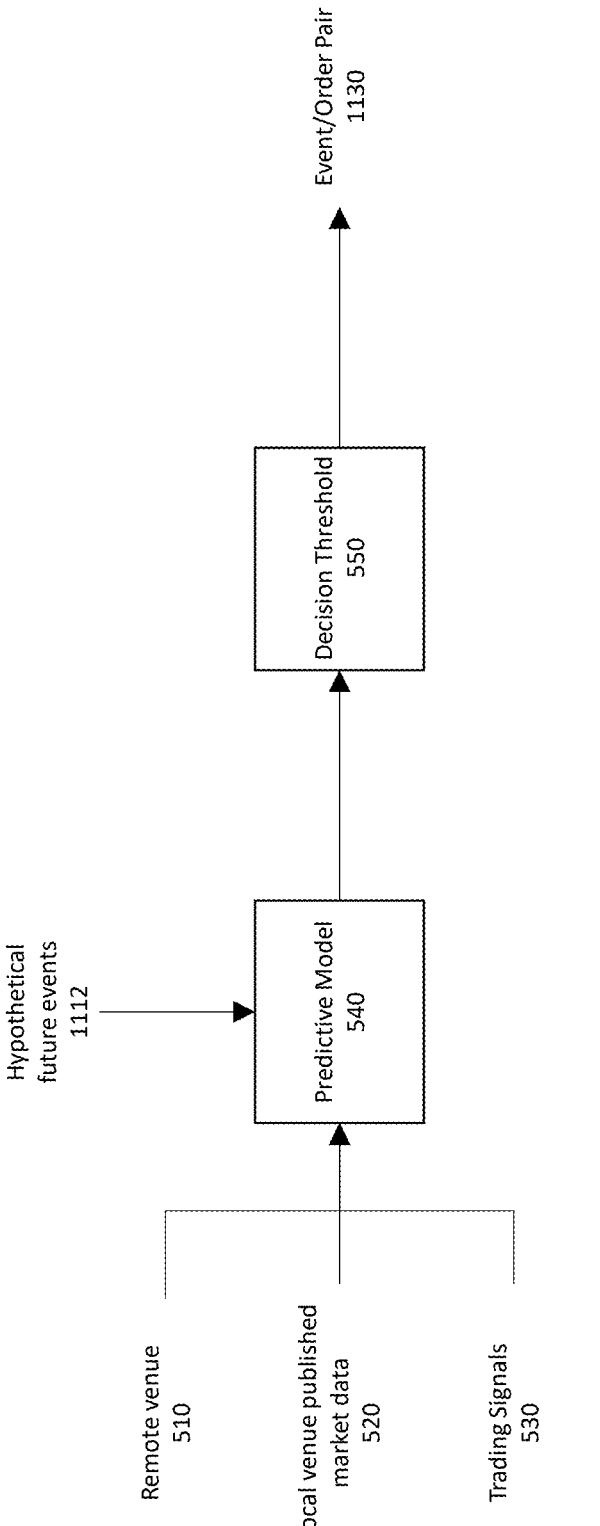
FIG. 11 illustrates a flow chart for a trading algorithm utilizing projected market data according to example embodiments of the present disclosure.

Electronic stock exchanges, and other trading venues, may publish a market data feed or feeds. FIG. 11 depicts a flow chart illustrating a trading algorithm 1100 utilizing projected market data according to example embodiments of the present disclosure. A market data feed my comprise events 520 that transpired at or on the specific trading venue in question. The market data feed may include events 510 from remote trading venues or other different sources of events or information. The market data feed may include regulatory or trading status messages or events (e.g., NBBO, LULD, trading halts or resumptions, or other status messages) 530. Importantly, existing market data feeds include only events that have transpired already, i.e., real time market data or other historical market data, and other relevant actual events and information (e.g., trading status messages). The actual events published in a market data feed may result in traders or trading algorithms reacting with new orders (whether by triggering an event order pair, or by other means such as algorithmic computation or otherwise). According to some embodiments, a trading venue may publish (and optionally flag appropriately) hypothetical future events 1112 that may form the basis for event/order pairs. Such a publication (projected market data or a projected market data feed) is useful to the purpose of finding profitable or useful event/order pairs or triggered orders. Projected market data is hypothetical and represents market events that may occur in the future.

Figure 12:
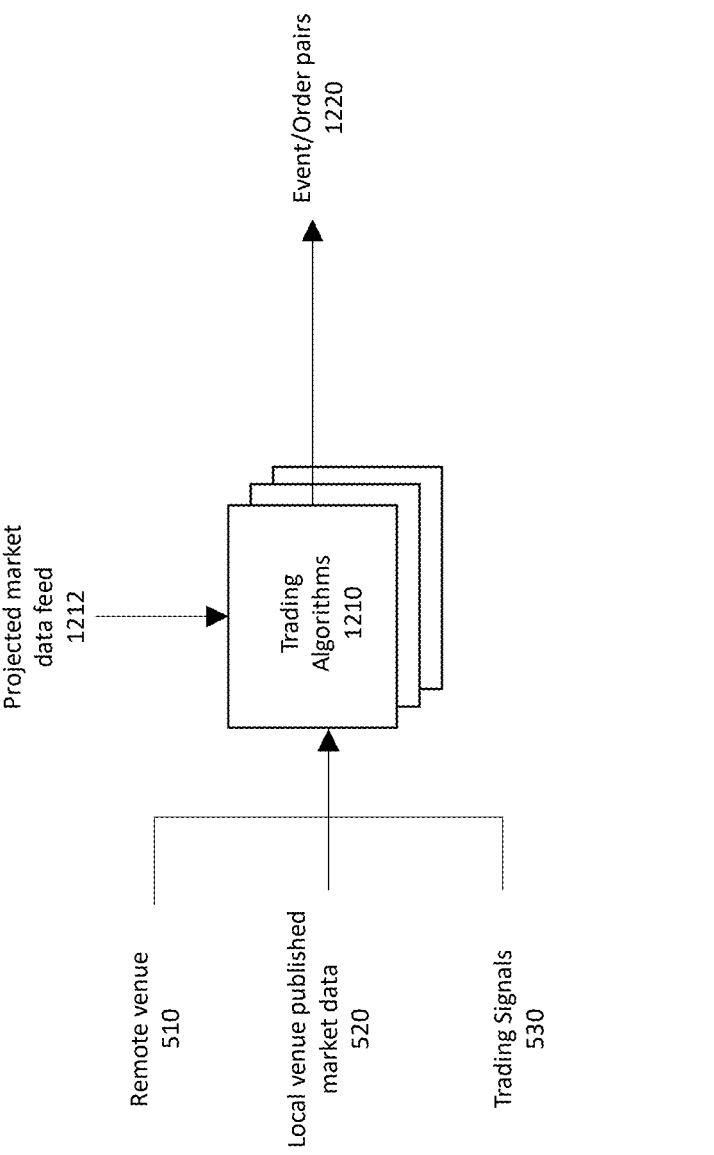
FIG. 12 illustrates a flow chart for multiple trading algorithms utilizing an exchange published projected market data feed according to example embodiments of the present disclosure.

A projected market data feed is useful to the task of finding profitable event/order pairs or triggered orders 1130. FIG. 12 depicts a flow chart illustrating a multiple trading algorithms 1210 utilizing an exchange published projected market data feed 1212 according to example embodiments of the present disclosure. Using projected market data, the trading algorithms can generate event/order pairs 1220. The projected market data feed 1212 may include a flag, or bit, or other marking or information, indicating that the event is a projected event, i.e., a potential event, i.e., an event that may occur in the future. Using the flagged as projected or flagged as hypothetical bit or other information, the projected market data 1212 may be published in the same channel or sequence of messages as a normal real time market data feed or any other market data feed. Alternately, the projected market data feed 1212 may be published in a different channel or sequence specifically reserved for projected market data. Alternately, for example, the projected 1212 and normal market data may be intermingled without being distinguished.

Projected events may include future events that add liquidity (e.g., liquidity added by new resting limit orders) or remove liquidity (e.g., liquidity removed by order modification or cancellation or by order execution) from the published order book. As an example, suppose that certain traders or algorithms are interested in submitting trades if they observe another trade of a certain size. The projected market data feed may show the following independent events:

| Projected event 1 | Trade/Exec, MSFT, 10 shares at $315.00 |
| Projected event 2 | Trade/Exec, MSFT, 20 shares at $315.00 |
| Projected event 3 | Trade/Exec, MSFT, 40 shares at $315.00 |
| Projected event 4 | Trade/Exec, MSFT, 100 shares at $315.00 |
| Projected event 5 | Trade/Exec, MSFT, 200 shares at $315.00 |

In the forgoing example, the sequence of projected events shows trades or executions for MSFT shares in increasing quantities at a certain price. Individual market participants may draw different conclusions from the sequence. One certain market participant may conclude that they would send an order pursuant to "Projected event 3" (should that event transpire). A different market participant may conclude that they would send an order pursuant to "Projected event 4" (should that ever transpire).

The forgoing example contemplates one way to create an independent sequence of projected market events, but evidently there are other ways. For example, the sequence of projected events could show orders that add visible liquidity to the bid or ask, and the quantity or price of the liquidity added could be varied. The projected events could remove (e.g., cancel) quantity for the bid or ask side of the book in varying quantities or at varying price levels. Further, various parameters, e.g., quantity or price, may be characterized not by precise match but as greater than, greater than or equal to, less than, or less than or equal to. Such a projected event may be "Trade/exec, MSFT, less than or equal to 10 shares at $315." Various parameters of a projected market data event may also be delta encoded; such a projected event may be "Trade, MSFT, less than or equal to 10 shares at the current mid-price minus ½ tick." In summary, any order parameter (quantity, price, symbol, type of order, and other order parameters) could be varied, encoded as an absolute value, encoded as a range or as an upper or lower bound, or delta encoded, in projected market events.

Projected Market Data Timestamps

Projected market data may also include a publication timestamp and may also indicate a projected future moment or future time frame within which the projected event could occur (the projected timestamp). We extend the previously given example of projected market data using the following abbreviations: TS for publication time stamp, and PTS for projected timestamp.

| | |
|---|---|
| Projected event 1 | Trade/Exec, MSFT, 10 shares at $315.00, TS 10, PTS 20 |
| Projected event 2 | Trade/Exec, MSFT, 20 shares at $315.00, TS 10, PTS 20 |
| Projected event 3 | Trade/Exec, MSFT, 40 shares at $315.00, TS 10, PTS 20 |
| Projected event 4 | Trade/Exec, MSFT, 100 shares at $315.00, TS 10, PTS 20 |
| Projected event 5 | Trade/Exec, MSFT, 200 shares at $315.00, TS 10, PTS 20 |
| Projected event 6 | Trade/Exec, MSFT, 10 shares at $315.00, TS 10, PTS 40 |
| Projected event 7 | Trade/Exec, MSFT, 20 shares at $315.00, TS 10, PTS 40 |
| Projected event 8 | Trade/Exec, MSFT, 40 shares at $315.00, TS 10, PTS 40 |
| Projected event 9 | Trade/Exec, MSFT, 100 shares at $315.00, TS 10, PTS 40 |
| Projected event 10 | Trade/Exec, MSFT, 200 shares at $315.00, TS 10, PTS 40 |

In the example, the projected timestamp is greater in value than the publication timestamp for each of the projected events (and that this is just one convention that may be chosen). Projected events 6 through 10 contemplate the same set of individual projected events as 1 through 5 but at a moment further into the future (i.e., projected events 1 through 5 contemplate an event happening 10 time units after publication of the projected events and projected events 6 through 10 contemplate an event happening 30 time units after publication of the projected events).

Projected timestamps may be known (e.g., by published convention) to be in certain units of time (e.g., nanoseconds or microseconds), or their units of time may be indicated in the projected event message itself (e.g., by a time unit parameter or message field).

A projected timestamp may also indicate a timeframe, e.g., for one of the example projected events above, we may have "TS 10, PTS 40 to 60" indicating a time frame of 30 to 50 time units after the publication of the projected market data.

A projected timestamp may be delta encoded, e.g., rather than providing an absolute timestamp, it may provide a timestamp that is relative to its moment of publication or receipt. For example, in one of the projected events from above, may have "TS 10, PTS +100 to +200" indicating a time frame of 100 to 200 time units after the publication of the projected market data. And for example, we may have only "PTS+100 to +200" indicating a time frame of 100 to 200 time units after receipt of the projected market data. The projected timestamp may be known by convention. For example, all projected market data events may be projected at a certain fixed time into the future, e.g., at publication time plus some certain time. Alternately, there may be fixed epochs of absolute projected time horizons, e.g., all projected events (in a certain epoch) are projected to happen at time absolute time $t_0$ or between (absolute times) $t_0$ and $t_1$. In these by convention schemes for projected timestamps, the projected timestamp need not be included (directly) in the projected market data feed (although the epoch number may be included).

The projected market data projected timestamp, or epoch, may be used to cancel out event/order pairs that are found using that particular projected event. For example, consider a projected event $PE_0$ with a projected time stamp with an absolute value of 100 time units. Suppose the that the current time is 110 time units. In this hypothetical, even if the projected event does occur, it will occur after its projected time stamp. In this sense, the projected event $PE_0$ may be considered stale. Therefore, if an event/order pair was found from $PE_0$, that event order pair may be considered stale. Succinctly, if the current time passes beyond the projected time stamp, then event order pairs found from the projected event with the now stale projected time stamp may be canceled on that basis.

Projected Market Data Group Sequences

In some cases, a group of events may form a basis for a trade (e.g., as compared to one certain event or item of information). For example, consider the following group of potential market events:

| | |
|---|---|
| Projected event 1 of 3 | New limit order, sell, MSFT, 10 shares @ $315.00 |
| Projected event 2 of 3 | New limit order, sell, MSFT, 20 shares @ $315.00 |
| Projected event 3 of 3 | New limit order, sell, MSFT, 70 shares @ $315.00 |

The forgoing projected events may be viewed as a group (rather than individual events). In such a group, the total quantity of MSFT shares added to the offer or ask side of the book is 100. The aggregate effect of the group (100 shares of liquidity added) may form the basis for a trade while any one of the above events, on their own or observed in isolation, may not form the basis for a trade.

For groups of events, the timing in between individual events may also be varied, e.g. may be a parameter of interest when potentially forming the basis for a trade. For example, in the above where an aggregate total of 100 shares are added to the offers to sell, there may be a different interpretation of the potential events if they are packed tightly together in time versus spaced widely apart in time. The projected market data timestamp (in its various forms disclosed herein) may be used to distinguish between these different projected market data group timing scenarios.

Triggered Order Generator

Figure 8:
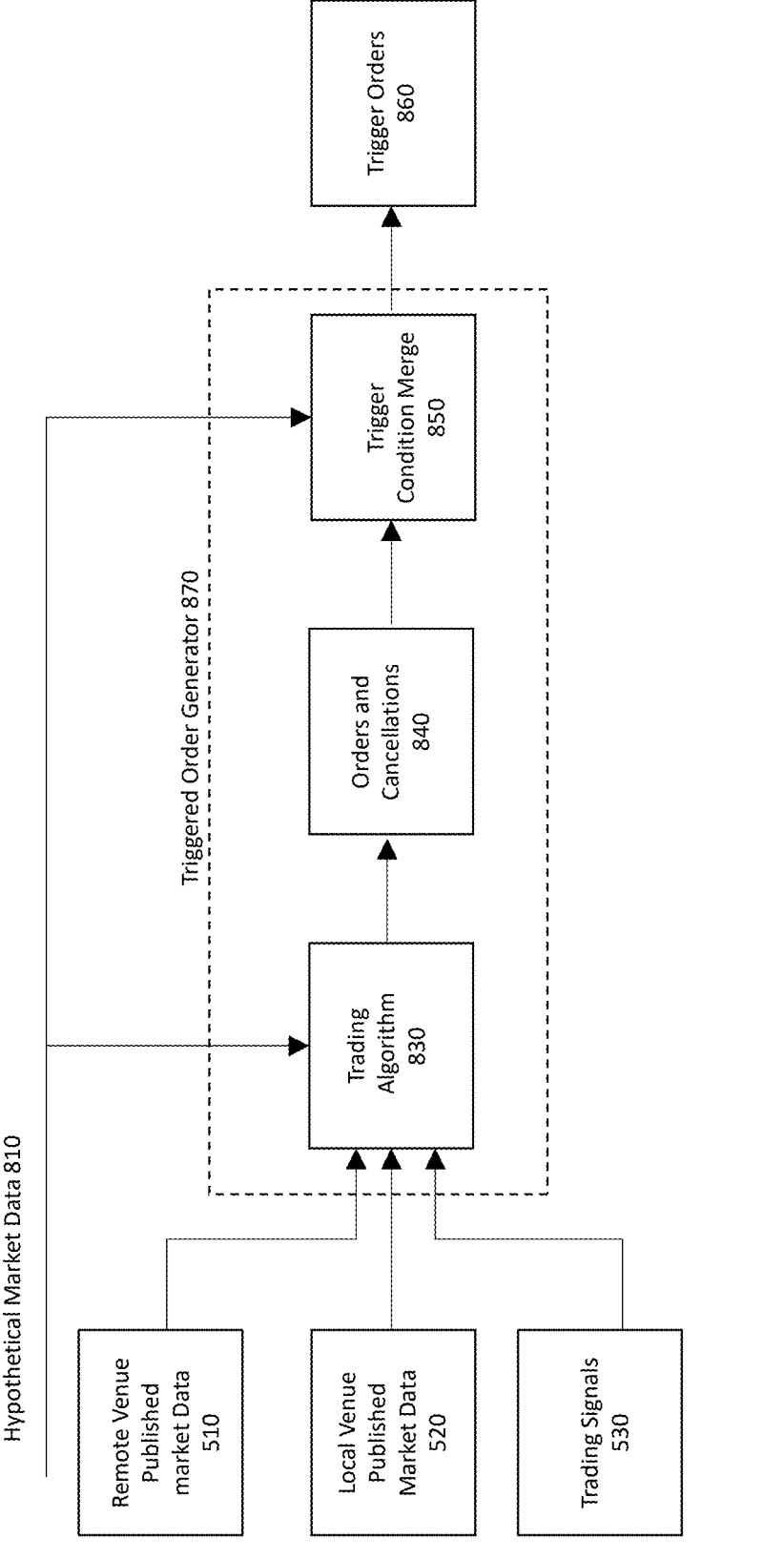
FIG. 8 illustrates a triggered order generator to be used in a stock exchange and system, according to example embodiments of the present disclosure.

FIG. 8 illustrates a system or method to facilitate and aid in the process of generating or finding triggered orders 860 for use in electronic trading systems and venues 800, according to example embodiments of the present disclosure.

The OEB 250 may optionally be paired with an algorithm (hosted or co-located) 830 and a projected market data feed 810 to implement a Triggered Order Generator (TOG) 870, as illustrated in the system 800. The hosted or co-located algorithm 830 may be a trading algorithm or predictive model, or both, that is implemented on or in hardware, compute resources, or software on compute resources that are integrated with the OEB 250, or otherwise proximate to or in communication with the OEB 250. The TOG 870 is an algorithm, logic, device, hardware, or software, that finds profitable triggered orders based on current market conditions. The TOG 870 and/or hosted algorithm 830 may be utilized by participants, on behalf of participants, or in cooperation with participants.

The hosted algorithm (HA) 830 may be an algorithm that is developed and maintained by the trading venue that operates the OEB 250, or on behalf of that venue, or may be a third-party algorithm that is shared either fully or opaquely, as a black box, by the third party with the venue. The triggered order generator (TOG) 870 may use a hosted algorithm 830 or co-located algorithm or remotely hosted or remote algorithm.

To find potentially profitable triggered orders, the TOG 870 merges hypothetical or projected market events 810 with orders, cancellations, order modifications, or other material outputs of a hosted or co-located algorithm 830 that has generated those material outputs on the basis of the same hypothetical or projected market data 810. For example, the triggering condition 850 is the hypothetical event 810 and the underlying order is the resultant order based on evaluating the hosted or co-located algorithm 830 against the hypothetical event 810. The TOG 870 may send this triggered order directly to the OEB 250 for immediate placement in the TOQ 328 and TO-IL 324, or to market participant(s) for review and approval. In certain embodiments, the TOG 870 system may optionally use multiple streams of hypothetical market events 810 for multiple traded securities or symbols and may evaluate that plurality of hypothetical market events 810 versus many different trading algorithms on behalf of many different market participants, such that any participant may use the TOG 870 to generate triggered orders on their own behalf.

The TOG 870 system or method or hosted or co-located algorithm 830 may use a third-party algorithm without knowledge of the details of that algorithm, or it may use an algorithm that is open source, or a proprietary algorithm that is developed by or on behalf of the venue itself. Any of those algorithms 830 may be venue hosted, may be co-located, or remote. For example, the hypothetical events 810 may be used by an algorithm or algorithm hosted by a market participant on their own co-located compute resources. If that participant's algorithm emits an order or order cancellation 840 in response to the hypothetical event 810 so published by the TOG 870, that order 840 may be directly returned to the exchange or trading venue operating the OEB and TOG 870 in the form of a triggered order for placement in the TOQ or it may be sent to the participant's pre-trade risk evaluation logic for review and approval prior to potentially being sent to the venue operated OEB and TOQ.

Order Books and Order Book Publication

A trading venue, electronic trading venue, stock exchange, options exchange, futures exchange, crypto exchange, or similar, may keep a record of the open interest to buy or sell a certain security (or derivative, or contract, or crypto token etc.) known as an order book, limit order book, or continuous limit order book. An order book is normally comprised of all the limit orders (and/or other resting orders) to buy or sell the underlying security (stock, option, contract, crypto token). An order book is normally organized by security, symbol, underlying, stock, contract, option, derivative, or crypto token, e.g., a given order book may be for a certain stock symbol, e.g., an order book for shares of GOOG. The order book may be organized by price level or by tick level, e.g., orders that share the same price or tick level may be grouped together when displayed or when stored (in DRAM memory, in SRAM memory, in a CPU cache, on disk, on SSD disk, written on paper, or otherwise stored). When displayed, when published, or otherwise viewed by an algorithm, program, or other entity, orders at a certain price may also be aggregated together. For example, consider the following three orders (in an order book) that are limit order offers to sell shares of GOOG:

Order 1 at price $120.00: Limit order, sell 10 shares of GOOG, no lower than $120.

Order 2 at price $120.00: Limit order, sell 20 shares of GOOG, no lower than $120.

Order 3 at price $120.00: Limit order, sell 30 shares of GOOG, no lower than $120.

When displayed, published, or viewed by an algorithm, program, or other entity, these three orders may be aggregated together and displayed as 60 shares (in 3 orders) of GOOG available for $120.

The orders on a particular price level may have some priority establishing which order is executed first, in the event that a contra-side matching order is submitted. Often, the priority order is established by which of the orders (on a price level) was submitted first, but other methods (e.g., pro-rata) exist.

Orders in an order book may be published or displayed. Alternately, orders in an order book may be hidden or dark. Published or displayed orders are made visible to market participants by way of order book publication. The order book publication may be produced on an order-by-order basis or the exchange or trading venue may publish aggregated updates that show the total aggregate liquidity on each given price level. There may be other methods of publishing order book information. Orders that are hidden or dark are not published or made known to other trading participants, unless they have matched against a contra side interest. Participants are normally interested in submitting or using these so-called hidden (or dark) limit orders when they do not wish to reveal the full size of their trading interest in a particular traded asset.

Published and Non-Published Exchange Side Hosted Event/Order Pairs

Pursuant to the exchange hosting event order pairs on behalf of participants, the exchange can form an order book comprised of both limit orders and the event order pairs (which may include events that trigger the injection of a limit order, or events that trigger the injection of an IOC order or an order cancellation, or other types of orders). This order book extends a standard order book, because it contains more information about the realm of possible trading outcomes. As such, it may be described as an order book in or with higher dimensionality (i.e., higher dimensionality than previously disclosed forms of order books which only include limit orders or hidden or non-displayed limit orders in their various forms; this higher dimensioned order book includes event order pairs that describe possible future outcomes pursuant to possible future events). The event order pairs submitted to the exchange may be marked by participants as displayed (or to be published) or non-displayed (or dark, or hidden, not to be published). The exchange may publish the displayed event order pairs as a separate market data feed or intermingle the displayed event order pairs into its normal market data feed. The publication of event order pairs, pursuant to trading participants marking their submitted event order pairs as displayed, is non-obvious, novel, and useful. Alternative methods of publication (e.g., separate market data feed, intermingled, etc.) may be implemented in embodiments described herein.

Events for Exchange Side Hosted Event/Order Pairs

Various different events or quanta of information may form the basis for a trade and therefore, may be of interest when forming event order pairs. Any market event (e.g., new order, order canceled, or order or orders matched or traded) published in a common market data feed may form the basis for a trade and may be an event for an event order pair. These market data events may be received from the same venue that is hosting the event order pairs (on behalf of trading participants) or these market data events may be received from other trading venues. These events may be for the same security or traded asset specified in the order (in an event order pair) or may be for a different traded asset.

Specific market data feed events (contemplated in the prior paragraph) do not form the full universe of events or quanta of information that may form the basis for a trade and therefore are not the only events of interest in forming event order pairs.

In addition, the output of a trading algorithm (e.g., a price prediction or market direction prediction or other predictive indicator) may form the basis for a trade and thus be an event of interest for an event order pair.

In addition, certain news events or quarterly reporting, other disclosure events, or other corporate actions or announcements, may form the basis for a trade and thus be an event or events of interest for an event/order pair.

Exchange Hosted Predictive Model Result Injection for Event/Order Pairs

A trading venue, electronic trading venue, stock exchange, options exchange, futures exchange, crypto exchange, or similar, may operate, host, or otherwise materialize predictive models. These models may consume market data (e.g., real time published market data), both local and remote (or other inputs) and may yield price predictions or other predictive indicators.

Reducing the time to compute a predictive model may be useful to reduce the reaction time involved from event (or other input) to model prediction or result. One component of time required for model compute is the time required to transmit or send market data from its source to the machine where the model will be computed. The exchange itself may be able to integrate the model compute into its own hardware or software thereby reducing the time required to transmit market data to the model and thereby reducing the time required to compute a model result.

Figure 13:
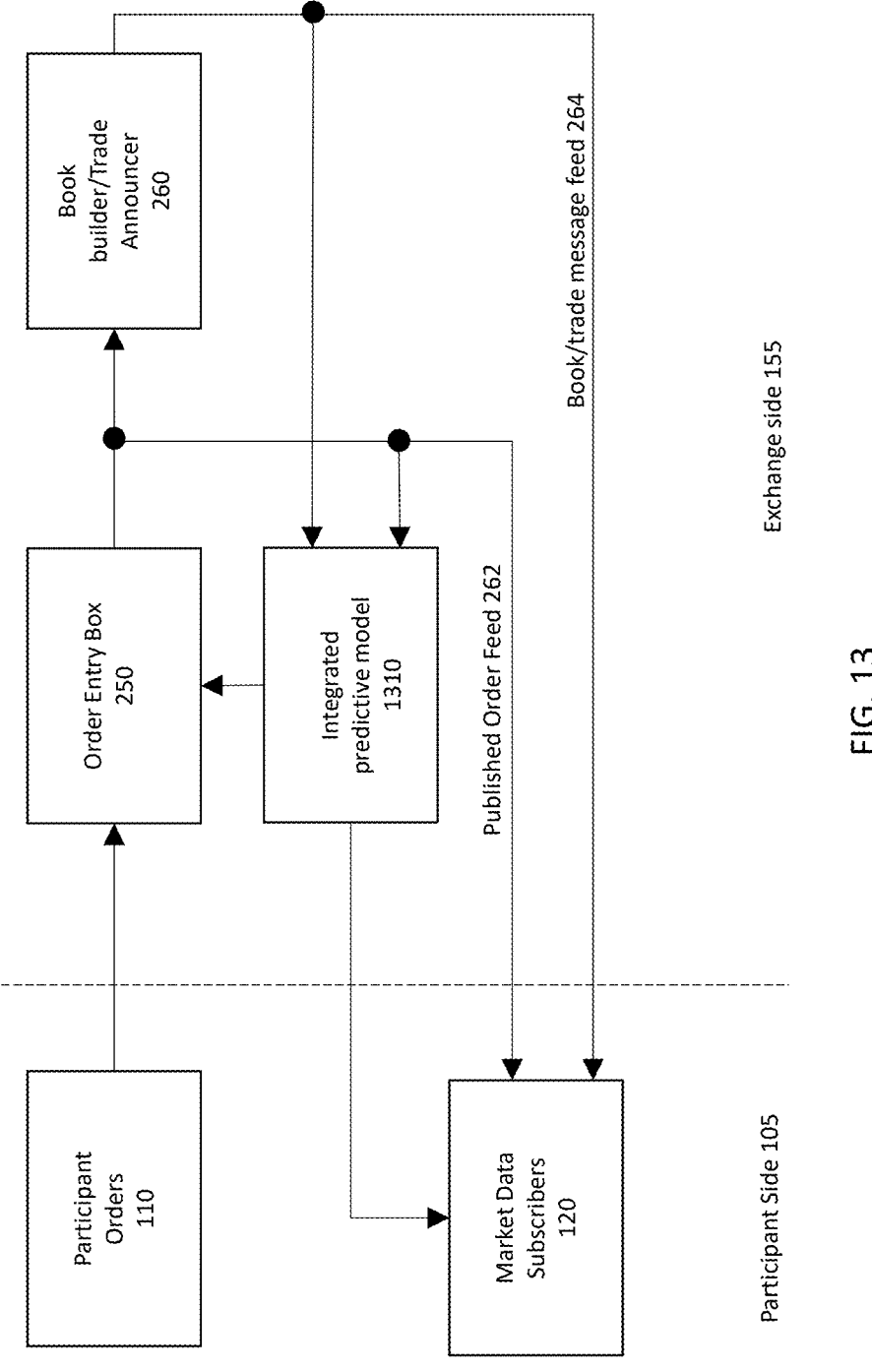
FIG. 13 illustrates a stock exchange and system architecture integrating a predictive model according to example embodiments of the present disclosure.

FIG. 13 illustrates a stock exchange and system architecture 1300 integrating a predictive model 1310, according to example embodiments of the present disclosure. The model 1310 may receive data directly from the OEB 250 and/or the TA 260. The model 1310 may inject orders back into the OEB 250. The model 1310 may publish future market data and/or event/orders to market data subscribers 120.

The outputs may be re-integrated into the exchange hardware or software that hosts event order pairs on behalf of participants. Concretely, an event order pair may be formulated using a predictive model result as its event. For example:

Event: The predictive model produces a result of –0.75 or lower.

Order: Sell (IOC) 100 shares of INTC at a price of no lower than $29.00.

In specific, an exchange integrated predictive model (a cohosted model or a cohosted predictive model) may immediately send its result to the compute unit hosting event order pairs on behalf of participants, or the exchange hosted integrated model may reside in or on the same compute unit hosting event order pairs on behalf of participants. The predictive model may be integrated into the same program or hardware as the order serialization and processing logic, including any exchange hosted event order pair evaluation logic, program, or hardware. The integration may be achieved in a single program, process, thread, or hardware device or by programs, logic, and hardware residing on the same compute server, or by the disparate parts residing on exchange hosted programs, hardware, or servers that are proximate in location. This direct connection, integration, or sharing of resources between exchange processing (incoming order serialization and matching), model compute, and event order pair evaluation may reduce the overall reaction time (e.g., the reaction time from new information entering the system, to event order evaluation via predictive model).

Methods for Managing Orders Across Input Ports

Figure 14:
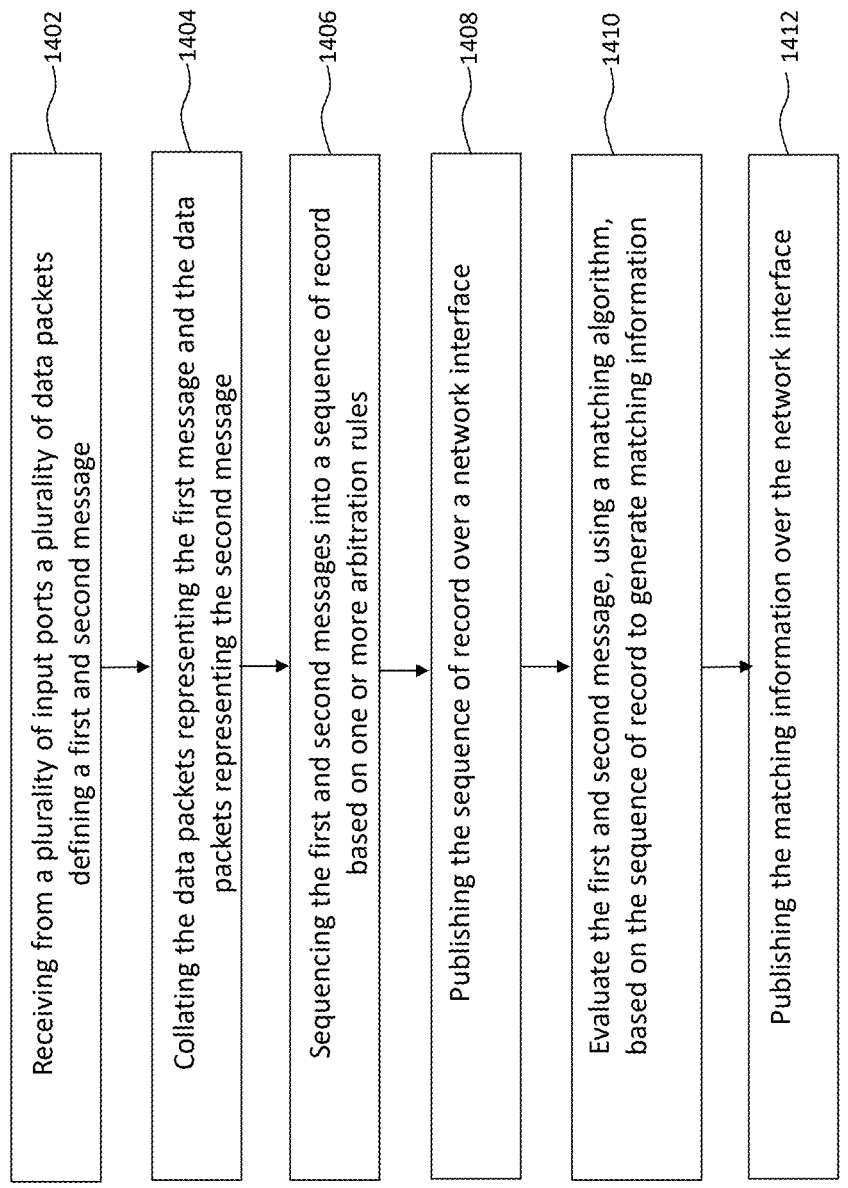
FIG. 14 illustrates a flowchart for a method for managing orders across a plurality of input ports, according to example embodiments of the present disclosure.

FIG. 14 is a flowchart for a computer-implemented method 1400 for managing orders across a plurality of input ports, according to example embodiments of the present disclosure. The method 1400 may include receiving 1402 a plurality of data packets from a plurality of input ports. The plurality of input ports may comprise a first and second input port. A first portion of the plurality of data packets may define a first message and a second portion of the plurality of data packets may define a second message. The first message and the second message may include a message type of at least one of an order message, a triggered order message, and/or a hidden limit order message. Additional data packets may also be received, including, but not limited to, third-party market data packets, and regulatory information data packets.

The method 1400 may include collating 1404 the first portion of the plurality of data packets into the first message and the second portion of the plurality of data packets into the second message.

The method 1400 may include sequencing 1406 the first message and the second message into a sequence of record based on one or more arbitration rules as described herein. The method 1400 may include determining if the first and/or second message is inauthentic or invalid. A message may be inauthentic if the message does not contain necessary identifying information that is sufficient to verify an authorized market participant. A message may be invalid if a parameter of the message is outside of a predefined threshold range. An in authentic or invalid message may be omitted from the sequence of record. Authentication may be performed using a shared secret key (e.g., using symmetric cryptography or public-key cryptography). Alternatively, authentication may be performed using an authentication token.

In an example, if the first message is a triggered order message, sequencing 1406 can further include storing the triggered order message in a triggered order queue, where the triggered order queue includes storage for a triggering condition for the triggered order message and storage for the underlying order, order modification or cancellation, or other API call for the triggered order message (the underlying order); evaluating a status of the triggering condition based on at least one of the second message, a received external condition, and the matching information; and pursuant to the triggering condition being met, inserting underlying order into the sequence of record. If the second message was an order message, updating the evaluation of the triggering condition can further include determining, by the processor, message information associated with the second message comprising at least one of symbol, price, and quantity; comparing the message information to the first message; and based on the comparison, updating the status of the triggering condition. If the triggering condition of the stored triggered order is not met, the evaluation of the triggering condition can further include integrating information from the second message into an accumulated value parameter stored or accessed alongside or along with the stored triggering condition affiliated with the first message.

The method 1400 may include publishing 1408 the sequence of record over a network interface. Some message information may be redacted during publishing 1408. A hidden limit order message may be omitted entirely from publishing 1408.

The method 1400 may include evaluating 1410 the first and second message, using a matching algorithm, based on historical message data, the sequence of record, and the message type to generate matching information The evaluation 1410 may further include a fungible order matching protocol as described herein.

The method 1400 may include publishing 1412 the matching information over the network interface.

EXAMPLE EMBODIMENTS

In some embodiments, a system includes one or more memories and at least one processor. The system can include a circuit configured to receive a plurality of participant messages or network packets referred to in these claims as an order entry box or OEB. The participant network messages or network packets may contain a flow-through order type, which without limitation is understood to be a well-known order type established by prior art such as a limit order, a marketable limit order, an immediate-or-cancel order, an order cancellation that cancels or attempts to cancel a previously placed order, an order adjustment which modifies or attempts to modify a previously placed order, or similar (an order message); a predicated, triggered, or conditional order message which is a message that includes a predicate or triggering condition along with an underlying order that is generally limit order, order cancellation, order modification, or another triggered order message. The underlying order in this message is not immediately placed in force, rather, the underlying order of a predicated, triggered, or conditional order message is placed in force when its predicate, triggering condition, or condition is met. These message types may be generally referred to as triggered orders.

In some embodiments, the order entry box is configured to process participant packets from an ordered sequence or from ordered sequences of such packets, said sequence or sequences are referred to in this disclosure as the input sequence or input sequences. The input sequence or sequences may be generated by a message serialization mechanism that is external to the order entry box such that the sequencer's output(s) becomes the input sequence(s) to the order entry box. The sequencer may be logic, a hardware device, or software, which accepts as inputs a plurality of incoming network packets on different input ports and emits as output a single sequence of network packets or multiple sequences of packets such that all orders that may pertain to the same tradeable asset are in the same sequence.

The input sequence or sequences may be generated by a message or packet serialization mechanism that is integrated into the order entry box such that the order entry box inputs are a plurality network packets on a plurality of input ports. The plurality of packets on a plurality of input ports may be placed into an ordered sequence or ordered sequences by the integrated sequencing mechanism, such that all orders for a given tradeable asset may be contained in the same sequence. The resulting ordered sequence or sequences may be used for further processing by the order entry box.

The order entry box may be configured to create, as an output, a sequence of orders that establishes the sequence of record (the sequence of record) for a trading session, i.e., that sequence which could be analyzed to determine which orders matched against which other orders as trades. The sequence of record may include all information necessary to reconstruct the results of the trading session including but not limited to participant identification, order prices, quantities, directions, and other order parameters.

The order entry box may be configured to, in the absence of and only in the absence of any triggered orders or hidden limit orders, emit each input flow through order as an output, that is in the absence of any triggered orders or hidden limit orders, to immediately emit any flow through order that is received as an input as an output in the same sequence in which the flow through order was received from the input sequence or input sequences.

The order entry box may be configured to, should any triggered orders be in place, place into its output sequence the underlying order from a triggered order based on any flow through order processed, other information processed, or in response to evolving market conditions, book state, or book states as determined by any information processed therein.

The order entry box may be configured to, should any hidden limit orders be in place, place into its output sequence the hidden limit order based on any flow through order processed, other information processed, or in response to evolving market conditions, book state, or book states as determined by any information processed therein.

The order entry box may be configured to create, as an output, a sequence of orders that is suitable for publication to market participants (the immediate publication sequence). This output sequence may be identical to the sequence of record or may include orders from the sequence of record but certain information in this output may be redacted or otherwise obscured. For example, participant identification may be redacted or obscured.

The order entry box may be configured to store each triggered order in a memory, referred to independent of underlying implementation as a triggered order queue (TOQ). The order entry box may be configured to store each hidden limit order in a memory, referred to independent of underlying implementation as a hidden limit order queue (HLOQ).

The order entry box may be configured to, for each flow through order processed, retrieve a set of relevant triggered orders from the triggered order queue. The set of triggered orders so retrieved may be all triggered orders submitted. The set of triggered orders so retrieved may be the subset of triggered orders that may trigger based on the symbol or underlying traded asset of the flow through order being processed. The set of triggered orders so retrieved may be the subset of triggered orders that may trigger based on the symbol and order type, price, or quantity, or other order parameter of the flow through order being processed or based on other data or information available.

The order entry box may be configured to, for each flow through order processed, retrieve a set of relevant hidden limit orders from the hidden limit order queue. The set of hidden limit orders so retrieved may be all hidden limit orders submitted. The set of hidden limit orders so retrieved may be the subset of hidden limit orders that may trigger, may be published, or may be partially published, based on the symbol or underlying traded asset of the flow through order being processed. The set of hidden limit orders so retrieved may be the subset of hidden limit orders that may trigger, may be published, or may be partially published, based on the symbol and order type, price, or quantity, or other order parameter of the flow through order being processed, or based on other data or information available.

The order entry box may be configured to analyze triggered orders based on each flow through order using a predicate evaluator or predicate evaluators, each such predicate evaluator designed to analyze an individual predicate or condition that is included in a given triggered order. The predicate evaluator or evaluators, independent of its or their underlying implementation in hardware, software, or as a hardware software co-design may be referred to as the triggered order injection logic (TO-IL).

Each predicate evaluator in the TO-IL may be configured to accept as an input a flow through order or other data processed and received as an input by the order entry box including but not limited to book state such as the prices and quantities or aggregated price and quantity of bids and offers for tradable assets. Each predicate evaluator may be configured to accept as an input a triggered order or the predicate or condition of a triggered order. Each predicate evaluator may be configured to yield as an output, the determination of whether the triggered order condition or predicate is met, based on its inputs and based on the new information gained by analyzing the flow through order input data.

The order entry box may be configured to publish, include, or place in the sequence of record the underlying order from any triggered order whose predicate or condition is met based on the output or outputs of the TO-IL.

The order entry box may be configured to analyze hidden limit orders based on each flow through order using a predicate evaluator or predicate evaluators, each such predicate evaluator designed to analyze an individual predicate or condition that is included in a given hidden limit order; the predicate evaluator or evaluators, independent of its or their underlying implementation in hardware, software, or as a hardware software co-design is, without limitation, referred to herein as the hidden limit order injection logic (HLO-IL).

Each predicate evaluator in the HLO-IL may be configured to accept as an input a flow through order or other data processed and received as an input by the order entry box including but not limited to book state such as the prices and quantities or aggregated price and quantity of bids and offers for tradable assets. Each predicate evaluator may be configured to accept as an input a hidden limit order or the predicate or condition for publication of that hidden limit order. Each predicate evaluator may be configured to yield as an output, the determination of whether the hidden limit order condition or predicate is met, based on its inputs and based on the new information gained by analyzing the flow through order input data.

In some embodiments, a system includes a circuit configured to receive, as an input or inputs, external or third-party market data packets, external or third-party market data information, or external or third-party market data events referred to in these claims as third-party market data. Such third-party market data may include, without limitation, market data or events published by other trading venues or exchanges. The circuit may be further configured to utilize third-party market data to trigger the placement of an underlying order from a triggered order or cause the publication or partial publication of a hidden limit order. The circuit may be further configured to utilize third-party market data as information to adjust the current venue trading state, for example in the context of United States NMS equities if the third-party market data indicates the location of the NBBO, then trading may be enabled or disabled accordingly. The circuit may be further configured to emit third party market data in its outputs in either the sequence of record or in the published sequence.

The circuit may be configured to receive as an input or inputs regulatory information packets, regulatory data, or regulatory events including for example NBBO information or data, LULD information or data, or regulatory or compliance information or data similar in effect. Such information is referred to in these claims as regulatory input data. The circuit may be further configured to utilize regulatory input data to trigger placement of an underlying order from a triggered order or cause the publication or partial publication of a hidden limit order. The circuit may be further configured to utilize regulatory input data to adjust the current venue trading state, for example in the context of United States NMS equities if the regulatory input data indicates the location of the NBBO, then trading may be enabled or disabled accordingly and if the regulatory input data indicates a trading halt or resumption, for any reason, the trading may be enabled or disabled accordingly. The circuit may be further configured to emit regulatory input data in its outputs in either the sequence of record or in the published sequence.

The circuit may be configured to receive other market participant programming events, e.g., including but not limited to programming metadata related to triggered orders, conditional orders, or predicated orders. For example, the circuit may update the parameters of an already placed conditional or triggered order or programming related to parameterized or managed triggered orders.

The system may include a circuit that implements packet serialization based on the arrival sequence of input network packets on a plurality of input ports. The circuit may be external to and separate from the order entry box, or internal to and integrated into the order entry box.

The circuit may be configured to produce a single sequence of ordered messages based on its input of messages from a plurality of input ports. The circuit may be configured to produce a plurality of sequences of ordered messages based on its input of messages from a plurality of input ports, according to the invariant that all orders for a given tradeable asset are always assigned to the same output sequence.

The circuit may be configured, that if a plurality of messages appear to arrive at the same time, e.g., within a small enough time window that the underlying technology of implementation cannot make a determination of which input packet arrived first, an arbitration mechanism may determine which of the apparently simultaneously arriving input packets is to be placed into the ordered output sequence first.

The arbitration mechanism may be configured as a round robin mechanism where inputs from input ports with apparently simultaneous inputs are selected in a rotating or wrapping sequence. Alternatively, the arbitration mechanism may be configured such that inputs from input ports with apparently simultaneous inputs are selected randomly or pseudo-randomly, or the arbitration mechanism may be configured such that inputs from input ports with apparently simultaneous inputs are selected according to any other method of arbitration.

The system may include a circuit which includes message filters to prevent inauthentic, invalid, or otherwise unwanted messages from further processing. Such invalid or inauthentic messages may be dropped. In some embodiments, invalid or inauthentic messages may be recorded by an audit tap. In particular, but without limitation, such invalid or inauthentic messages may not be processed by the TO-IL or by the HLO-IL, may not be stored in the TOQ or in the HLOQ, and/or may not be placed in either the output sequence of record or in the output published sequence. A message may be deemed inauthentic if it does not contain necessary identifying information that is sufficient to verify it was sent by an authorized market participant. Such identifying information may include a shared secret as taught by symmetric cryptography or by public-key cryptography or be any of a plurality of authentication methods without limitation. A message may be deemed as invalid if its parameters exceed preset or dynamically set system limits on those parameters. For example, if the underlying order price is too high or too low. A message may be deemed as unwanted based on other criteria related to the specific trading venue or financial exchange in question.

The system may implement a liquidity tracking unit (LTU). The LTU may be configured to receive participant orders and identify self matches. The LTU may be configured to convert self matches either wholly or partially (e.g., depending on the amount of self-matched quantity) to cancellations. The LTU may be configured to receive participant orders and identify cancellations that target liquidity that has already been removed from the book. The LTU may be configured to drop the cancellation message or modify down the cancellation quantity, depending on the remaining participant aggregate quantity.

The system may include audit taps, located at multiple different system junctions, configured to record or send for recording all messages, packets, or orders arriving at the audit tap.

The system may include a priority sequencer in communication with the TO-IL such that if multiple underlying orders from triggered orders are placed in response to a single event that is processed, then they are placed into the sequence of record and into the published sequence according to their respective priority as determined by the rules published by the trading venue or financial exchange.

The system may include a priority sequencer in communication with the HLO-IL such that if multiple hidden limit orders are placed, published or partially published, in response to a single event that is processed, then they are placed into the sequence of record and into the published sequence according to their respective priority as determined by the rules published by the trading venue or financial exchange.

The system may include a triggered order queue (TOQ). The TOQ may be a memory table implemented directly in hardware either as an ASIC or in FPGA hardware where the index into the memory table is constructed based on the categories along which a triggered order may respond, e.g., the index constructed by the event type and asset. The event type and underlying asset may include and index event type that is a column in the table, wherein the column indicates priority.

Publishing orders may include publishing the state of the order book, publishing the matching events, and/or notifying participants of accepted orders, fills, or cancellations. Publishing orders may include publishing an order feed that is congruent to existing order feeds. Publishing may be performed by the matching engine.

In some embodiments, the circuit is a field programmable gate array (FPGA). A reaction time between the FPGA and the order entry box may be approximately 25 nanoseconds. In other embodiments, the circuit is an application-specific integrated circuit (ASIC). A reaction time between the ASIC and the order entry box may be approximately 2.5 nanoseconds. Time stamp data is generated by the order entry box.

In some embodiments, the queue is a triggered order queue. The queue may be a hidden limit order queue. A priority of the queue may be ranked by at least one of transparency, risk, equity, or market participation. Transparency may include published and unpublished orders or anonymous orders. Equity may include order cancellations. Risk may include price improvement, smallest size of an event type, or published and unpublished orders. Market participation may include pro-rata by participation.

In some embodiments, a computer-implemented method for providing a user authenticated access to an external system includes receiving, by a management system, authenticated access to the external system, wherein the authenticated access is based off the external system verifying the expression; receiving, by a processor, a token for authentication of an identity of a user, wherein the token comprises identification information of the user; sending, by the processor, the token to an interface of an issuing system; receiving, by the processor, a statement verified by the issuing system, wherein the statement is based off the token; generating, by the processor, an expression, wherein the expression is based off the statement; sending, by the processor, the expression to an interface of an external system; and receiving, by the processor, authenticated access to the external system, wherein the authenticated access is based off the external system verifying the expression.

Data Processing Systems for Implementing Embodiments Herein

Figure 15:
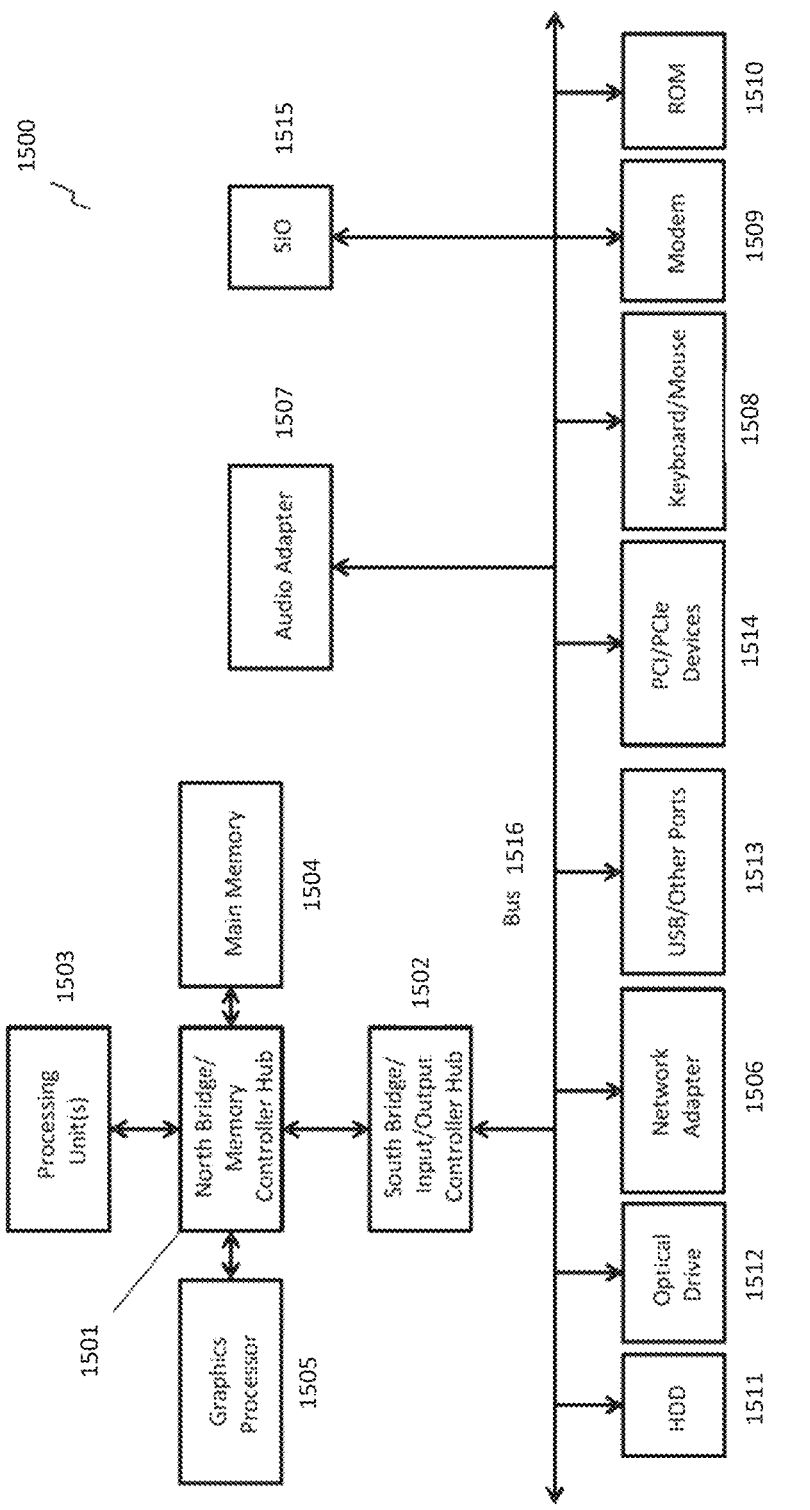
FIG. 15 illustrates a block diagram for a computing device, according to example embodiments of the present disclosure.

FIG. 15 illustrates a block diagram of an exemplary data processing system 1500 in which embodiments are implemented. The data processing system 1500 is an example of a computer, such as a server or client, in which computer usable code or instructions implementing the process for illustrative embodiments of the present invention are located. In some embodiments, the data processing system 1500 may be a server computing device. For example, the data processing system 1500 may be implemented in a server or another similar computing device. The data processing system 1500 may include some portion of the exchange side 155 as illustrated in FIG. 2A. The data processing system 1500 may be configured to, for example, transmit and receive information to the participant side 105.

In the depicted example, the data processing system 1500 may employ a hub architecture including a north bridge and memory controller hub (NB/MCH) 1501 and south bridge and input/output (I/O) controller hub (SB/ICH) 1502. A processing unit 1503, a main memory 1504, and a graphics processor 1505 may be connected to the NB/MCH 1501. The graphics processor 1505 may be connected to the NB/MCH 1501 through, for example, an accelerated graphics port (AGP) or PCI/PCIe interface.

In the depicted example, a network adapter 1506 connects to the SB/ICH 1502. An audio adapter 1507, a keyboard and mouse adapter 1508, a modem 1509, a read only memory (ROM) 1510, a hard disk drive (HDD) 1511, an optical drive (e.g., CD or DVD) 1512, a universal serial bus (USB) ports and other communication ports 1513, and PCI/PCIe devices 1514 may connect to the SB/ICH 1502 through a bus system 1516. The PCI/PCIe devices 1514 may include Ethernet adapters, add-in cards, and/or PC cards for notebook computers. The ROM 1510 may be, for example, a flash basic input/output system (BIOS). The HDD 1511 and the optical drive 1512 may use an integrated drive electronics (IDE) or serial advanced technology attachment (SATA) interface. A super I/O (SIO) device 1515 may be connected to the SB/ICH 1502.

An operating system may run on the processing unit 1503. The operating system may coordinate and provide control of various components within the data processing system 1500. As a client, the operating system may be a commercially available operating system. An object-oriented programming system, such as the Java™ programming system, may run in conjunction with the operating system and provide calls to the operating system from the object-oriented programs or applications executing on the data processing system 1500. As a server, the data processing system 1500 may be an IBM® eServer™ System® running the Advanced Interactive Executive operating system or the Linux operating system. The data processing system 1500 may be a symmetric multiprocessor (SMP) system that includes a plurality of processors in the processing unit 1503. The data processing system 1500 may include cloud processing. Alternatively, a single processor system may be employed.

Instructions for the operating system, the object-oriented programming system, and applications or programs are located on storage devices, such as the HDD 1511, and are loaded into the main memory 1504 for execution by the processing unit 1503. The processes for embodiments described herein may be performed by the processing unit 1503 using computer usable program code, which can be located in a memory such as, for example, main memory 1504, ROM 1510, or in one or more peripheral devices.

A bus system 1516 may comprise one or more busses. The bus system 1516 may be implemented using any type of communication fabric or architecture that provides for a transfer of data between different components or devices attached to the fabric or architecture. A communication unit such as the modem 1509 or the network adapter 1506 may include one or more devices that can be used to transmit and receive data.

Those of ordinary skill in the art will appreciate that the hardware depicted in FIG. 15 may vary depending on the implementation. Other internal hardware or peripheral devices, such as flash memory, equivalent non-volatile memory, or optical disk drives may be used in addition to or in place of the hardware depicted. Moreover, the data processing system 1500 can take the form of any of a number of different data processing systems, including but not limited to, client computing devices, server computing devices, tablet computers, laptop computers, telephone or other communication devices, personal digital assistants, and the like. Essentially, data processing system 1500 can be any known or later developed data processing system without architectural limitation.

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits. Some other possibilities for implementing aspects include memory devices, microcontrollers with memory (e.g., EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor ("MOS), bipolar technologies like emitter-coupled logic (ECL), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., H3P, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the description pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a processor, the program code segments combine with the processor to provide a unique device that operates analogously to specific logic circuits.

The software is stored in a machine-readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A system for managing a plurality of input ports comprising:

a plurality of input ports comprising a first input port and a second input port;

at least one processor; and a non-transitory, processor-readable storage medium, wherein the non-transitory, processor-readable storage medium comprises one or more programming instructions that, when executed, cause the at least one processor to:

receive a plurality of data packets from the first input port and the second input port, wherein a first portion of the plurality of data packets define a first message and a second portion of the plurality of data packets define a second message, wherein each of the first message and the second message comprises a message type of at least one of an order message, a cancellation message, a triggered order message, or a limit order message;

collate the first portion of the plurality of data packets into the first message and the second portion of the plurality of data packets into the second message;

sequence the first message and the second message into a sequence of record based on one or more arbitration rules;

publish, over a network interface, the sequence of record;

evaluate, after publication of the sequence of record, orders associated with the first message and the second message, using a matching algorithm, based on the sequence of record to generate matching information; and publish, over the network interface, the matching information.

2. The system of claim 1, wherein the first message is a triggered order message; and wherein the one or more programming instructions further cause the processor to:

store the triggered order message in a triggered order queue, wherein the triggered order queue comprises a triggering condition for the triggered order message;

evaluate a status of the triggering condition based on at least one of the second message, a received external condition, and the matching information; and enter an underlying order of the first message in the sequence of record based on the evaluation.

3. The system of claim 2, wherein the one or more programming instructions that cause the processor to evaluate the status of the triggering condition further cause the processor to:

determine message information associated with the second message comprising at least one of symbol, price, and quantity; and compare the message information to the triggering condition.

4. The system of claim 1, wherein the one or more programming instructions further cause the processor to omit the first message from the publication of the sequence of record based on the message type of the first message.

5. The system of claim 1, wherein the first message is a hidden limit order message; and wherein the one or more programming instructions further cause the processor to:

store the hidden limit order message in a hidden limit order queue, wherein the hidden limit order queue comprises a triggering condition for the hidden limit order message;

evaluate a status of the triggering condition based on at least one of the second message and a change in displayed liquidity associated with the second message; and enter an underlying order of the first message in the sequence of record based on the evaluation.

6. The system of claim 1, wherein the one or more programming instructions that cause the processor to publish, over the network interface, the sequence of record further cause the processor to redact a portion of the first message.

7. The system of claim 1, wherein the one or more programming instructions further cause the processor to receive third-party market data packets on at least one of the plurality of input ports.

8. The system of claim 1, wherein the one or more programming instructions further cause the processor to receive regulatory information data packets on at least one of the plurality of input ports.

9. The system of claim 1, wherein the first message arrives on the first input port at a detectably simultaneous time as the second message arrives on the second input port; and wherein the one or more arbitration rules comprise the selection of the first input port and the second input port in a rotating sequence.

10. The system of claim 1, wherein the first message arrives on the first input port at a detectably simultaneous time as the second message arrives on the second input port; and wherein the one or more arbitration rules comprises the selection of the first input port and the second input port according to an arbitration scheme.

11. The system of claim 1, wherein the one or more programming instructions further cause the processor to:

determine whether the first message is at least one of inauthentic and invalid, wherein the first message is inauthentic if the first message does not contain necessary identifying information that is sufficient to verify an authorized market participant, wherein the first message is invalid if a parameter associated with the first message is outside of a predefined threshold range; and omit, based on the determination, the first message from the sequence of record.

12. The system of claim 11, wherein the identifying information comprises a shared secret key generated through at least one of symmetric cryptography and public-key cryptography.

13. The system of claim 11, wherein the identifying information comprises an authentication token.

14. The system of claim 1, further comprising a liquidity tracking unit configured to track aggregate amounts of liquidity of an asset associated with at least one of the first message and the second message.

15. The system of claim 1, wherein the one or more programming instructions further cause the processor to publish hypothetical future market data.

16. The system of claim 15, wherein the one or more programming instructions further cause the processor to generate a triggered order message, wherein a triggering condition is based on the hypothetical future market data.

17. The system of claim 1, wherein the first message is a triggered order message; and wherein the one or more programming instructions further cause the processor to:

store the triggered order message in a triggered order queue, wherein the triggered order queue comprises a triggering condition for the triggered order message;

evaluate a status of the triggering condition based on a cohosted predictive model; and enter an underlying order of the first message in the sequence of record based on the status.

18. A method for managing a plurality of input ports comprising:

receiving, by a processor, a plurality of data packets from a plurality of input ports comprising a first input port and a second input port, wherein a first portion of the plurality of data packets define a first message and a second portion of the plurality of data packets define a second message, wherein the first message and the second message comprise a message type of at least one of an order message, a cancellation message, a triggered order message, or a hidden limit order message;

collating, by the processor, the first portion of the plurality of data packets into the first message and the second portion of the plurality of data packets into the second message;

sequencing, by the processor, the first message and the second message into a sequence of record based on one or more arbitration rules;

publishing, by the processor, the sequence of record over a network interface;

evaluating, by the processor, after publication of the sequence of record, orders associated with the first message and the second message, using a matching algorithm, based on the sequence of record to generate matching information; and publishing by the processor, the matching information over the network interface.

19. The method of claim 18, wherein the first message is a triggered order message, the method further comprising:

storing, by the processor, the triggered order message in a triggered order queue, wherein the triggered order queue comprises a triggering condition for the triggered order message;

evaluating, by the processor, a status of the triggering condition based on at least one of the second message, a received external condition, and the matching information; and entering, by the processor, an underlying order of the first message in the sequence of record based on the status.

20. A non-transitory computer-readable medium storing instructions that, when executed by a processor, cause the processor to perform operations comprising:

receiving, by a processor, a plurality of data packets from a plurality of input ports comprising a first input port and a second input port, wherein a first portion of the plurality of data packets define a first message and a second portion of the plurality of data packets define a second message, wherein the first message is a triggered order message and the second message comprises a message type of at least one of an order message, a cancellation message, a triggered order message, or a limit order message;

collating, by the processor, the first portion of the plurality of data packets into the first message and the second portion of the plurality of data packets into the second message;

sequencing, by the processor, the second message into a sequence of record based on one or more arbitration rules;

storing, by the processor, the first message in a triggered order queue, wherein the triggered order queue comprises a triggering condition for the first message;

evaluating, by the processor, a status of the triggering condition based on at least one of the second message, a received external condition, and historical matching information;

entering, by the processor, an underlying order of the first message in the sequence of record based on the evaluation;

evaluating, by the processor, using a matching algorithm, orders associated with the first message and the second message based on the sequence of record to generate matching information; and publishing, by the processor, the matching information over a network interface.

* * * * *